(12) United States Patent
Bentwich

(10) Patent No.: US 6,289,513 B1
(45) Date of Patent: Sep. 11, 2001

(54) INTERACTIVE APPLICATION GENERATION AND TEXT PROCESSING

(76) Inventor: Isaac Bentwich, 14 Klil, Doar Na Oshrat 25233 (IL)

(*) Notice: Subject to any disclaimer, the term of this patent is extended or adjusted under 35 U.S.C. 154(b) by 0 days.

(21) Appl. No.: 09/410,455

(22) Filed: Oct. 1, 1999

Related U.S. Application Data

(60) Provisional application No. 60/136,932, filed on Jun. 1, 1999.

(51) Int. Cl.[7] ............................................. G06F 9/45
(52) U.S. Cl. .............................. 717/11; 707/6; 706/45
(58) Field of Search ................... 706/45, 46, 47, 706/61; 717/1, 11; 707/1, 3, 6

(56) References Cited

U.S. PATENT DOCUMENTS

| | | | | |
|---|---|---|---|---|
| 5,146,406 | * | 9/1992 | Jacob et al. ................ | 706/45 |
| 5,228,133 | * | 7/1993 | Oppedahl ..................... | 707/6 |
| 5,440,482 | * | 8/1995 | Davis .......................... | 707/6 |
| 5,711,297 | * | 1/1998 | Iliff ............................. | 600/300 |
| 5,715,446 | * | 2/1998 | Kinoshita et al. ........... | 707/5 |
| 5,790,760 | * | 8/1998 | Arima ........................ | 706/45 |
| 5,924,074 | * | 7/1999 | Evans ......................... | 705/3 |
| 5,963,931 | * | 10/1999 | Fagg, III et al. ........... | 706/50 |
| 6,000,828 | * | 12/1999 | Leet ........................... | 705/2 |
| 6,049,794 | * | 4/2000 | Jacob et al. ................ | 706/45 |
| 6,101,488 | * | 8/2000 | Hayashi et al. ............ | 706/45 |
| 6,113,540 | * | 9/2000 | Iliff ............................. | 600/300 |
| 6,173,440 | * | 1/2001 | Darty .......................... | 717/4 |
| 6,212,519 | * | 4/2001 | Segal .......................... | 707/6 |

OTHER PUBLICATIONS

Chadhuri et al, "Join queries with exteranl text sources:execuation and optimization techniques", SIGMOD ACM pp 410–422, Jun. 1995.*

Hodge, "History of the TDS medical information system", ACM pp 143–152, Sep. 1987,*

Mannai et al, "Enchancing inter operability and data sharing in medical information systems", SIGMOD ACM pp 495–498, May 1993.*

Anderson, "Clearing the way for physician use of clinical information system", Comm. of the ACM vol. 40, No. 8, pp 83–90, Jun. 1995.*

Mannai, "Enchansing inter operatablity and dat sharing in medical information system", SIGMOD ACM pp 495–498, May 1993.*

Moore, "Acceptance of information technology by health care professionals", ACM CQL pp 57–60, Apr. 1996.*

Anderson, "Clinical information systems", Comm. of the ACM vol. 40, No. 8, pp 83–90, Aug. 1997.*

Warren et al, "A knowledge base patient data acquisition system for primacy care medicine", ACM CIKM pp 547–553, May 1993.*

Product description of MckessonHBOC's "Pathways Smart Medical Record®", www.hboc.com.

* cited by examiner

Primary Examiner—Mark R. Powell
Assistant Examiner—Anil Khatri
(74) Attorney, Agent, or Firm—Abelman, Frayne & Schwab

(57) ABSTRACT

A method and system for generating an application, using a plurality of components, each component defining an application block, storing based on a non-programmatic user input, a plurality of user-defined application-specific properties, each property being associated with one of the plurality of components, receiving structured data input via a questionnaire, based at least in part on the plurality of components, generating text based, at least in part, on the structured data, including dynamic runtime generation of a plurality of simple sentences from a plurality of sub-sentence segments based, at least in part, on user input, based at least in part on the components and providing an application based on at least some of the plurality of user-defined application-specific properties and on the components associated therewith.

39 Claims, 35 Drawing Sheets

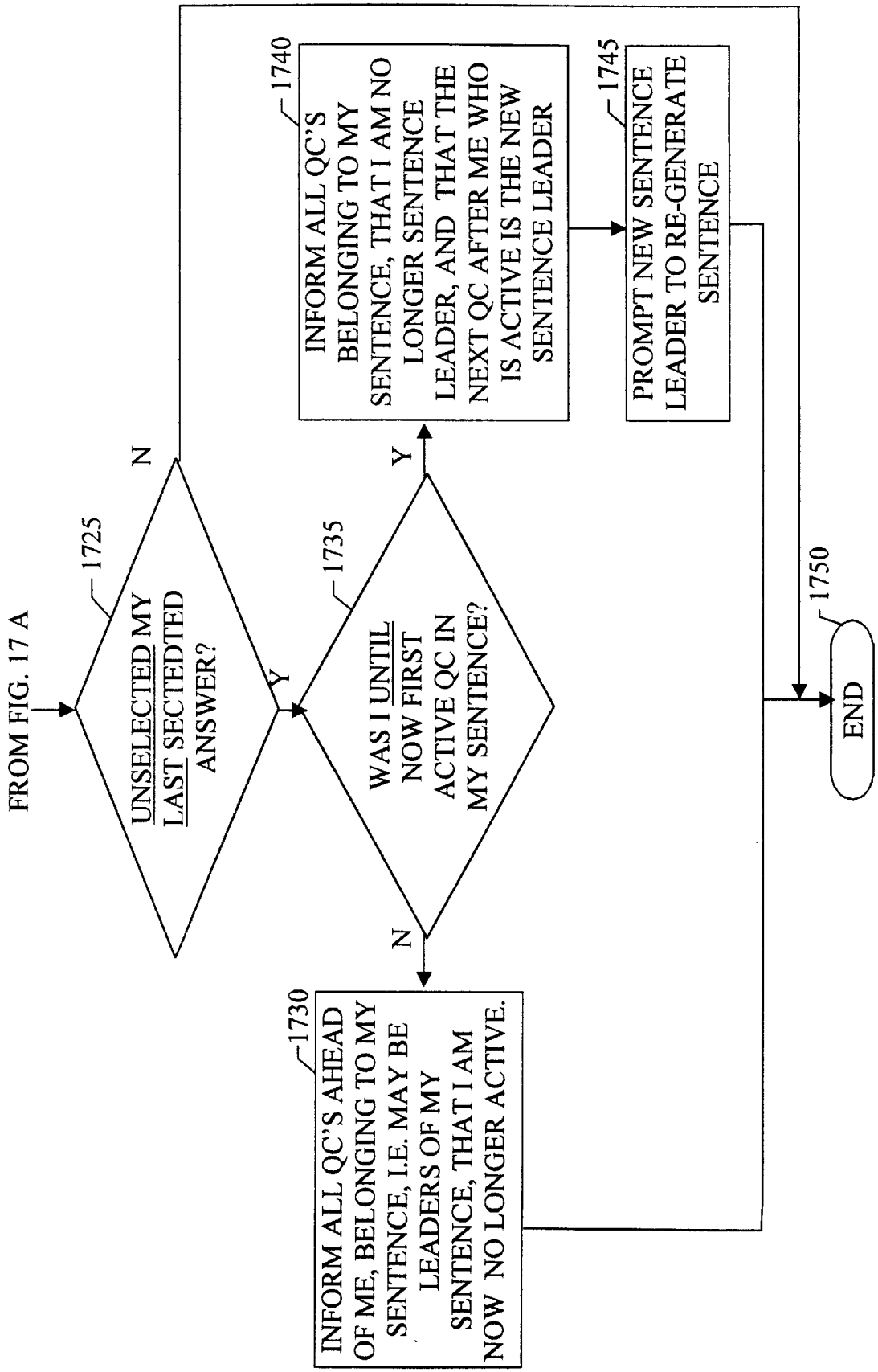

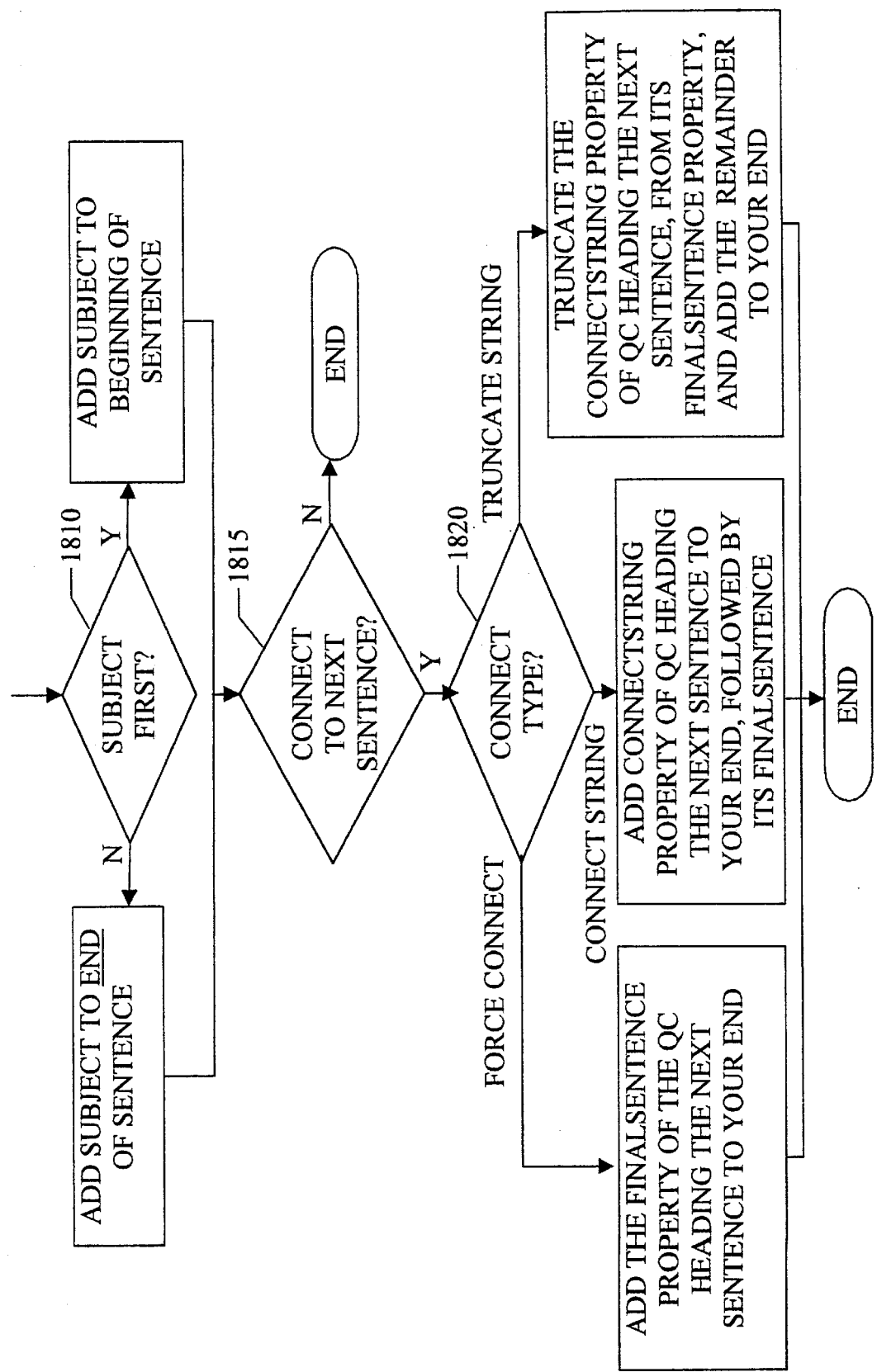

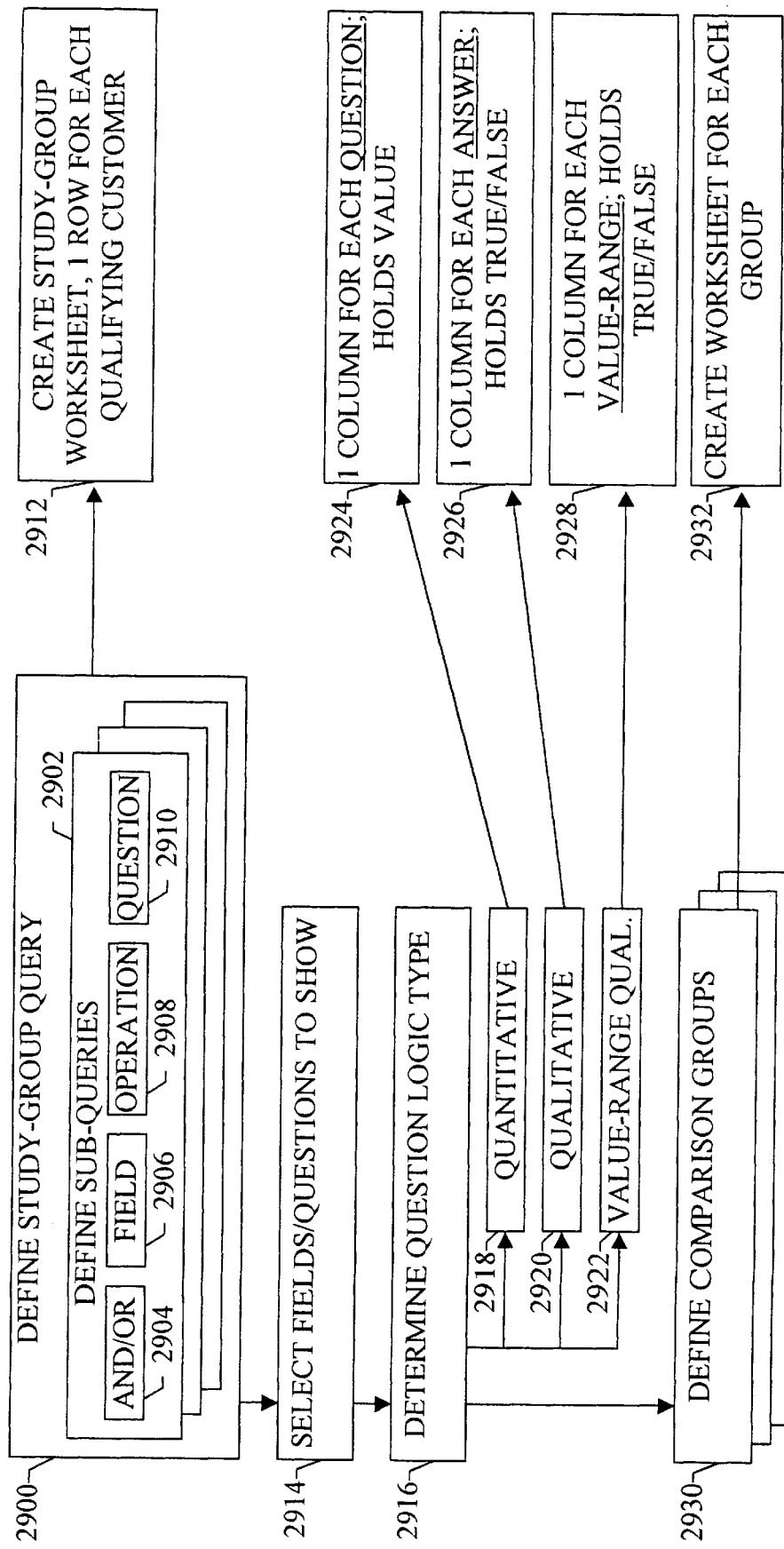

INTERACTIVE APPLICATION GENERATION AND TEXT PROCESSING

The present application claims the benefit of provisional U.S. patent application Ser. No. 60/136,932, filed Jun. 1, 1999 and entitled "Application Generation System".

FIELD OF THE INVENTION

The present invention relates to application generation systems in general.

BACKGROUND OF THE INVENTION

Many application generation and related systems are known in the art.

The Smart Medical Record® (SMR®) is a computerized patient record software program owned by HBOC. SMR® provides an interface which displays input templates, with which a user enters data. Text based on user input may be generated automatically, with sentence content being generated at runtime. SMR® is capable of generating both simple and compound sentences.

Applicant's provisional U.S. patent application Ser. No. 60/136,932, filed Jun. 1, 1999 and entitled "Application Generation System", of which the present application claims benefit, is hereby incorporated herein by reference.

The disclosures of all references mentioned throughout the present specification are hereby incorporated herein by reference.

SUMMARY OF THE INVENTION

The present invention seeks to provide an improved application generation system, along with related systems. In various preferred embodiments, the present invention seeks to provide multi-lingual capability, multi-platform capability. These capabilities and, preferably, other capabilities, are preferably provided using separate, typically relational database records and multiple cooperating text generation modules.

There is thus provided in accordance with a preferred embodiment of the present invention a method for generating an application, the method including providing a plurality of components, each component defining an application building block, storing, based on non-programmatic user input, a plurality of user-defined application-specific properties, each property being associated with one of the plurality of components, receiving structured data input via a questionnaire, based at least in part on the plurality of components, generating text based, at least in part, on the structured data, the generating text including dynamic runtime generation of a plurality of simple sentences from a plurality of sub-sentence segments based, at least in part, on user input, based at least in part of the components, and providing an application based on at least some of the plurality of user-defined application-specific properties and on the components associated therewith.

Further in accordance with a preferred embodiment of the present invention the generating text also includes automatically joining at least two of the plurality of simple sentences to form a compound sentence.

Still further in accordance with a preferred embodiment of the present invention each simple sentence is based on a user-supplied response to a question, the response being provided in the receiving step.

Additionally in accordance with a preferred embodiment of the present invention the storing includes receiving user input, wherein the user input is substantially non-textual.

Moreover in accordance with a preferred embodiment of the present invention the generating text also includes automatically generating text in more than one language.

Further in accordance with a preferred embodiment of the present invention the more than one language includes at least one left-to-right language and at least one right-to-left language.

Still further in accordance with a preferred embodiment of the present invention the more than one language includes a first language having a first syntactical structure and a second language having a second syntactical structure, and the first syntactical structure and the second syntactical structure are distinct.

Additionally in accordance with a preferred embodiment of the present invention the first syntactical structure has a first sentence structural order and the second syntactical structure has a second sentence structural order, and the first sentence structural order and the second sentence structural order are different.

Moreover in accordance with a preferred embodiment of the present invention at least a portion of the method is implemented in software adapted for execution on a computer.

Further in accordance with a preferred embodiment of the present invention the computer includes one of the following: a handheld computer, and a palmtop computer.

Still further in accordance with a preferred embodiment of the present invention the computer includes a keyboard-less pen-based handheld computer.

Additionally in accordance with a preferred embodiment of the present invention the computer includes at least one of the following: a computer running WINDOWS CE®, a computer operating on a WINDOWS CE® platform, a PSION® handheld computer, a computer operating with an EPOCH® operating system, a PALMPILOT® computer, a handheld wireless communication computer, and a PALM VII® computer.

There is also provided in accordance with another preferred embodiment of the present invention a text generation method for generating text based, at least in part, on structured data, the method including generating a plurality of simple sentences from a plurality of sub-sentence segments based, at least in part, on user input, dynamically at runtime.

Further in accordance with a preferred embodiment of the present invention the generating includes automatically generating the plurality of simple sentences in more than one language.

Still further in accordance with a preferred embodiment of the present invention the more than one language includes at least one left-to-right language and at least one right-to-left language.

Additionally in accordance with a preferred embodiment of the present invention the more than one language includes a first language having a first syntactical structure and a second language having a second syntactical structure, and the first syntactical structure and the second syntactical structure are distinct.

Moreover in accordance with a preferred embodiment of the present invention the first syntactical structure has a first sentence structural order and the second syntactical structure has a second sentence structural order, and the first sentence structural order and the second sentence structural order are different.

Further in accordance with a preferred embodiment of the present invention at least a portion of the method is implemented in software adapted for execution on a computer.

Still further in accordance with a preferred embodiment of the present invention the computer includes at least one of the following: a handheld computer, and a palmtop computer.

Additionally in accordance with a preferred embodiment of the present invention the handheld computer includes at least one of the following: a computer running WINDOWS CE®, a computer operating on a WINDOWS CE® platform, a PSION® handheld computer, a computer operating with an EPOCH® operating system, a PALMPILOT® computer, a handheld wireless communication computer, and a PALM VII® computer.

There is also provided in accordance with another preferred embodiment of the present invention a text generation method for generating a compound sentence from a plurality of simple sentences, the method including providing general logic defining compound sentence structure based on structure of simple sentences from which a compound sentence is to be generated, providing a plurality of simple sentences, and generating a compound sentence based on the general logic and the plurality of simple sentences.

Further in accordance with a preferred embodiment of the present invention each of the plurality of simple sentences reflects a continuation questions in a data-input questionnaire, and the generating step includes generating a compound sentence from at least two sentences including a first sentence and a second sentence, wherein the first sentence reflects data entered via one question in the data-input questionnaire, and the second sentence reflects data entered via a second question in the questionnaire, and wherein the second question is a continuation to one of a plurality of answers of the first question.

Still further in accordance with a preferred embodiment of the present invention wherein at least one of the following is not limited: a number of simple sentences related to continuation questions in the data-input questionnaire, and the levels of hierarchy of the continuation questions, the continuation questions being joinable to generate a compound sentence.

Further in accordance with a preferred embodiment of the present invention the generating a compound sentence includes automatically generating the compound sentence in more than one language.

Still further in accordance with a preferred embodiment of the present invention the more than one language includes at least one left-to-right language and at least one right-to-left language.

Additionally in accordance with a preferred embodiment of the present invention the more than one language includes a first language having a first syntactical structure and a second language having a second syntactical structure, and the first syntactical structure and the second syntactical structure are distinct.

Moreover in accordance with a preferred embodiment of the present invention the first syntactical structure has a first sentence structural order and the second syntactical structure has a second sentence structural order, and the first sentence structural order and the second sentence structural order are distinct.

Further in accordance with a preferred embodiment of the present invention the generating is based only on the general logic and the simple plurality of sentences.

There is also provided in accordance with another preferred embodiment of the present invention a data collection method for allowing data collection from multiple users, the method including providing a knowledge base defining at least one data-structured input questionnaire to each of a plurality of users, allowing each user to modify the knowledge base associated with the user, receiving structured input from each of the plurality of users, the input being based on the input questionnaire, storing the input from the receiving step in a textual form, and providing direct access to the stored input of a first one of the plurality of users by at least a second of the plurality of users, after the second one of the plurality of users has modified the knowledge base associated with the second one of the plurality of users, thereby altering the structured input associated with the second one of the plurality of users.

There is also provided in accordance with another preferred embodiment of the present invention a method for analyzing a text, the text including plain text generated by a text generator using a text generating method, the method for analyzing including reversing the text generating method, thereby determining a plurality of inputs which were provided to the text generating method in order to generate the text.

Further in accordance with a preferred embodiment of the present invention the generated text does not include any of the following indicators: an embedded ID, and a hidden character, the indicators indicating the questions and answers which caused generation of the text.

There is also provided in accordance with another preferred embodiment of the present invention a data access method including receiving data in hierarchical form, generating natural language sentences from sub-sentence elements based, at least in part, on the data in hierarchical form, storing the natural language sentences in textual form, and accessing the stored natural language sentences in textual form.

There is also provided in accordance with another preferred embodiment of the present invention a data access method including providing a data management system having questionnaire-structured data entry with multiple levels of hierarchy for allowing a plurality of users to manage data records including data records of a plurality of customers, storing data using the data management system, and allowing access to the stored data by at least one non-user of the data management system without use of the data management system.

Further in accordance with a preferred embodiment of the present invention the data management system provides text generation from sub-sentence elements.

Still further in accordance with a preferred embodiment of the present invention the data management system provides automatic generation of complex sentences from simple sentences.

Additionally in accordance with a preferred embodiment of the present invention the simple sentences include an unlimited number of sentences corresponding to continuation questions in the data-input questionnaires, and unlimited levels of hierarchy of the questions.

Moreover in accordance with a preferred embodiment of the present invention the data management system provides multi-lingual capability.

Further in accordance with a preferred embodiment of the present invention the access includes viewing at least one of the data records.

Still further in accordance with a preferred embodiment of the present invention the access includes updating at least one of the data records.

Additionally in accordance with a preferred embodiment of the present invention the updating includes updating by sending an electronic message to the data management system.

Moreover in accordance with a preferred embodiment of the present invention the electronic message includes an e-mail message.

There is also provided in accordance with another preferred embodiment of the present invention a record data structure including a database including a plurality of documents, each document including a plurality of sections stored in at least one of the following one word processing file, one word processing file object, at least one HTML file, at least one XML file, and a text file, the plurality of sections being arranged in a hierarchy.

There is also provided in accordance with another preferred embodiment of the present invention an application generating system including a plurality of components, each component defining an application building block, storage apparatus operative to store, based on non-programmatic user input, a plurality of user-defined application-specific properties, each property being associated with one of the plurality of components, input apparatus operative to receive structured data input via a questionnaire, based at least in part on the plurality of components, a text generator operative to generate text based, at least in part, on the structured data, including dynamic runtime generation of a plurality of simple sentences from a plurality of sub-sentence segments based, at least in part, on user input, and an application provider for providing an application based on at least some of the plurality of user-defined application-specific properties and on the components associated therewith.

There is also provided in accordance with another preferred embodiment of the present invention a computer-readable medium including a computer program, the computer program being operative, when in operative association with a computer, to perform the following steps: providing a plurality of components, each component defining an application building block, storing, based on non-programmatic user input, a plurality of user-defined application-specific properties, each property being associated with one of the plurality of components, receiving structured data input via a questionnaire, based at least in part on the plurality of components, generating text based, at least in part, on the structured data, the generating text including dynamic runtime generation of a plurality of simple sentences from a plurality of sub-sentence segments based, at least in part, on user input, and providing an application based on at least some of the plurality of user-defined application-specific properties and on the components associated therewith.

BRIEF DESCRIPTION OF THE DRAWINGS

The present invention will be understood and appreciated more fully from the following detailed description, taken in conjunction with the drawings in which:

FIGS. 29 and 29B, taken together, comprise a simplified flowchart illustration of a preferred method of operation of the research and statistics mechanism 55 of FIG. 1A.

DETAILED DESCRIPTION OF A PREFERRED EMBODIMENT

Figure 1A:
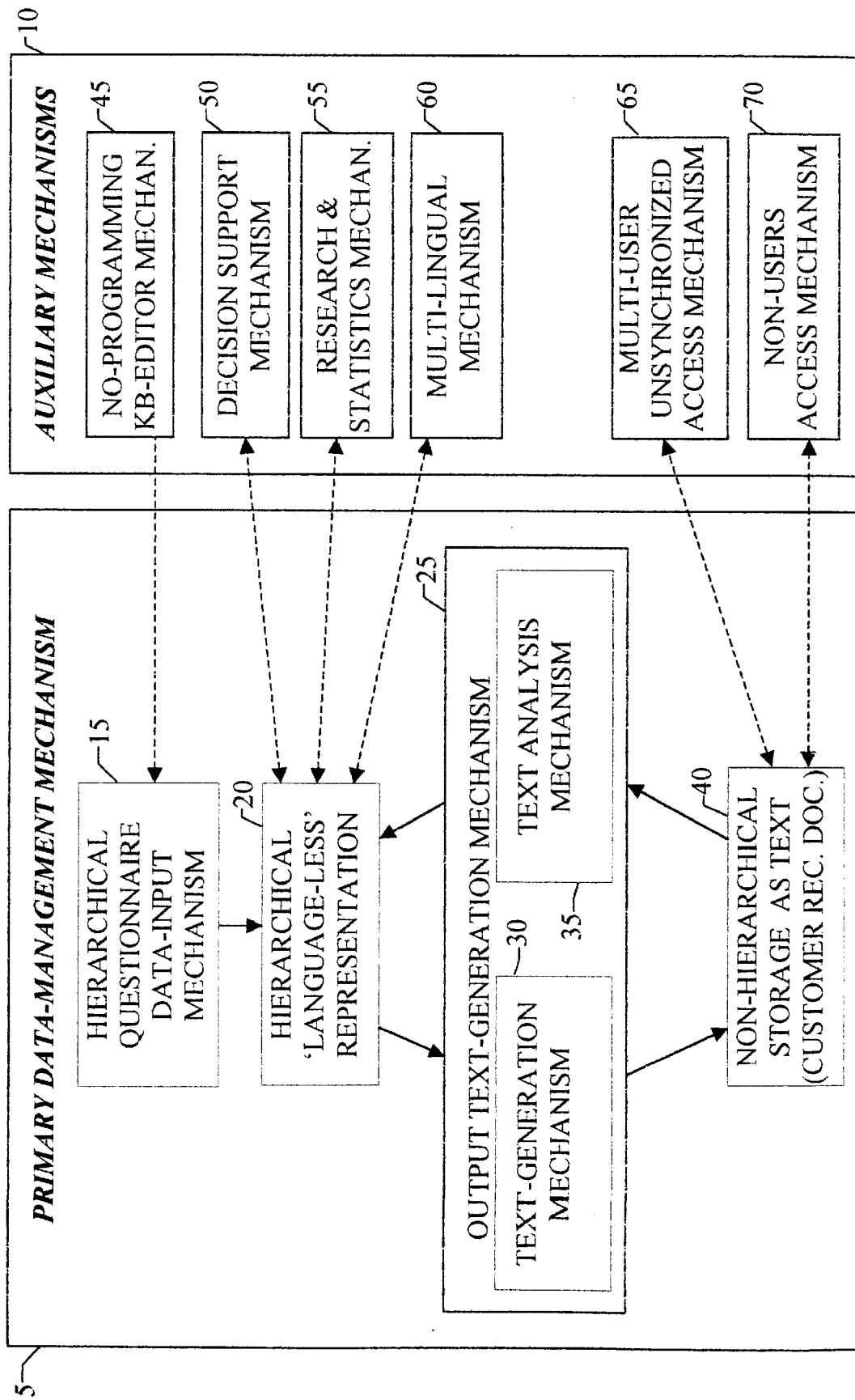
FIG. 1A is a simplified functional diagram of a computer application constructed and operative in accordance with a preferred embodiment of the present invention.

Reference is now made to FIG. 1A, which is a simplified functional diagram of a computer application constructed and operative in accordance with a preferred embodiment of the present invention. It is appreciated that the computer application may be implemented in any appropriated programmed computer system such as, for example, an appropriate personal computer including an operating system having a graphical user interface.

The embodiment of FIG. 1A comprises a mechanism for creation of data collection and management applications, using a small number of enabling components which serve as building blocks of said applications. This mechanism of FIG. 1A preferably comprises the following elements:

A primary data management mechanism 5 comprises the main mechanism of the embodiment of FIG. 1A. The primary data management mechanism 5 preferably comprises a mechanism which allows the user to enter data via structured, hierarchic questionnaires, stores the entered data temporarily in a hierarchical 'language-less' representation, uses a text-generation mechanism in order to generate and preferably permanently store the data non-hierarchically, as complex textual output, preferably including generation of complex sentences from their sub-sentence segments and automatic joining of sentences to form compound sentences, and uses a text analysis mechanism to analyze and transform the textual output back into the language-less representation format, in which format the textual output is preferably stored permanently.

A preferred embodiment of the primary data management mechanism 5 is described further below with reference to FIG. 1B, which provides a Structural Overview of this mechanism, and with reference to FIG. 2, which describes the application enabling components used to achieve this function, the application enabling components are further described below with reference to FIGS. 3–19 and 23–25.

Auxiliary mechanisms 10 comprise a collection of additional mechanisms which are used in conjunction with the primary data management mechanism 5, or which comprise features and capabilities which result from the architecture thereof. These mechanisms are further described below with reference to FIGS. 20–22 and 26–29.

The primary data management mechanism 5 preferable comprises the following elements, whose function is also described as follows: data is preferably entered via a hierarchical questionnaire data input mechanism 15, which is a mechanism for displaying structured questionnaires. The function of the data input mechanism 15 is preferably achieved by a navigation mechanism 105 (FIG. 1B) and a display mechanism 110 (FIG. 1B), described below with reference to FIG. 1B.

Data entered as described above is preferably stored in memory, preferably in RAM, in a hierarchical language-less representation 20. Preferably, in the hierarchical language-less representation 20, only the ID of the questions, answers and continuation questions and answers, and other elements need be stored; the language-dependent text which the IDs represent need not be stored.

An output text generation mechanism 25 comprises a mechanism which allows for a two-way transformation: from the hierarchical language-less representation 20 into textual output, and back from said textual output into the hierarchical language-less representation 20. The structural relationship of the output text generation mechanism 25 with other elements of the system of FIG. 1A is described further with reference to FIG. 1B. The enabling components involved are further described below with reference to FIG. 2, and still further with reference to FIGS. 3–10.

This output text generation mechanism 25 preferably comprises the following: a text generation mechanism 30, which is described further below with reference to FIG. 1 and further with reference to FIGS. 12–18; and a text analysis mechanism 35, which is described further below with reference to FIG. 19.

Non-hierarchical storage as text 40 preferably comprises the output text which was generated by the text generation mechanism 30, and which is analyzed by the text analysis mechanism 35. It is in the format of the non-hierarchical storage as text 40 that the data is preferably stored permanently such as, for example, on an appropriate storage device such as a disk. The textual output storage preferably corresponds to a customer record document 115 (FIG. 1B), which is further elaborated in FIGS. 23–25.

The auxiliary mechanisms 10 preferable comprise the following mechanisms:

A no-programming knowledge base (KB) editor 45 preferably comprises a mechanism allowing the user of the system to create and modify, without any programming, the knowledge base which underlies and 'drives' the hierarchical questionnaire data input mechanism 15 as well as the related corresponding text to be generated by the output text-generation mechanism 25. The no programming KB editor 45 is described further below with reference to FIG. 26.

A decision support mechanism 50, a research & statistics mechanism 55, and a multi-lingual mechanism 60 preferably comprise mechanisms which are made possible due to the fact that the data collected may be represented in the hierarchical language-less representation 20.

The decision support mechanism 50 preferably comprises a mechanism which automatically creates a programmable object-model which reflects the exact structure of the knowledge-base, which the user preferably created without any programming using the knowledge base editor 45, and is preferably operative to populate the user's data-entry selections onto this object model. It is thus possible to programmatically create complex conditions based on the data-entry, and to assign values to questions in the knowledge-base programmatically rather than manually. The decision support mechanism 50 is further described below with reference to FIGS. 20A and 20B.

The research & statistics mechanism 55 preferably comprises a mechanism which allows the user, without any programming, to perform complex queries on the customer database, comparing groups of customers, presenting the results in table or chart format, and deriving statistical conclusions from such comparisons. This mechanism is further described below with reference to FIGS. 29A and 29B.

The multi-lingual mechanism 60 preferably comprises a mechanism which allowing the system to display questionnaires in multiple languages, including right-to-left languages, and to generate and analyze text in these languages, including generation of sentences from their sub-sentence parts, and joining of sentences to form compound sentences. A knowledge base is created once in one language, and may then be semi-automatically be translated, such as, for example, by utilizing appropriate commercially available translation software into multiple languages. The multi-lingual mechanism 60 is described further below with reference to FIGS. 21, 22A, and 22B.

A multi-user unsynchronized access mechanism 65 preferably comprises a mechanism which allows multiple users to each modify the knowledge-base of the application to their likings and needs, and still be able to read and write into shared customer records, without synchronizing their knowledge bases. The multi-user unsynchronized access mechanism 65 is further described below with reference to FIG. 27.

A non-user access mechanism 70 preferably comprises a mechanism which allows non-users of the system to view and write into customer records of the application, without need for the application and its knowledge-base. The non-user access mechanism 70 is further described below with reference to FIG. 28.

The multi-user unsynchronized access mechanism 65 and the non-user access mechanism 70 are provided as a result of the systems capability of storing the hierarchical data in the form of the non-hierarchical storage as text 40, and the ability to analyze the text back into its hierarchical structure via the text analysis mechanism 35.

Figure 1B:
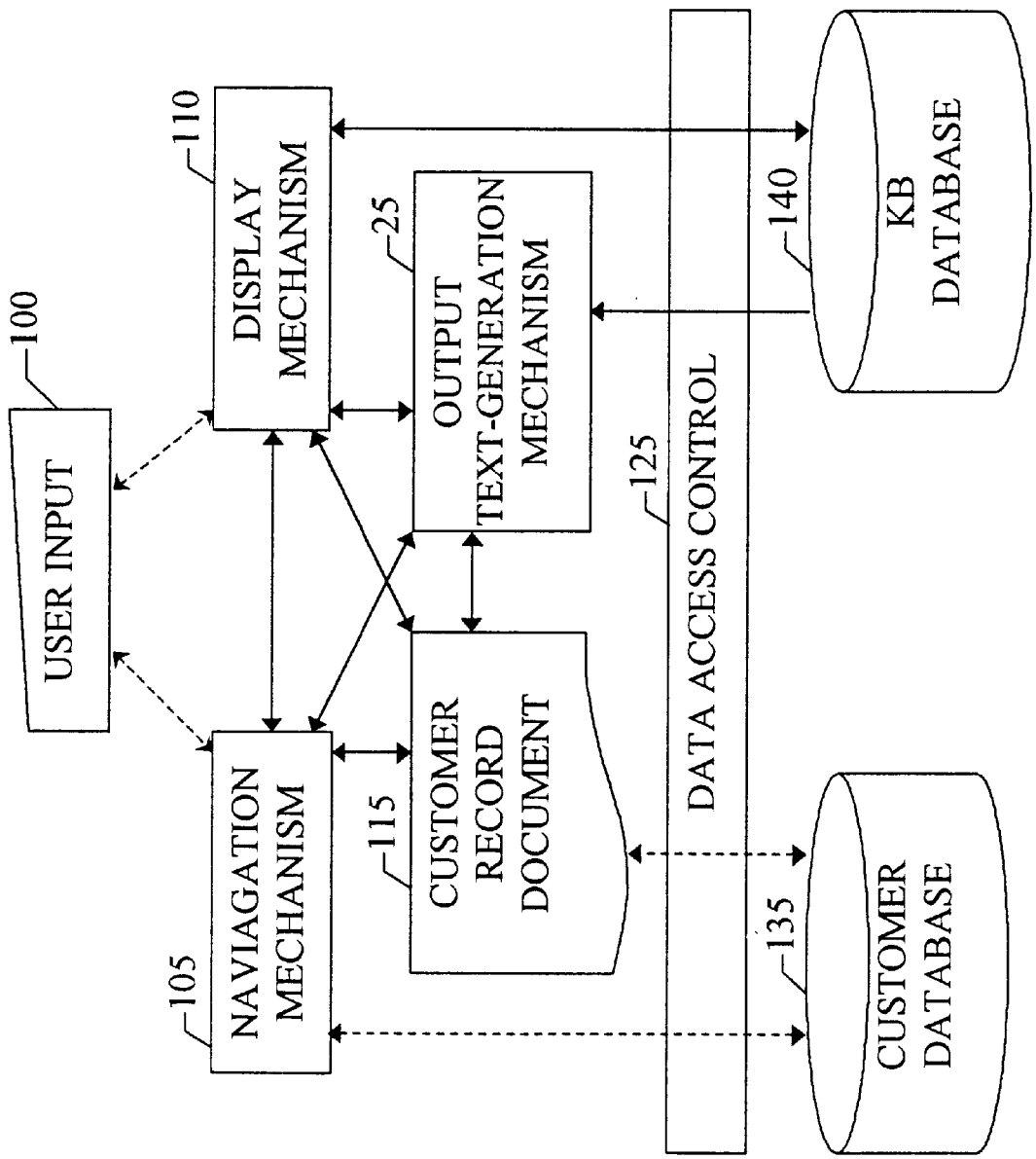
FIG. 1B is a simplified block diagram illustration of a computer application constructed and operative in accordance with a preferred embodiment of the present invention, the apparatus of FIG. 1B generally corresponding to the primary data management mechanism 5 of FIG. 1A.

Reference is now made to FIG. 1B which is a simplified block diagram illustration of a computer application constructed and operative in accordance with a preferred embodiment of the present invention, the apparatus of FIG. 1B generally corresponding to the primary data-management mechanism 5 of FIG. 1A. The elements of FIG. 1B are typically implemented in an appropriate combination of hardware and software, as is well known in the art.

The application of FIG. 1B preferably comprises the following main functional elements: two databases (a knowledge-base (KB) database 140 and a customer-database 135), and a data access component 125 to access them; two user interface mechanisms, typically including a navigation mechanism 105 and an Input/display mechanism 110; an output text-generation mechanism 25; and a customer record document 115.

The customer database 135 typically comprises a plurality of customer record documents 115, such that all the data about each customer is preferably stored in one customer record document 115 object, which is retrieved at the beginning of the session, worked on locally, and saved back to the customer database 135 at the end of the session. Additional tables and fields in the customer database 135 duplicate some fields and tables found in the customer record document 115, for enhancing retrieval and statistics functions. The customer database 135 is shown connected to the remainder of the application of FIG. 1B by dashed lines, to indicate that it may optionally reside on a remote server, and may optionally be accessed over a network such as the Internet. The customer database 135 is further described below with reference to FIG. 10.

The knowledge-base (KB) database 140 preferably stores application and customer-record-structure data, and knowledge-base data required to display input templates, and to generate textual output according to user's selection and input, and to analyze text previously generated in this manner. A preferred implementation of the knowledge-base database 140 is described in more detail below with reference to FIG. 9.

The navigation mechanism 105 preferably receives user input, and allows the user to perform File Operations on the customer database 135, such file operations typically including: create-new, open-existing, and save customer record. These commands issued via the navigation mechanism 105 preferably cause the customer database 135 to create/retrieve a customer record document 115, and to present a copy of it as the customer record document 115, so that it can be worked on locally during the session, and to save it back to the database at the end of the session.

A second preferred function of the navigation mechanism 105 is to navigate to various parts of the customer record document 115 during the session, and to various knowledge-base input-display templates which are further described below with reference to FIG. 23. This action is actually preferably three-fold: (a) jumping to the right place in the customer record document 115, (b) instructing the display mechanism 110 to display the corresponding template, and (c) instructing the output text-generation mechanism 25 to work with the corresponding set of questions to generate the text.

A preferred implementation of the elements described immediately above is described below with reference to FIGS. 2, 5, and 8.

The display mechanism 110 preferably displays knowledge-base templates, each preferably comprising a plurality of questions of various types (multiple-choice, numeric, etc.), used typically for data entry. The display mechanism 110 preferably receives the instruction of which template to display from the navigation mechanism 105, retrieves the appropriate data, in the appropriate language, displays the retrieved data as a questionnaire, accepts the user's responses and data entry, and passes the responses to the output text-generation mechanism 25.

The display mechanism 110 also preferably displays a section of the customer record document 115, which is currently being edited, so that the user may view the text which is being generated in response to his selections, and allows the user (typically with some restrictions) to add free-text to it.

A preferred implementation of the display mechanism 110 is described in more detail below with reference to FIGS. 2, 3 and 4.

The output text-generation mechanism 25 preferably generates sophisticated natural language output, based on the user's selections and input to the templates displayed by the display mechanism 110, and on additional text-generation logic and parameters associated with each question and preferably stored in the knowledge-base database 140. This text generated during the session, is stored to the customer record document 115.

A preferred implementation of the output text-generation mechanism 25 is described in more detail below with reference to FIGS. 2, 6 and 7.

The customer record document 115 is preferably a document file or object, such as an MICROSOFT® Word document, or an HTML page or a collection of HTML pages, the structure of which is application-dependent, which contains all of the customer data. As mentioned above, preferably the customer record document 115 is retrieved from the customer database 135 at the beginning of the session, and saved back to the customer database 135 at the end of the session, allowing the application to be server-independent during the session. A simple hierarchy of the document (e.g. headings in a MICROSOFT® Word document), is preferably used to organize the data into sections of the record (which are application dependent), chronological log-entries etc., and the navigation mechanism 105 is preferably used to navigate to these various sections of the document. The data are preferably entered in a structured manner, using data-entry questionnaires and text-generation, but are preferably stored as simple text, such that they may be viewed by non-users of the system, without requiring any special software. A preferred implementation of the customer record 115 is described below with reference to FIG. 23, and examples of possible implementations which demonstrate the wide scope of data-collection and management applications which are supported by such an architecture are described below with reference to FIGS. 24 and 25.

Figure 2:
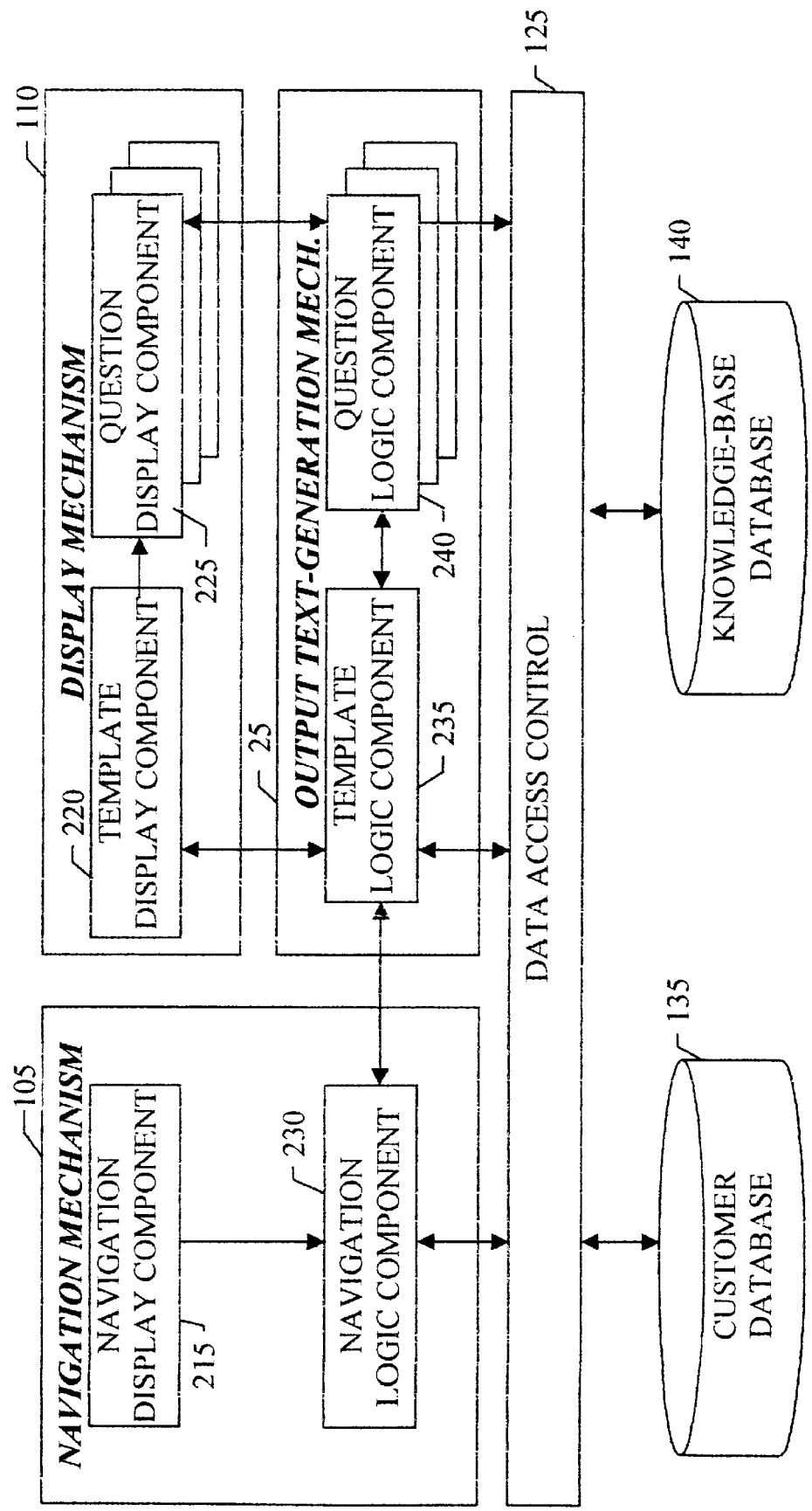
FIG. 2 is a simplified block diagram illustration of a preferred embodiment of a portion of the apparatus of FIG. 1A.

Reference is now made to FIG. 2, which is a simplified block diagram illustration of a preferred embodiment of the navigation mechanism 105, the display mechanism 110 and the output text-generation mechanism 25 of FIG. 1B.

Preferably elements 105, 110, and 25, are implemented by six dedicated components (some of them in multiple instances), organized in a three-tiered architecture, as shown in FIG. 2 and briefly described below.

The navigation mechanism 105 preferably includes a navigation display component 215 and a navigation logic component 230. The navigation display component 215 preferably comprises a toolbar component 500 (shown in FIG. 5, described below), as is well known in the art, with buttons and combo-boxes, corresponding to the various sections of the customer record document 115, allowing the user to navigate to these sections, as well as to perform various workflow actions, and other actions related to the customer record documents 115. A preferred embodiment of the navigation display component 215 is described further below, and with reference to FIG. 5.

The navigation logic component 230 preferably jumps to locations in the customer record document 115, and identifies the template associated with that section in the customer record document 115, and activates various macros, and dialogue-screens, based on user input in the template display component 220. A preferred implementation of the navigation logic component 230 is described in more detail below, and with reference to FIG. 8.

The display mechanism 110 preferably includes a template display component 220 and a plurality of question display components 225. The template display component 220 preferably comprises a screen upon which the question display components 225 are displayed (for example, VBA® Form in an MICROSOFT® Office implementation, HTML page or ACTIVEX® Document, or Java application in an Internet implementation). The template display component 220 preferably calculates the number of question display components (QDCs) 225 required, their dimensions, and location, and creates said QDCs 225, and sets their dimensions and location properties accordingly. A preferred implementation of the template display component 220 is described in more detail below with reference to FIG. 4.

Each question display component 225 typically displays a question on the screen, allowing the user to make selections or enter data onto that question, creates, positions and displays, the various required screen elements 310 (for example, check-boxes, labels, text-fields, and so forth); and determines the behavior 315 of these screen elements 310, according to the 'Type' property of the question, and various other KB parameters. A preferred implementation of the question display component 225 is described in more detail below with reference to FIG. 3.

The output text-generation mechanism 25 preferably includes template logic component 235 and a plurality of question logic component 240. The template logic component 235 preferably constructs in memory Virtual Template Record for multiple templates which are in use (collating this data which is found in multiple records in multiple tables), in the required language, creates sufficient instances of question logic components 240, and passes to each of the templates their question data. A preferred implementation of the template logic component 235 is described in more detail below with reference to FIG. 7.

Although for the sake of clarity of description the template logic component 235 is described herein as part of the output text-generation mechanism 25 of FIG. 1B, it may alternatively be considered that text-generation is one of the functions of the template logic component 235, not the only one, since the business-logic part thereof preferably supports the Display function as well. The most important example to that is that one of the functions of the template logic component 235 is to create the Virtual Template Record, which serves not only the text-generation but also the display.

The question logic component 240 preferably generates text based on user input made to the corresponding question display component 225. A plurality of question logic components 240 preferably collaborate and 'communicate' (via their properties) to create, when appropriate, compound sentences, made of input of several question, and to analyze text previously entered by the user into the questions and answers which caused generation of such text. A preferred implementation of the question logic component 240 is described in more detail below with reference to FIG. 6.

Figure 3:
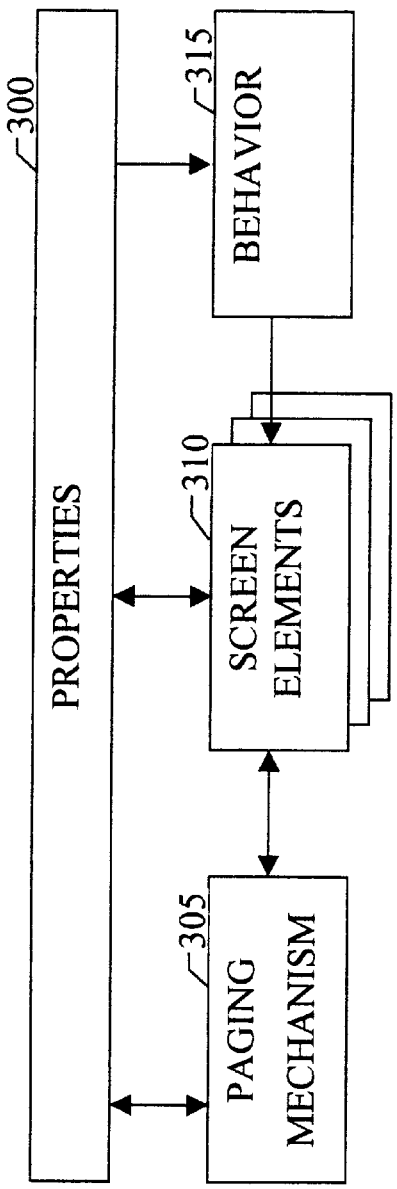
FIG. 3 is a simplified block diagram illustration of a preferred implementation of a portion of the apparatus of FIG. 2, comprising the question display component 225.

Reference is now made to FIG. 3, which is a simplified block diagram illustration of a preferred implementation of the question display component 225 of FIG. 2. The apparatus of FIG. 3 comprises properties 300, which preferably hold various parameters, including the Type of the question, its data (question, answers, and so forth), and other parameters which define how it is presented on the screen, and behave. The properties 300 also preferably store the user's responses to the question (answers selected etc.).

The following detailed example relating to a preferred embodiment of the present invention is not meant to be limiting, and statements therein are intended to refer to preferred alternatives only:

Question Display Component

I. Introduction

The Question Display Component (QDC) is the unit which presents the questions on the screen. It is built such that it can appear and behave as different question types which the system supports, and does so according to parameters which it receives (e.g. Type, Language, etc.). It displays questions in multiple languages, including languages with a right-to-left as well as left-to-right direction. In Edit mode, its appearance and behavior are different, as described below, allowing certain 'dra' actions, which are used for editing the question. The following sections describe the structure and function of this control.

II. Properties

| | | |
|---|---|---|
| 1. Question ID | Short | Optional |
| 2. QuestionType | Byte | Currently about 10 types, in the future, not more than 99. |
| 3. Question | 20 | Test of the question |
| 4. QuestionGroup | Short | The Group to which this question belongs. Used for the Check_Redundancy method. |
| 5. Answer (1–18) | 25 | 12 fields with the text of the answers |
| 6. Response (1–18) | | Stores the response of the user for each answer. Used with the paging mechanism (since there are more answers than are displayed at once). |
| 7. ContinuationID (1–12) | Short | ID of the question or the template which is the continutation. Affects the display and behavior of the answers (if not null, then "..." are displayed next to the answer, and popup activated by click). |
| 8. XYCoordinates (1–12) | | Used only for Graphic type question. Stores X and Y coordinates indicating for each answer, to which region in the RegionsBitmap it is associated with. |
| 9. Type (1–6) | | Used only in 'Mixed' type of question, to indicate for each 'answer', which type of question (e.g. text-field, combo-box) it displays. |
| 10. AnswerTipText (1–12) | | Text that appears when pointing to an answer |
| 11. QuestionTipText | | Text that appears when pointing to the question |
| 12. PagingStatus | Byte | Reflects which set of answer is currently being displayed. Relates to the PgUp PgDn mechanism. |
| 13. LanguageDirection | Bool | Options: RightToLeft, LeftToRight |
| 14. Font | | Language dependent |
| 15. BackgroundBitmap | | Used only in Graphic type questions. |
| 16. RegionsBitmap | | Used only in Graphic type questions. |
| 17. SketchBitmap | | Used only in Graphic type questions. Stores the sketch drawn by the user. It is displayed 'overlaid' over the background bitmap, but stored separately. |
| 18. Mode | | Normal (default), or Edit. When in Edit mode, functions as the Question knowledge-base editor |

III. Display_Question method

The Display_Question method is activated by the TDC after finishing its Feed_Questions method.

The following steps are taken prior to activating the Display_Question method. First, the Organize_Screen method of the TC creates a sufficient number of QC units, and sets their properties so as set their size, location, and sequence on the screen. When a Template is opened, the TC reads it into the multi-dimensional array in the memory, using the ReadDB method. Finally, using the Feed_Questions the TC feeds the question data into the properties of each one of the QC. Specifically, at this phase, the Question and Answers(1–18) properties which contain the text of the question and text of the answers for this question, as well as various properties which determine the display mode are also fed to the QC.

After performing the Feed_Questions method, the TC calls the Display_Question of each one of the QCs, as described:

Method Steps:
1. Check the question Type and NumAnswers properties, and create the elements required for this question Type. If NumAnswers>6, then create screen elements sufficient to display <u>6</u> answers, and the PgDn and PgUp buttons (PgUp Visible=False). If NumAnswers<6, then create screen elements sufficient to display NumAnswers answers (no PgUp, PgDn buttons).
2. Check the question Type and LanguageDirection properties. Assign proper values to the dimension and location properties of the screen elements of the QC, so as to position them and set their dimensions according to the Type and LanguageDirection of the QC.
3. Check the LanguageDirection property. If=L-R (default), then set Alignment property of all Labels and text-fields of the QC to 'Left'. Else, set it to 'Right'. This, with the exception of Numeric Single Option, and Multiple Numeric Question Types, in which the text-fields are aligned 'Left' regardless of the LanguageDirection properties.
4. Check NumAnswers, and load (up to) first 6 Answer properties to the 6 available Answer-Labels, and set Visible property of the appropriate number of these labels to True (so that no 'blank' answer labels would be displayed). PagingStatus is set to =1.
5. If NumAnswers<7, then PgDn button Visible=False, else=True. PgUp button Visible=False in any case.

A detailed description of the Paging mechanism and its logic is described below with reference to the PgUp & PgDn Buttons.

Referring back to FIG. 3, the apparatus of FIG. 3 also preferably comprises screen elements 310 (for example, check-boxes, text-fields, labels) which preferably are created and positioned according to the type and LanguageDirection properties 300, and text strings from certain properties 300 are assigned to the corresponding screen elements 310 (e.g. AnswerLabel, QuestionLabel). User selection or input onto the screen elements 310, are stored back to the properties 300.

The following detailed examples relating to preferred embodiments of the present invention are not meant to be limiting, and statements therein are intended to refer to preferred alternatives only:

Screen-elements & Their Dimensions & Location

Following is a description of the screen elements to be created for each question type, and their location, and dimensions. As is clear from the bitmaps below, each question type has two modes of presentation for left-to-right languages (e.g. English, this is the default), and for right-to-left languages (relevant only for Hebrew and Arabic). Screen elements for both are obviously the same, and their alignment is a mirror-image of each other. The text alignment within the elements is opposite, except for numerical fields, which remain left aligned in both language directions.

Multiple-Option, Yes/No, Negation, Negation Yes/No
  6 Combo-boxes, 6 Answer-labels, Question label, PgUp & PgDn buttons.
Single-Option
  6 Radio-buttons, 6 Answer-labels, Question label, PgUp & PgDn buttons.
Numeric Single-Option
  6 Radio-buttons, 6 text-fields, 6 Answer-labels, Question label, PgUp & PgDn buttons.
Numeric Single-Option w/1$^{st}$ Textual Answer
  6 Radio-buttons, 5 text-fields, 6 Answer-labels, Question label, PgUp & PgDn buttons.
Multiple Textual Questions
  6 Answer labels, 6 Text-fields (no check-boxes or radio buttons, no PgUp & PgDn buttons).
Multiple Numeric Questions
  6 Answer labels, 6 Text-fields, Question label (no check-boxes or radio buttons, no PgUp & PgDn buttons).
Multiple Single-Option-Questions
  6 Combo-boxes, Question label (no check-boxes or radio buttons, no PgUp & PgDn buttons).

Multiple Mixed Questions

Up to 6 questions in any combination of types 4–6 above.

System-Check Style 6 check-boxes, 6 Answer-labels, Question label, Question (large) Check-box, PgUp & PgDn buttons.

Referring back to FIG. 3, behavior 315 of the screen elements 310 is also preferably defined by the type property of the question. The following detailed example relating to a preferred embodiment of the present invention is not meant to be limiting, and statements therein are intended to refer to preferred alternatives only:

Screen Elements Behavior

A. Answer Screen-Elements

Each click event on one of the answers causes seven actions:

1. Changing the screen status of the component (e.g. changing a check-box from unselected to selected appearance).
2. Changing the Response property which corresponds to the clicked answer. There are 18 Response properties in the QC, which corresponds to the 18 answers which is the maximum number of answers the QC may present. This property stores the user's response to the answer: text or number in a Textual or Numeric answer, Selected or Unselected in Multiple or Single option, and Selected, Unselected, or Selected-Negative in Yes/No question.
3. Registering the Response to the TC's Virtual Template Record. In addition to step 2 above, the QC also registers the response in the TC's Virtual Template Record in memory, so that when flipping between two templates, during the same session, the system retains the user selection and responses to the different templates, and can refresh the QCs correctly (part of the Feed_Questions method).
4. Changing the Selected (and/or SelectedNegative) property of the QC. This property stores the number of answers which are currently selected, and is updated with each click (e.g. if the answer was unselected, a click causes it to be selected, and in addition sets the Selected property: Selected=Selected+1). In a Yes/No question, the Selected property stores the total number of answers that were selected, including answers which were Selected-Negative. In a Yes/No question, when an answer is SelectedNegative, it updates the Selected property, as well as the SelectedNegative property of the QC, which stores the number of answers which were selected negative.
5. In some cases—modifying the display of other screen elements (e.g. selecting a Single-Option answer, un-selects all other selected answers in the QC).
6. Causes a Click_Generate_Text method of the respective QLC which generates (or regenerates) text reflecting the selected answers.
7. Causes a Show_PopUp Method of the TDC, if the answer has a continuation (if the Continuation property corresponding to the selected answer is Null). The QC assigns the PopUpQuestion, and PopUpAnswer properties of the TC, and activates the TC Show_PopUp method.

Following is a description of the specific actions and screen behavior in the different question types. The Click_Generate_Text, and Show_PopUp methods are activated in all question types, and are therefore not mentioned repeatedly below.

1. Multiple-choice Question Type

Behavior is standard. If the check-box was selected, a click event causes it to be unselected, the corresponding Response property is set to Unselected, and the QC's Selected property becomes (Selected−1). If the check-box was unselected, a click event causes it to become selected, the corresponding Response property is set to Selected, and assigns (Selected+1) to the QC's Selected property.

2. Multiple-choice w/Negation

The behavior is the same as above, but when the Negation answer (the first answer in the QC) is selected, it un-selects all other check-boxes in the question, and accordingly sets their corresponding Response properties to Unselected. Selecting any other answer in the question, un-selects the Negation answer radio-button, and sets its Response property to Unselected.

3. Single-option Question Type

If the answer was unselected, a click causes it to become selected, causes all other answers to become unselected, sets their corresponding Response properties to Unselected, and sets the Selected property to 1. If the answer was selected, a click causes it to become unselected (note: this is a non-standard component behavior), sets its Response property to Unselected, and sets Selected=0.

4. Multiple Yes/No

In addition to the 2 standard statuses of the check-boxes (Selected and Unselected), answers in this type of question have a third status which is 'SelectedNegative'. In this status, the check-box appears empty (unselected), and the text (the label next to the check-box) appears in Strikethrough font, and red in color.

The Selected property stores the total number of answers selected, and the SelectedNegative property stores the number of answers which were selected negative (so the number of answers which were selected positive is=Selected minus SelectedNegative).

Behavior in response to a click is as follows:

If the answer was unselected, a click causes the check-box it to become selected, sets its Response property to Selected, and sets the QC's Selected property=Selected+1.

If the answer was selected, a click causes the check-box to become SelectedNegative: the check-box appears empty, the label font appears in Strikethrough and Red. The answer's Response property is set to SelectedNegative, the QC's Selected property remains unchanged, and the QC's SelectedNegative property=SelectedNegative+1.

This status of SelectedNegative is similarly achieved if the answer was unselected and was double-clicked.

If the answer was Selected Negative, a click causes its check-box to become unselected—the check-box appears empty, and the label font appears normal (black, and not in strikethrough). The answer's Response property is set to unselected, the QC's Selected property=(Selected−1), and the QC's SelectedNegative property=(SelectedNegative−1).

5. Yes/No Negation

When the negation option is selected, all other answers are set to unselected, and the Selected property is set to 1. Selecting any other answer, either as a Yes (Selected) or No (SelectedNegative), un-selects the Negation option.

6. Numeric Single-Option, & Numeric Single-Option w/$1^{st}$ Textual Option

Behaves same as Single-Option, with 5 additions:

Click on a Numeric field causes selection of the Radio-button of this answer, and triggers all corresponding actions (e.g. unselecting other selected answers).

Click on a Radio-button, moves focus to the Numeric field of this answer, and selects the content of this field (so that entering a number would automatically replace the existing contents of this field).

Click on a radio-button, or the numeric field of this answer, causes erasing all other numeric fields in the QC.

Clicking a radio-button or a numeric field, causes display of a very small Numeric Keypad underneath it (as shown in the bitmaps above).

If a number has been entered into one of the numeric fields, clicking on a radio-button of a different answer, causes copying the contents of this field into the numeric field of the newly selected answer, and erasing the contents of the previous numeric field (e.g. if the user entered '3 days', and then clicks 'weeks', then the 3 is copied to the field next to 'weeks' so as to say '3 weeks', and erased from the field next to 'days').

7. Multiple Numeric Questions

Clicking into one of the short text fields, causes display of a very small Numeric Keypad underneath it (as shown in the bitmaps above).

8. Graphic Regions Type

Note the X and Y coordinates of the click. Compare these coordinates to the RegionsBitmap (stored in the property by this name). This bitmap has various regions, each in a different color. Check color at the clicked coordinates—this is the region which was clicked. Loop over the XY coordinates(1–12) properties, to check which of the answers resides in this selected region (i.e. has the same color). The answer which matches is the selected answer, mark the respective Selected(n) property as selected.

9. Graphic Points Type

Note the X and Y coordinates of the click. Compare these coordinates to the 12 XY coordinates(1–12) properties, if the click occurred within the proximity of one of these points. The radius distance to check is user defined in the configurations options of the system. If an answer resides within this radius from the coordinates of the click, then it is selected. Mark the respective Selected(n) property as selected, and display a visible graphical marker (e.g. dot) at these coordinates.

10. Graphic Sketch Type

A click and drag action causes drawing a free-hand style line on the screen. If this line creates a closed shape, then it is treated as a region. If it is only a click, or a very short line (i.e. the used intended a click but his hand moved slightly), it is treated as a dot. Else, it is treated as a line. For each such event, draw the shape and insert it into the session document. Note the X and Y coordinates of the click. Compare these coordinates to the 12 XY coordinates(1–12) properties, if the click occurred within the proximity of one of these points. The radius distance to check is user defined in the configurations options of the system. If an answer resides within this radius from the coordinates of the click, then it is selected. Mark the respective Selected(n) property as selected, and display a visible graphical marker (e.g. dot) at these coordinates. In addition, select the regions in which the markings occur, as in a simple Graphic Regions type.

Referring back to FIG. 3, the apparatus of FIG. 3 also preferably comprises a paging mechanism 305 which preferably allows the user to flip to the next/previous set of answers which can be displayed at once, assigning the strings of the set of answers to be viewed from the properties 300 to the screen elements 310, and storing the user's selection of the of the current set of answers, and paging-status to properties 300.

The following detailed example relating to a preferred embodiment of the present invention is not meant to be limiting, and statements therein are intended to refer to preferred alternatives only:

Paging Mechanism

The QC supports display of up to 18 answers (except for certain types which are limited to 6, as specified above). The question record in the database supports 12 answers per question, but the QC supports display of an additional 6 answers, so that the user may temporarily add answers to the question during the session. Of these 18 questions, a maximum of 6 may be displayed on the screen at once. A paging mechanism is therefore needed, which manages the Page-Up and Page-Down actions, which is triggered by click event of the PgDn and PgUp buttons. This mechanism is designed to provide efficient and database-autonomous activity of the QC, and functions as follows:

The QC has only 6 sets of screen components for displaying maximum 6 answers at a time (e.g. 6 check-box and 6 answer-labels).

The QC has 18 Answer and 18 Response properties, corresponding to the potential 18 answers which the QC can support.

The Answer properties hold the text to be displayed in the Answer-labels, which are displayed next to the check-boxes or radio-buttons (in a similar manner to the caption property of standard check-boxes or radio-buttons).

The Response properties store the status of the user's response to that answer. This is different for different question types—for example: Selected and Unselected for single-option and multiple-option; Selected, Unselected, and SelectedNegative for Yes/No question type; and store the Value entered for a Numeric or Textual question.

Since only 6 out of the potential 18 answers are displayed at a time, the QC's PagingStatus property stores the six-answer-set number: when the first set of up to six answers is displayed, PagingStatus=1, when answers 7–12 are displayed PagingStatus=2, and when answers 13–18 are displayed PagingStatus=3.

During the Feed_Questions method of the TC, the TC feeds the 12 Answer property of each QC with the answers which that question has (which may be 12 or less answers). From this point onwards, the QC is autonomous from the TC and from the database, and doesn't need to access the TC or the database when paging up or down to display answers other than those currently displayed.

During the initial QC's Display_Question method, the QC checks the number of answers in the question, and feeds (up to) first 6 Answer properties to the 6 available Answer-Labels, and sets Visible property of the appropriate number of these labels to True (so that no 'blank' answer labels would be displayed). PagingStatus is set to =1.

When the user clicks to select or deselect answers, or enters numbers or text to a text-field on the QC, this response is stored in the Response property which corresponds to this answer.

When the PgDn button is clicked, the system performs the following actions:

Checks PagingStatus property

Displays the next set of up to 6 answers according to the PagingStatus property (i.e. if =1 display answers 7–12, if =2 display answers 13–18)

Displays the corresponding user responses, based on the corresponding Response properties (e.g. checks the response properties for the set of answers which is being displayed, and sets check-boxes, and radio-buttons as Selected, Unselected, or SelectedNegative, and/or displays text or numbers in corresponding text-fields in the QC).

Sets PagingStatus=PagingStatus+1

Checks NumAnswers property, to find out if there is another set of answer to be displayed beyond the current set (e.g. If PagingStatus now equals 2, and NumAnswers=15, this means that the current set of answers displayed is 7–12, and the question has a total of 15 answers, so there is another set of 3 answers to be displayed). If so, PgDn button remains Visible=True. If not (this is the last set of answers), then set PgDn.Visible=False.

When the PgUp button is clicked, the system performs the following actions:

Checks PagingStatus property

Displays the previous set of 6 answers according to the PagingStatus property (i.e. if =2 display answers 1–6, if =3 display answers 7–12).

Displays the user responses to these answers, based on the corresponding Response properties, as explained above.

Sets PagingStatus=PagingStatus−1

If PagingStatus property>1 (this is not the first set of answers 1–6), then PgUp button remains Visible=True. If PagingStatus=1 (this is the first set of answers), then set PgUp.Visible=False.

Figure 4:
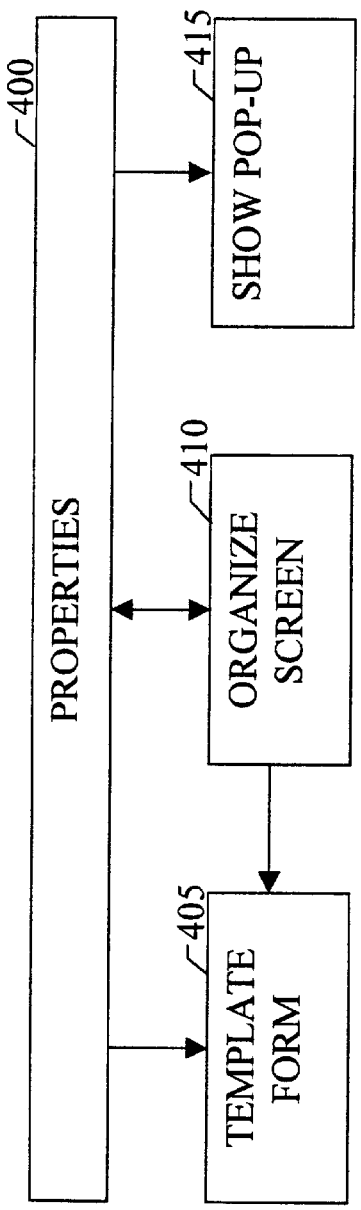
FIG. 4 is a simplified block diagram illustration of a preferred implementation of the template display component 220 of FIG. 2.

Reference is now made to FIG. 4, which is a simplified block diagram illustration of a preferred implementation of the template display component 220 of FIG. 2.

The apparatus of FIG. 4 comprises properties 400 which preferably store all parameters needed for the display of the template (e.g. template name, type, format parameters, etc.), and ID's of the questions belonging to the template.

The apparatus of FIG. 4 also preferably comprises a template form 405 which preferably comprises a form (VBA® form in the MICROSOFT® Office implementation) upon which the questions are displayed. The template form 405 preferably contains a paging mechanism to flip through sets of questions, when there are more questions than can be viewed at once.

The apparatus of FIG. 4 also preferably comprises organize screen 410, which is a method which assesses the number of questions in the template, creates accordingly sufficient instances of QDC 225 of FIG. 2, calculates the dimensions and location of the questions according to various parameters, and assigns appropriate values to these QDCs 225. Some of these calculated values are stored back to properties 400.

The following detailed example relating to a preferred embodiment of the present invention is not meant to be limiting, and statements therein are intended to refer to preferred alternatives only:

Organize Screen Method

The Organize Screen method calculates (in a manner described below), the number of questions which can be displayed on the screen at once, their dimensions (height & width), location on screen, and logical sequence (which is vital for correct display of questions and text generation). It also includes a 'Stretch' function which changes the size of the elements on the screen according to resolution and window size. Preferably, a commercial OCX is bought and used for this purpose. The function takes into account the fixed minimal size of the QCs, calculates how many fit on the screen, and then resizes them accordingly.

Method Steps:
1. Check window-size and screen resolution. Check properties: TopMargin, BottomMargin, SideMargin, MinQuestionHeight and MinQuestionWidth.
2. Calculate appropriate Question dimensions, based on the above properties, and determine the number of questions that fit on the screen.
3. Check Language property, and according to the language direction (all languages except Hebrew and Arabic are left-to-right), calculate the correct sequence of questions on the screen. (i.e. fit as many questions as you can across, in the direction of the language, then next row, etc.).
4. Create sufficient number of QC components, as a control-array, according to the above.
5. 'Position' the QC's correctly on the screen, by assigning appropriate values to their dimensions and position properties. Assign their Identity properties, according to their correct screen sequence (so that they 'know' where they are).

The exact size of the question (minimum dimensions), and length of the question and answer fields both in the database, as well as in the editing mode of the question, is dependent on how many questions naturally fit on the screen. A baseline standard may be 600×800 resolution, with 4 questions in a row, and 3 rows on the screen, and where each question has 6 answers and a Heading. The database and edit KB fields should be limited accordingly.

Referring back to FIG. 4, the apparatus of FIG. 4 also preferably comprises show pop-up 415, which preferably comprises a method which is used to display a pop-up of one or more questions. It calculates the desired screen location of the pop-up, and then creates positions and sets dimensions of QDCs 225 accordingly.

The following detailed example relating to a preferred embodiment of the present invention is not meant to be limiting, and statements therein are intended to refer to preferred alternatives only:

Show PopUp Method

When an answer is clicked, which has a continuation (i.e. its respective ContinuationID(n) < > null), its QC assigns its Identity property to the PopUpQuestion property of the TC, and the number of the answer which triggered the pop-up (1–12) to the TC's PopUpAnswer property, and its ContinuationID(n) property to the TC's PopUpID property, and then activates the TC's Show-PopUp method.

Method Steps:
1. Look-up the template in the Multi-Dimensional-Array in memory, according to the PopUpID property.
2. Calculate the screen location of the popup, according to the PopUpQuestion and PopUpAnswer properties, and the calculations done in the Organize_Screen method (screen resolution, language, window size, etc.), and number of questions in the pop-up template to be displayed. This is done according to the following considerations (3–6):
3. A single popup is to be located to the right of the Question triggering the popup if possible, to its left if not possible (the reverse in right-to-left languages). The Question label of the popup is at the level of the triggering answer if possible (if the triggering question is at the bottom of the screen, this may not be possible).
4. A single popup is always at the width of a standard question, but its height is dependent on the number of answers in it.
5. A multiple popup is displayed as a screen which contains the appropriate number of questions. The header of the screen (appears as the blue stripe at the head of standard WINDOWS® screens), contains in white, the answer which triggered the pop up. TC needs to create this window, at the right dimensions, according to the number of questions to be displayed in it.
6. Multiple popup is displayed to the left of the triggering answer if possible. Else, positioned such that if possible it at least does not cover the triggering question.
7. Create the required number of QCs needed to display the pop-up questions. These QCs are created as a component array, which continues the array of the QCs in the basic template, and their Identity property reflects their number in the array. For example, if there are 12 questions in the basic template, and the popup has 2 questions, then these would be created as QC(13), and QC(14), and their Identity property would be set to 13 and 14 respectively.

This sequence is important for the text generation process.

8. Position questions on the screen according to the considerations mentioned above.

Feed the QC's their data properties, and activate their Display_Question method.

Figure 5:
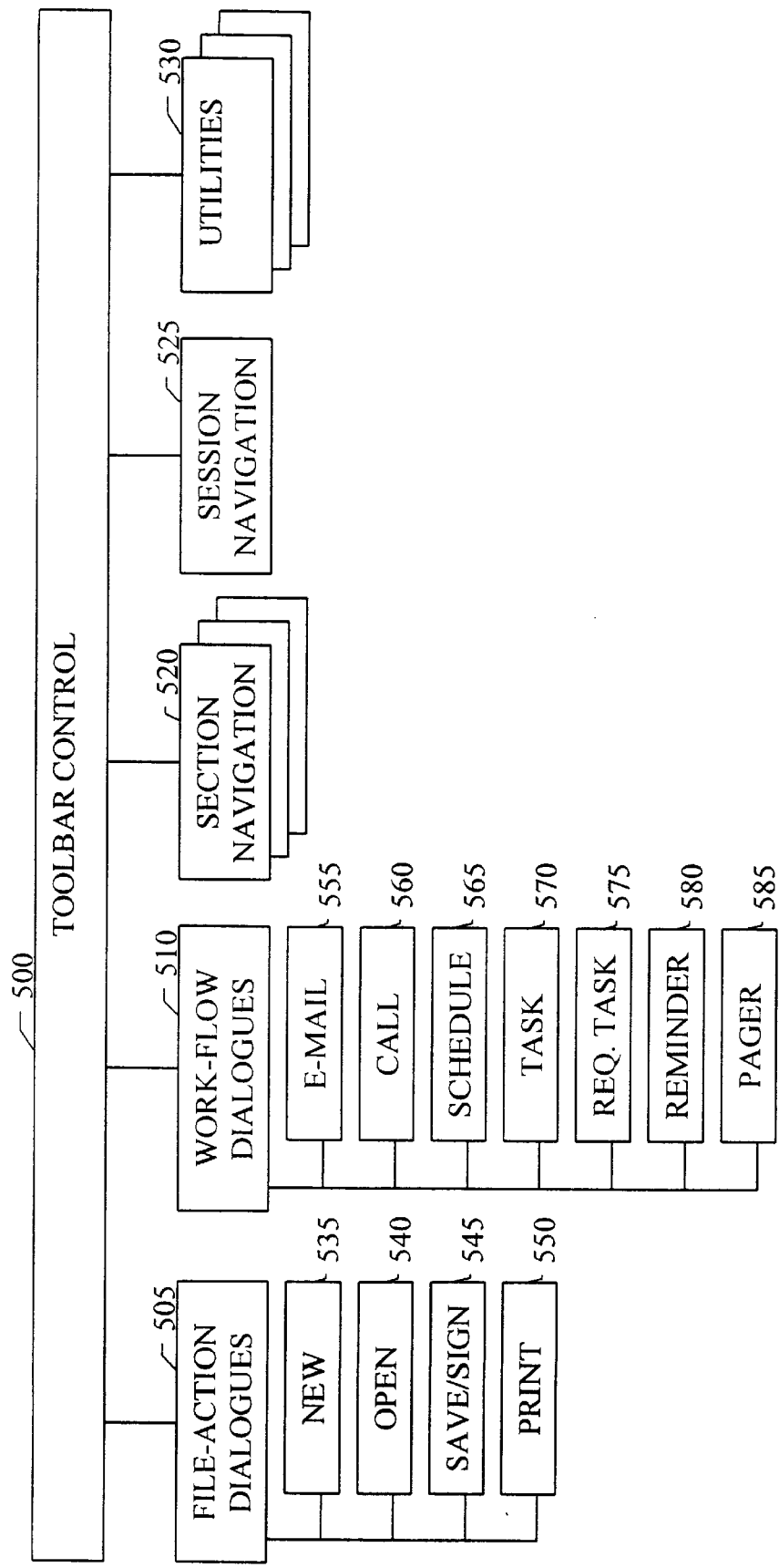
FIG. 5 is a simplified block diagram illustration of a preferred implementation of the navigation display component 215 of FIG. 2.

Reference is now made to FIG. 5, which is a simplified block diagram illustration of a preferred implementation of the navigation display component 215 of FIG. 2. The apparatus of FIG. 5 preferably comprises the elements described below.

A toolbar control 500, the structure of which is typically application dependent, preferably allows the user to navigate to various parts of the customer record document 115, and activate various dialogue screens, and utilities described below.

File-action dialogues 505 are preferably invoked by corresponding buttons on the toolbar, which allow the user to create a new customer record 535, open an existing one 540, save & sign a session 545, or print parts of the customer record 550.

Workflow dialogues 510 are preferably invoked by corresponding buttons on the toolbar, which allow the user to perform various workflow actions such as, for example: send E-mail 555, log a call 560, schedule an appointment 565, add task 570, request task 575, set reminder 580, and send pager 585.

Section navigation 520 preferably comprises a set of buttons, which jump to various sections of the customer record documents 115. Their number, sequence, identity and icons are application dependent.

Session navigation 525 preferably comprises a mechanism made of a combo-box and 4 buttons which allow the user to jump to previous-sessions, images, scanned documents, or letters.

Utilities 530 preferably comprises a group of buttons which invoke various utilities.

The following detailed example relating to a preferred embodiment of the present invention is not meant to be limiting, and statements therein are intended to refer to preferred alternatives only:

Navigation Display Component

The Navigation Display Component (NDC) is a Toolbar control, which allows the user to activate most of the functions needed operate the application. As its name suggests, its main function is to provide an easy method to create-new, open, close the customer record document 115, and to 'jump' to its various parts. Technically, in the PC version, it is a simple MICROSOFT® Word toolbar.

In order to maintain a solid three-tiered architecture, this component is purely a display control. All the functions called by it, are performed by a different control, the Navigation Logic Control, which is described below. Retrieval and manipulation of data access needed for its display (e.g. populating combo-boxes on it), is handled by the Data Access Component described below. This section will therefore briefly describe appearance of the buttons in the control.

The exact format of the toolbar is application dependent, data-driven, and may be modified by the user. The Application record in the knowledge-base holds various parameters which effect which buttons and options appear on the toolbar etc.

When a record is opened, or is switched to, in MICROSOFT® Word, it triggers the NDC, which checks if this is a regular MICROSOFT® Word document, or if it is based on one of the templates which belong to the application (there may be several applications, e.g. User's record, Ayurvedic record, etc.), each with their own MICROSOFT® Word template. So the NDC appears only when a Customer record (or other similar application) is viewed, but not when other regular MICROSOFT® Word files are viewed.

Preferably, the MICROSOFT® Word Template, or each document, contains a field 'ApplicationID' which indicates the application to which it belongs. The NDC checks this field when opening or switching to a MICROSOFT® Word document, and acts accordingly. The NDC appears only if it is an application file, and not if it is a regular MICROSOFT® Word document (i.e. the field ApplicationID exists). The buttons on the NDC, their sequence, icons, etc., are configured automatically according to the ApplicationID in the document, which points to the Application record in the knowledge-base that stores this configuration information.

The buttons on the toolbar are organized in functional groups (i.e. group of buttons which share a similar type of function), according to the MICROSOFT® convention. Following is a description of the buttons in each of these groups.

1. File Action Dialogues:

File Action Dialogues include 'New Customer', 'Open Customer', 'Sign & Save', and 'Print' buttons. These use the standard MICROSOFT® Office icons. Note: although these buttons are similar to the standard MICROSOFT® Word ones, they bring up non-standard dialogues (described below in the 'File Action and Workflow Dialogues' section). However, this is dependent on the MICROSOFT® Word document which is currently being viewed. When a non-application MICROSOFT® Word file is viewed, NDC does not appear, and these buttons bring up the standard dialogues.

2. Section Navigation:

Section Navigation includes group of buttons for jumping to various Sections of the record. A clicked button remains depressed until another button is pressed. Clicking it while it is pressed does not un-press it. The first button in this group is pressed by default, when opening a record. The number of buttons in this group, and their icon and action (i.e. to which section in the document they are associated), is defined by the Application record in the KB.

When displaying itself, this component checks the Application record in the knowledge-base database, for the section structure of the record, and displays the appropriate number buttons, one for each section, in the proper sequence, and with the bitmap specified. The TipText property for each button is set to the name of the section.

The first icon in this group is 'New Session'. Its icon is a 'page' with the star on its left upper corner (using the MICROSOFT® Access metaphor for a new object—form, table, etc.).

The last icon in this group is 'Browse Previous Sessions'. It jumps to the 'Previous Sessions' section of the record. The actual navigation between the different sessions, is performed by the Session Navigation group discussed below. Its icon shows three overlapping pages representing multiple sessions.

Five sections which frequently exist in customer record documents 115 (and other applications), and for which icons need to be found/prepared are:

1) Status Sheet (includes summary information of the record, problem-list, medication list, etc.). Creative Icon should be designed/selected accordingly.

2) Demographics. Icon of face in profile.
3) Habits. Icon of a burning cigarette.
4) Lab Tests. Icon of a table/matrix.
5) Vital-Signs (graph of blood-pressure, temperature, etc.). Icon of ECG.

3. Session Navigation

This group includes three buttons, and to their right, one combo-box. The buttons allow the user to select navigation of:

1) Scanned documents (icon showing 'one page')
2) Images (icon showing 'lungs in x-ray')
3) Previous Sessions (icon showing three overlapping pages, symbolizing multiple session).

The combo box shows a list of hyperlinks to the sessions, or scanned documents, or images, depending on which button is pushed. This list is calculated by the TLC, when a customer record document 115 is opened.

When one button is pressed the other two buttons are not pressed. The default is the 'Sessions' button. Pressing one of the buttons causes the 'Previous Sessions' button of the previous group to be pressed.

If the record is configured such that it does not include images or scanned documents, but only the MICROSOFT® Word document (which is frequently the case), then the three buttons do not appear, only the combo-box. In this case, the 'Previous Session' button works directly with the combo-box.

The behavior of this combo-box is not standard. When typing letters into its search-field (i.e. its text-field), it narrows down the list in the following manner:

Items in which any word begins with this string, not necessarily the first word, are included in the filtered list (e.g. typing Pain would cause item 'Chest Pain' to be included).

Items which contain several words, and in which the entered string holds the first letter of several consecutive words in the item (not necessarily all words) are included (e.g. typing MI would cause the item 'Myocardial Infarction' to be included).

The letters in the search string appear, e.g. in bold and dark green in all the items in the list, so that the user may easily see why they were included.

The response of this mechanism must be instantaneous, and checked against very large lists (100,000 items). It will be used in various places in the system, and therefore must be technically sound.

4. WriteSession Navigation

The Write-Session Navigation group deals with actions required when writing a new session. It includes up to 5 buttons, and a combo-box. The combo-box displays a list of all available templates, for the user to select which template to work with. The buttons allow the user to select a sub template if this template has sub templates.

The combo displays at the top of the list, above a separating line, the templates previously used by this customer, or templates which appear in his current Problem List (which of these options this is defined in the Options configuration). Below the separating line the rest of the templates are listed alphabetically (this is similar to the way recently used fonts appear in the font combo-box in MICROSOFT® Word). Selecting from the list is done using the mechanism described above for the Session combo.

Templates may exist with or without sub-templates. If the selected template is without sub-templates, then the buttons are grayed-out. The number, sequence, identity and icons of the sub-templates is application dependent, and template independent (i.e. all templates in an application which have sub-templates will have the same sub-templates; different applications may support different sub-templates). This information about the sub-templates is stored in the Application record in the KB. The template record indicates if it has sub-templates, but not their name, icon, etc. Thus the NDC checks the application record in order to configure the buttons correctly, and the template record in order to decide if the buttons should be grayed-out or not.

When there are sub-templates, one button is always pressed. Pressing one button releases a second button. Clicking a pressed button, does not release it.

When a template with sub-templates, is opened for the first time in a session, the button for the first sub-template is pressed. When returning to a template visited before in the same session (i.e. flipping back and forth between templates), the template opens on its last-viewed sub-template.

When switching to a template not previously visited, the template opens on the same sub-template as the sub-template viewed in the previous template (e.g. when viewing the Objective sub-template of the Fever template, and switching to Cough template for the first time, it opens on its Objective sub-template).

The link between this mechanism and both the templates being used, as well as the location in the Session document being viewed, is handled by the Navigation Logic Component (NLC), described later.

5. Insert Object

The Insert Object group includes only one control, a combo-button (i.e. a button, with a small pull-down arrow next to it, same at the standard Font Color button in MICROSOFT® Word). When the pull-down arrow is pressed, a pull down menu appears with the Icons of the different objects which may be inserted into the current session document, which include Picture, Bitmap, Audio, Video. Once a selection is clicked, it performs the action of inserting the object at the location of the cursor, and becomes the default button image, so that future insertions of the same type of object will require only one click.

6. Workflow Actions

The Workflow Actions group supports actions, represented by respective buttons, which support workflow issues relating to the customer whose record is currently being viewed. These buttons include: Call, Send E-Mail, Schedule Appointment, Add Task, Request Task, Set Reminder, Send Pager.

The icons for the first five buttons (Call, E-mail, Appointment, Task, and Request Task), are the standard Outlook icons. The icons for Reminder and Pager needs to be found/designed (for Pager—an icon showing a pager 'beeping' from its right upper corner, for Alert—e.g., a knot on a finger). Clicking each of these buttons activates respective workflow dialogue screens, which are described below.

7. Utilities

The Utilities group of buttons on the toolbar relates to general actions in the record, i.e. actions which do not relate to the currently open record (the actions are described in the TLC section). These buttons include:

1) Reference (icon shows books)
2) Help (standard Help icon)
3) Options (icon: maybe showing tabs)
4) Knowledge-base Editor (VB's toolbox icon)

File Action and Workflow Dialogues

Activated from buttons on the TDC are 4 File Action, and 7 Workflow dialogue-screens, which are described in this section. These dialogues are similar to to the office standard ones, but with some modifications which are specified here.

The File-Actions dialogues are similar to the standard MICROSOFT® Word dialogues, but with the differences mentioned below. The Workflow dialogues are created using MICROSOFT® Outlook Forms, using Outlook's Object Model, and VB-Script, and should require very little programming. The following 'screens' are preferably created using the MICROSOFT® Outlook forms, so that they can be easily modified by users without any programming.

This section describes the display of the dialogues and not their actions. The functions carried out by the Workflow and File Action dialogues, are handled by the Workflow Module, and the Navigation Logic Component respectively.

I. Create New Record Dialogue

Clicking the 'New' icon on the NDC, brings up a Yes/No/Cancel Message-Box "Create a new Customer Record?" Click 'No' to create a regular MICROSOFT® Word document". Otherwise, there wouldn't be a simple way to create a regular MICROSOFT® Word document while working on Customer one.

II. Open-Record Dialogue

Shows a list of customers, organized in 'folders', using MS metaphor for directory folders, but in truth reflecting the category the customers belong to in the database (DB).

The 'Advanced' button leads to a simple search screen, similar to the one on MICROSOFT® Word, but in the 'Property' field, there is in additional to the MICROSOFT® Word fields, also a list of all the user defined fields.

The mail list of files displayed includes the following fields: Name, ID, Age, Sex, Provider, Modified (date last modified).

The list-display mechanism is exactly as in the standard dialogue, allowing sorting by clicking the head of a column (e.g. sort by date last modified by clicking on the head of that column).

The filtering mechanism is slightly different. Instead of the 'File' and 'Text or Property' search fields, and the 'File type' combo-box, are two fields: a 'Filter by' combo-box, and a 'Contains' Combo-box. The 'Filter By' combo, includes all the fields displayed in the list, plus a 'Full text search' option (the first option and default is 'Name'). The 'Contains' combo is empty, and the user types the search string into it. The combo list shows several previous entries (similar to the standard 'Text' combo). When no one folder is open, all folders are searched and displayed. The 'Last Modified' combo remains as is.

III. Sign Session Dialogue

A simple dialogue which shows 4 radio-button options, listed below, and OK/Cancel buttons. The first option is the default.
1) Save and sign session, close record.
2) Save session without signing, close record.
3) Save and sign session, don't close record.
4) Save session without signing, don't close record.

IV. Print Dialogue

Displays a simple OK/Cancel dialogue which presents the following single-option selections, indicating what should be printed. One of the options is selected by default, depending on where in the record the Print button was pressed:
1) Current session—the default when clicked from current session view.
2) Session, prescriptions, letters, orders
3) Prescription—the default when
4) Scanned document—default when viewing attached ACROBAT® PDF file
5) Selection—when part of the record has been selected
6) Entire record without images—the default when not any of the above
7) Entire record including images
8) Pages__ to __

V. Send E-Mail

The basic dialogue is like the standard one. However, the 'Select Names' dialogue which pops-up when clicking the 'To . . . ' or the 'Cc . . . ' buttons, is slightly different. The combo-box at its upper right hand corner ('show names from') should have several options which effect the list of names displayed: (a) Medical Team—shows a list of all caregivers in the local clinic, (b) Consultants—shows remote caregivers, and (c) Contacts/Outlook Phonebook—the 'regular' options. The default is 'Medical Team'. At the head of all three lists (or at least the first two) is the customer, preferably in bold.

A combo box 'Attach:' has the following options: Attach entire record, Attach last encounter, Attach selection, Attach letter, or Hyperlink to record.

Underneath, there are two 'Attach Options' check-boxes: 'Include scanned documents', and 'Include embedded objects'.

VI. Call

Places a call to the customer using the standard Outlook dialogue, exactly as it appears and functions when placing a call from the Contacts screen in outlook (including the built-in combo which allows quick glance at the different numbers the contact has, the Redial option which shows last numbers called, and the dialogue which pops-up if you click the button itself).

The only difference is that on the 'New Call' dialogue, if the 'Create new Journal entry when starting call' option is selected (this is the default), then rather than starting an Outlook Journal entry, it starts a new Session in the Customer Record, and opens on a Template called 'Phone Session' (the knowledge-base will have a specific template designed for phone sessions).

VII. Schedule Appointment

The functionality is based on Outlook's Appointment Scheduling screen, but with the following differences:
1. The meeting to be scheduled is with the customer, and with the User, so there is no need to select these participants.
2. With the standard dialogue, it is necessary to send an e-mail invitation, which is very cumbersome. There should be no error message if there are no e-mails for participants, just a check-box which is empty on default, and which gives an option to send an invitation.
3. Assigning resources: the list of resources should be separate (when you are looking for a resource) it should not be with all the other contacts. There should be an easy way to add a resource. And, as above, a resource may not have an e-mail (e.g., a table and a meeting-room usually do not).

VIII. Add Task

Unlike the other Workflow actions, this one works not only with outlook, but also with a List in the customer MICROSOFT® Word document record. This list is handled using the List type QC mechanisms, and has in addition to the Subject column, additional columns: Start date (automatically records the date the task is initiated), due date, priority, and 'In charge' which is described in the next section.
1. Task Subject should include the Customer Name followed by a colon,
2. A combo-box, next to the subject field, allows the user to select from a list of frequently used customer tasks. Selecting an item adds it to end of the Task Subject (e.g. "John Doe: Pending lab results"). The user may obviously also modify the Subject field directly (and if he does so, it doesn't effect the combo).
3. This combo-box appears minimized next to the Subject line: its width is such that only the arrow-down is visible. The width of the pull down is much wider so that it can contain 5–6 words. On 'Change' event in the combo, the subject line changes accordingly.
4. Due Date
5. Priority
6. Check-box: 'Update my general Task List'. If it is clicked then the task is created and stored to my Outlook Task list, as well as to the Customer's Record Task List. If not, it is recorded only in the Customer record.
7. When right clicking on the combo, an option in the popup-menu is 'Edit List', which brings up a simple dialogue which allows the user to add items or remove items from the list.
8. In outlook, in tasks, create 'Customer Tasks', which is used to see the Tasks without the reminders (i.e. filters for Categories=CPR, but < > Reminder).

IX. Request Task

The goal of this form is to allow the user to request a task from the customer or other team members. It is generally very similar to the Add Task form described above, with the following differences:
1. There is an additional 'To . . . ' button and field before the other fields mentioned in the previous section. When pressed the 'To . . . ' button displays the same screen displayed by the E-Mail dialogue described above (with a list of other care-givers and the customer at the top of the list).
2. The person to whom the task was assigned, appears in the 'In Charge' column, in the copy of the task which appears in the customer record (described in the previous section).

X. Set Reminder

The reminder mechanism, is technically a Task with its Reminder property set on, and to the date the reminder is required. Its Category is set to 'Reminder', so that a different view can be designed for viewing regular tasks, as opposed to Reminders (which usually do not need to be viewed).

It is similar to the Add Task form, with the following differences:
1. Below the subject field and frequently selected tasks combo-box, there are date and time fields.
2. No check-box option ('Update my general Task List'), since the reminder is not noted in the customer record, but only to outlook. Also, no 'Due Date'
3. Category is set automatically to 'Reminder'.

XI. Send Pager

Similar dialogue to the Send E-mail dialogue. All this does is send a pager to 'E-Mail Enabled' Pagers (i.e. pagers which have an e-mail address, such as Skytel in the US). The 'To . . . ' lists (Local Staff, Consultants, and All) display only people which have e-mail pagers (create a user defined field in Outlook called 'Pager' Y/N, and filter according to it).

Figure 6:
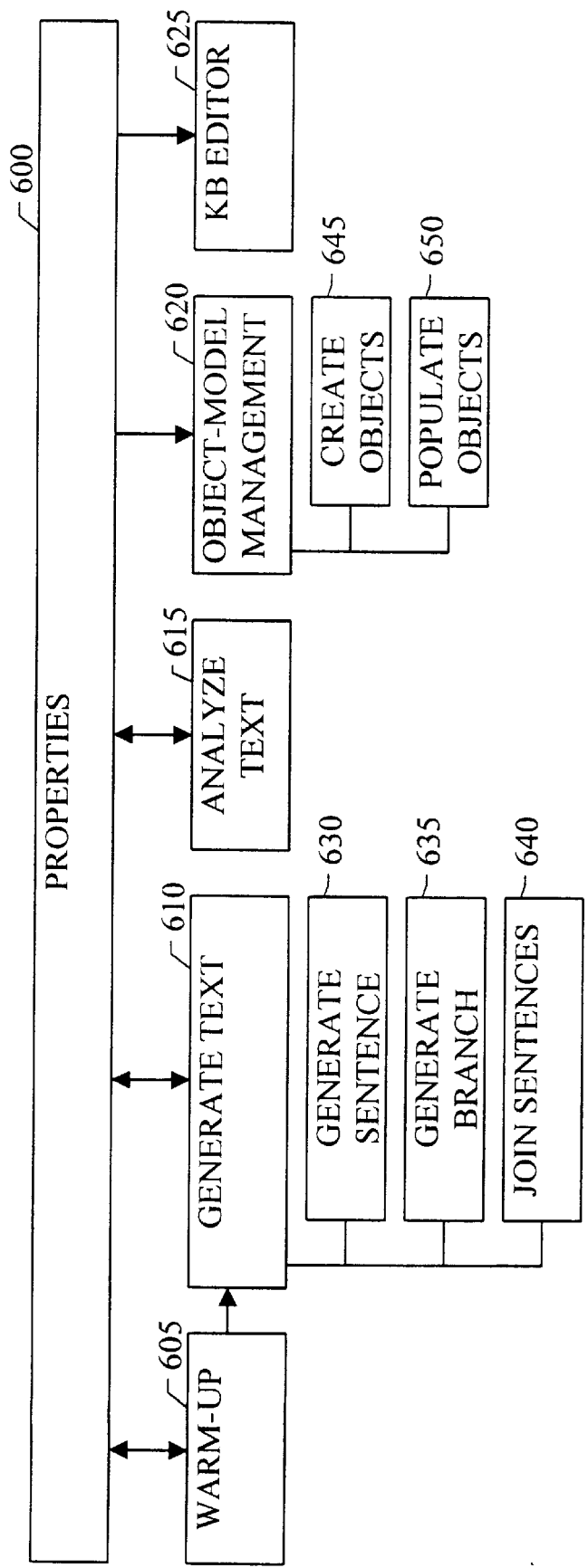
FIG. 6 is a simplified block diagram illustration of a preferred implementation of the question logic component 240 of FIG. 2

Reference is now made to FIG. 6, which is a simplified block diagram illustration of a preferred implementation of the question logic component 240 of FIG. 2. It will be appreciated by persons skilled in the art that the apparatus of FIG. 6 is in some respects central to a preferred embodiment of the present invention. As indicated in FIG. 2, the output text generation mechanism 25 of FIG. 2 preferably comprises multiple instances of the question logic component 240, which is the apparatus described in the present drawing in a preferred implementation.

The apparatus of FIG. 6 preferably comprises warm-up 605, which preferably comprises a method performed by a question logic component 240 of FIG. 2 once, prior to the actual text-generation, and in preparation for it, so that calculations as to which sentences can be connected, will not slow down the text generation process. A preferred implementation of the warm-up 605 is described in reference to FIG. 12.

The apparatus of FIG. 6 also preferably comprises generate text 610, which preferably comprises a complex mechanism, by which the question logic components 240 of FIG. 2 generate sentences 630, generate branches 635 and join sentences 640; a preferred implementation of this process is further described in FIGS. 11–17B.

The apparatus of FIG. 6 also preferably comprises analyze text 615, which preferably implements a process by which text which was generated by the text-generation mechanisms (e.g. text of previous sessions), is analyzed into the questions and answers which caused its generation. A preferred embodiment of analyze text 615 is described below with reference to FIG. 19.

The apparatus of FIG. 6 also preferably comprises object-model management 620, which enables the decision support mechanism 50 of FIG. 1A. This apparatus preferably comprises procedures and structure which allow the application to create 645 and populate 650 an object-model which reflects the structure of the knowledge-base, so that queries alerts and conditions may be written that manipulate the customer record document 115 content programmatically. A preferred embodiment of object model management 620 is described below with reference to FIGS. 20A and 20B.

The apparatus of FIG. 6 also preferably comprises KB editor 625, which is preferably comprised in the no-programming KB-editor mechanism 45 of FIG. 1A. The KB editor 620 preferably comprises procedures and structure which allow the application to create and edit questions, as part of the general knowledge-base editing process. A preferred embodiment of the knowledge-base (KB) editor 625 of the question logic component is described below with reference to FIG. 26, with special reference to question editor 2605 of FIG. 26, and its dependent elements 2620, 2625, 2630, 2635, and 2640 of FIG. 26.

The following detailed example relating to a preferred embodiment of the present invention is not meant to be limiting, and statements therein are intended to refer to preferred alternatives only:

Question Logic Control

Introduction

Preferably, behind each Question Display Component (QDC), and corresponding to it, is a Question Logic Component (QLC) unit which performs the 'magic' of generating the text according to the user's selections (which the user made on the corresponding QDC). The text it generates is dependent on parameters which it receives (e.g. Type, Language, etc.).

In addition to generating its own sentence, it also works in cooperation with neighboring QLCs, to determine if and how the sentences can be combined into compound sentences. In addition, it is capable of analyzing text previously generated by the system, to determine which answers to which questions caused the generation of this text.

It generates text in multiple languages, including languages which are right-to-left as well as left-to-right in their direction. In Edit mode, it modifies the question, its answers and other properties (in the knowledge base), according to the user's selection. The following sections describe the structure and function of this control.

| Properties | | |
|---|---|---|
| Basic Properties | | |
| 1. Question ID | Short | Optional |
| 2. QuestionType | Byte | Currently about 10 types, in the future, nore more than 99. |
| 3. Question | 20 | Text of the question |
| 4. QuestionGroup | Short | The Group to which this question belongs. Used for the Check_Redundancy method. |
| 5. Answers(1–18) | 25 | 12 fields with the text of the answers |
| 6. Subject | 25 | Used for comparing sentences to check if they may be joined, and to generate the SubjectlessPrefix and SubjectlessSentence. |
| 7. Prefix | 50 | Prefix string to used to generate the sentence |
| 8. Suffix | 20 | Suffix string to used to generate the sentence |
| Continuation Related | | |
| 9. ContinuationType | Byte | Options: InsertBefore, InsertAfter, Replace, Independent, ForceJoin, StringJoin, StringTruncate |
| 10. Continuation (1–12) | Bool | Indicates if the answer's continuation is a single question, or several qustions (a 'template'). |
| 11. ContinuationID (1–12) | Short | ID of the question or the template which is the continuation |
| Connection Related | | |
| 12. ConnectType | Byte | Options: Unconnected, ConnectString, TruncateString, or ForceConnect |
| 13. ConnectString | | A string used to force connection between two sentences, either adding it between them, or subtracting it from the second sentence. |
| Language Related | | |
| Language | Byte | |
| LanguageDirection | Bool | Options: RightToLeft, LeftToRight |
| TrunkLocation | Bool | Options: TrunkBeforeAnswers, TrunkAfterAnswers |
| SubjectLocation | Bool | Options: SubjectAtBeginning, SubjectAtEnd |
| ConnectingWord | 7 | Includes spaces before and after word |
| Output Format | | |
| 14. GeneralLayout | | Options: ParagraphStyle, FormStyle |
| 15. InsertFields | Bool | |
| 16. AnswerLayout | | Options: NextToQuestion, TabFromQuestion, HangingIndent, OnNewLine, Table |
| 17. QuestionsLayout | | Options: OnSameLine, OnSeparateLines |
| 18. CommaSeperated | T/F | |
| 19. GroupHeadBold | T/F | |
| 20. QuestionBold | T/F | |
| 21. AnswersBold | T/F | |
| 22. HeaderNewLine | T/F | |
| Question-Type Related | | |
| Numeric | | |
| 23. OneUnit | | |
| 24. TwoUnits | | |
| 25. PleuralUnits | | |
| 26. SeveralWord | | |
| Yes/No | | |
| 27. NegPrefix | | |
| 28. NegConnector | | |
| 29. NegConnectWord | | |
| Mixed | | |
| 30. Type(1–16) | | |
| Graphic | | |
| 31. BackgroundBitmap | | |
| 32. RegionsBitmap | | |
| 33. Xcoordinate(1–12) | | |
| 34. Ycoordinate(1–12) | | |
| Gender Dependant | | |
| 35. FemPrefix | | |
| 36. FemSubject | | |
| 37. FemNegPrefix | | |
| 38. FemNegConnector | | |
| Internal TG Parameters | | |
| 39. NumQuestions | | Number of questions on screen. Calculated and fed by TC. |
| 40. NumAnswers | | Number of answers on screen. Calculated and fed by TC. |
| 41. Selected | | Number of answers selected by the user (including SelectedNegative in Y/N questions). Updated with each click event |
| 42. SelectedNegative | | Number of answers SelectedNegative in Yes/No questions. Updated with each. click event. |
| 43. ConnectingWord | | Language (& sometimes Question) dependant. Calculated during WarmUp by the QC. |
| 44. Identity | | The sequence-number of the QC on the screen, which also identical to the number of the QC's array number (e.g. the first QC is QC(0), and his Identity property = 0). Calculated by TC during Organize_Screen. |
| 45. BeforeMe | | Number of QCs beforethis QC (me), which belong to the same potentialsentence (i.e. have an identical Subject). Calculated by the QC during WarmUp. |
| 46. AfterMe | | Number of QCs afterthis QC (me), which belong to the same potentialsentence (i.e. have an identical Subject). Calculated by the QC during WarmUp. |
| 47. SentenceLeader | | Identity number of the QC which 'leads' the sentence to which this QC belongs (i.e. the first QC in 'my' sentence in which one or more answers is selected). This indicates to the QC if it is the leader and therefore re-sponsible for creating the compound sentence, or if not, to which QC it needs to 'report' changes in its status. Default = 0. Updated with each click. |
| 48. ActiveSegments | | Number of QCs which belong to same sentence, and in which there is currently one or more answers selected. Updated with each click. Identity number of the QC, which this QC is a continuation of. Assigned by TC during Show_PopUp. |
| 49. ReferredBy | | Identity number of the QC, which this QC is a continuation of. Assigned by TC during Show$_{13}$ PopUp. |
| 50. SentenceNumber | | Number of the sentence in text created by the template. Used for text analysis. |
| TG Receptacles | | |
| 51. SubjectlessPrefix | | Calculated during WarmUp, used for connecting sentences. |
| 52. Subjectless-Sentence | | Contains the text of the sentence, without its subject, so its prepared to be connected to a previous sentence with a similar subject. |
| 53. SimpleSentence | | The sentence generated directly from the question. |

| Properties | | |
|---|---|---|
| 54. FinalSentence | | Contains the compound sentence, made of several simple sentences joined. |

Figure 7:
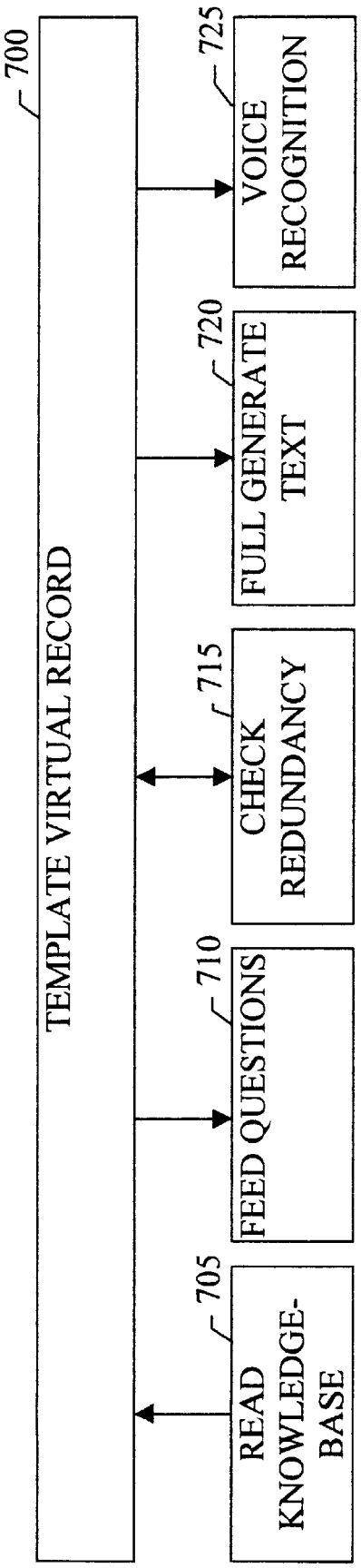
FIG. 7 is a simplified block diagram illustration of a preferred implementation of the template logic component 235 of FIG. 2.

Reference is now made to FIG. 7, which is a simplified block diagram illustration of a preferred implementation of the template logic component 235 of FIG. 2. The apparatus of FIG. 7 preferably comprises the elements described below.

The following detailed example relating to a preferred embodiment of the present invention is not meant to be limiting, and statements therein are intended to refer to preferred alternatives only:

Template Logic Control

Introduction

The Template Logic Component (TLC) works together with one or more Question Components (QCs), to display a template on the screen, store the user responses and generate the corresponding text. Its main functions are:

1. Retrieve the knowledge-base data of the template, which are stored in several different database tables, and unites them in memory into a 'virtual template record' multi-dimensional array (Read_DB method).
2. Creates sufficient number instances of QC units required to display the questions in the template.
3. Organizes the QCs on the screen, by means of calculating and feeding them their appropriate dimensions, location, and sequence properties, depending primarily on the screen resolution, window size, and language (Organize_Screen method).
4. Organizes and feeds the data from the knowledge-base to the QCs, by assigning values to their various properties (Feed_Questions method).
5. While retrieving data from the knowledge-base, it retrieves data in the appropriate language (from the appropriate language-table), thereby enabling the multi-lingual capability of the system.
6. Presents to the user a list of templates which exist in the knowledge-base, with several filtering mechanisms, which allow the user to select the desired template.
7. When switching between templates, it stores in memory the data of the various templates currently in use, as well as the user responses in these templates, facilitating rapid switching between templates.

The following sections describe in detail these methods and functions.

| Properties | | |
|---|---|---|
| Basic Properties | | |
| 1. TemplateID | Short | |
| 2. TemplateType | Byte | |
| 3. QuestionID(1–12) | Short | |
| 4. EditMode | Bool | Default = False. When = True, the template functions in Edit mode, allowing editing of the template. |
| 5. Language | Byte | Options: English, French, German, Italian, Spanish, Hebrew, Arabic, Hindu, Japanese, Portugese, Russian. Default = English. |

| Properties | | |
|---|---|---|
| 6. VirtualTemplate-Record | Array | A large multi-dimensional-array, which stores the data drom all of the templates currently active in the current customer-session. |
| 7. GeneratedText | Me-mo | QCs deliver the generated text to this field, when not functioning in DeliverToWord mode. |
| 8. ReferenceHyperlink | Short | Hyperlink to a Reference document relevant to this template (or location within a larger reference document) |
| Pop-Up | | |
| 9. PopUpID | Short | Stores the ID of the popup Question/s |
| 10. PopUpQuestion | Byte | Stores the number of Question which has invoked a pop-up (used by the QC to communicate with the TC) |
| 11. PopUpAnswer | Byte | Stores the number of Answer which has invoked a pop-up (used by the QC to communicate with the TC) |
| Display | | |
| 12. NumQuestions | Byte | Calculated (or manually entered) number of questions on the screen |
| 13. ManualNum-Questions | Bool | Default = F. When T, disables the automatic calculation of number questions that fit on screen |
| 14. NumQuestions-Horiz | Byte | For manual assignment of number of questions to be displayed on the screen (when ManualNumQuestions=T) |
| 15. NumQuestions-Vert | Byte | |
| 16. TopMargin | | For setting the margins of the area in which the TC should fit the questions. |
| 17. BottomMargin | | |
| 18. SideMargin | | |
| 19. MinQuestionWidth | | Defines the minimal question width |
| 20. MinQuestion-Height | | Defines the minimal quesiton height |
| 21. ScreenResolution | | Maybe optional, if they can be automatically detected by the control. |
| 22. WindowSize | | Maybe optional, if they can be automatically detected by the control. |
| Database | | |
| 23. KnowledgeDB | 50 | Name (including path) of the knowledge-base database. |
| 24. CustomerDB | 50 | Name (including path) of the customer database. |
| 25. TypeDB(KB) | Byte | Database type for KB. Options: MICROSOFT ® Access, MICROSOFT ® SQL, ORACLE ® |
| Performance Tuning | | |
| 27. SpeedVsMemory | Bool | Options: FasterResponse, MemoryEfficient |
| List Of Templates | | |
| 28. FilterByCategories | | |
| 29. Category | | |

Referring back to FIG. 7, the template virtual record 700 preferably comprises a multi-dimensional array, which the template logic component 235 of FIG. 2 preferably creates by collecting all data related to the template, although in the knowledge-base database 140 of FIG. 1B it is stored in multiple tables. All the actions performed by the template logic component 235 are based on this structure Read knowledge-base 705 preferably implements a method which populates the template virtual record 700 from the knowledge-base database 140 of FIG. 1B.

The following detailed example relating to a preferred embodiment of the present invention is not meant to be limiting, and statements therein are intended to refer to preferred alternatives only:

Read KB Method

The data for each template, includes template-data, as well as data of the questions contained in the template, and their answers, and is stored in the database in four different tables: Templates, QuestionAnswers, Questions, Answers. The structure of these tables is specified in the Database section in this document. Depending on the language, the correct set of tables is opened, for that language.

Upon opening a template, as well as upon other events, the TC retrieves the appropriate records from these various tables, and constructs in the memory a 'Virtual Template Record' in a multi-dimensional array. This array may hold data of several templates at once (this is just another dimension in the array). The TDC 'feeds' the data from this virtual record to the different QDCs on the screen during the FeedQuestions method described in the next section.

This method should probably function as a separate WINDOWS® task, so as to allow reading the data in the background, and allow fine-tuning for maximizing performance.

Method Steps:
1. Open the database according to the database name and path stored in KnowledgeDB property, and the database type (MICROSOFT® Access, MICROSOFT® SQL Server, or ORACLE®) stored in TypeDB(KB) property.
2. Check the Language property, and accordingly open the correct tables in the database. (The database should contain a duplicate set of tables for each language supported, e.g. Questions_English, Questions_French, etc.) These tables are identical in structure and in the ID of their records.
3. Open the Template table (in the appropriate language), and find the desired Template according to your TemplateID property.
4. Read the template data, and feed into the properties in the Template properties.
5. Store the template data into the a multi-dimensional-array (into the $2^{nd}$ dimension. The first dimension is for storing multiple templates simultaneously).
6. Read the 12 QuestionID fields in the Template record, and retrieve from the QuestionAnswers table (it is language independent since it only contains IDs), the corresponding records.
7. For each QuestionAnswers record read, retrieve the corresponding Question record from the Questions table (in the appropriate language). Load related to the question into the multi-dimensional-array ($3^{rd}$ dimension).
8. Also for each QuestionAnswers record read, read the (up to) 12 Answer records, from the (language dependent) Answers table, according to the 12 AnswerID fields in the QuestionAnswers record. In this way load the data on the answers of each of the questions, into the multi-dimensional-array ($4^{th}$ dimension).
9. Read and store to the Array Popup questions, using the following steps 10–13:
10. Go over all of the questions and their answers. For each answer check if it has a continuation. If so:
11. Find out if it is a single or multiple popup (i.e. are there one or more questions which popup at once). Note: if a single popup question has itself a popup continuation, it is still a single popup, not multiple. This is indicated by the Continuation(n) property of the QC.
12. If Single popup, then the respective ContinuationID(n) stores the ID of the question which needs to popup. Read from the database the data of this question. This single question is now handled as if it was a template, which contains only one question. Create in the Multi-Dimensional-Array a 'record' of this temporary 'template', and store the question details in this 'template'.
13. If Multiple popup, then the ContinuationID(n) stores the ID of the Template which needs to popup. From a content perspective, this is part of the original template, but from a database perspective it is stored as a separate template. Retrieve from the database this template and store it to the Array (steps 3–8 above). Note: the array is capable of storing multiple templates.
14. If the tables in the selected Language are not found, or records in those tables are missing for some reason, the system sends an error message: "Selected language not found!" and immediately switches to English tables and displays the template in English.
15. In order to achieve maximal speed in displaying the questions on the screen, and in text-generation, the sequence of reading data from database is as follows:
    1) Data related only to Questions visible on the screen, and the (up to) 6 Answers visible, not including text-generation related data.
    2) Feeding this data to questions (Feed_Questions method), and QCs performing their Display_Question method.
    3) Read text-generation related data related to the questions on the screen.
    4) Read data related to questions in the template which are not visible (e.g. next 6 questions if only 6 were displayed initially), and of answers which were not visible, and data of all pop-up questions related to this template.
    5) Read data of templates which belong to the same TemplateCluster (e.g. other SOAP templates of the same 'Problem').
    6) Read data of templates which appear on the customer's 'Problem-List' (i.e. have been used for this customer before, and therefore have a high probability of being called again).

Referring back to FIG. 7, feed questions 710 preferably implements a method which feeds the data relevant to each question in the template to the individual respective question display component 225 and question logic component 240 units of FIG. 2.

The following detailed example relating to a preferred embodiment of the present invention is not meant to be limiting, and statements therein are intended to refer to preferred alternatives only:

Feed Questions Method

This method feeds data from the Virtual Template Record (VTR) to the properties of the QDCs on the screen. In cases where the user flips back and forth between several templates during the same session, then this method also recalls the user's responses to this template last time he visited it, which are also stored in the VTR, and feeds them as well to the QCs.

Method Steps:
1. Feed data to properties of all QCs, data which is same for all: Language, LanguageDirection, and presentation preferences, etc. If these properties have already been set, and have not been modified since (e.g. when flipping back and forth between templates), then this step is skipped.
2. Feed data specific to each of the QCs.

3. Turn Visible property=True, for all the QCs which in this specific template are not empty.
4. Activate the Display_Question method of each of the QCs on the screen.

If this template has been visited before in this session, which is preferably indicated by an internal indicator, then Check for each answer to each question, if there is a previous response, and if so assign this response to the Response property of the respective QC as well.

In this case there is no need to regenerate the text, because the generated text already exists in the Session document, only the on-screen selections need to be reproduced.

Referring back to FIG. 7, check redundancy 715 preferably implements a method by which the template logic component 235 of FIG. 2 compares user responses to one template, and synchronizes it with identical (or similar) questions in other templates, so that the user will not have to repeat his answer there again The following detailed example relating to a preferred embodiment of the present invention is not meant to be limiting, and statements therein are intended to refer to preferred alternatives only:

Check Redundancy Method

The goal of this method is to compare and equalize the user's selections in the different templates which are currently active. Typically, the user uses more than one template in a session, and very frequently, an answer which has been selected in one template, appears in other templates. The goal is therefore, to have the system automatically 'select' answers which appear in the template which is being displayed, and which the user already selected elsewhere.

The method is based on the fact that the templates are all composed from the same 'bank' questions and answers, and so the identity of the answer can be easily verified. The difficulty is that the same answer may appear in different questions, sometimes with the same general meaning (e.g. Associated Symptoms→Fever, and Presenting Symptoms→Fever), but sometimes have completely different meanings (e.g. Pain Began Before→1 Hour, and Pain Lasted→1 Hour).

The solution lies in the fact that questions in the KB are grouped according to their topic, such that all questions which relate to generally the same topic are grouped together. The Check_Redundancy method therefore works as follows:

Method Steps:
1. Create a temporary Multi-Dim Array. The purpose of it is to store the identity and other details of answers which have been selected in other templates, so that they can be compared to the current template and its continuation templates.
2. Loop over all templates which have been used in this session. For each template, find the answers which have been selected by the user (i.e. Response(n) property= True).
3. For each selected answer, copy its AnswerID to the Array. Look-up the question to which it belongs, and copy its QuestionGroup property to the Array, next to the AnswerID.
4. For each selected answer above, check if its question group exists in one of the questions in the current template. If so, check if the selected answer is included in that question in the current template. (Note: this is all done in the Template Virtual Record which stores the entire template in memory).
5. If so, mark it selected (its Response(n) property=True) in the Template Virtual Record. Feed this updated property also to the appropriate QC, and activate the Click_Generate_Text method on it.

In a similar manner, loop through the answers and questions of the templates which represent pop-up questions, and pop-up group-of-questions associated with the current template (technically speaking, they are stored and handled as separate 'templates'). The use of the temporary array suggested in step 1, is to ensure performance, such that first the visible questions are compared, and only then the pop-up questions are done.

Referring back to FIG. 7, full generate text 720 preferably implements a method of generating the entire text of the template at once, as opposed to generating it in small increments, in response to a user click. This method is used for example, when translating a session from one language to another.

The following detailed example relating to a preferred embodiment of the present invention is not meant to be limiting, and statements therein are intended to refer to preferred alternatives only:

Full Generate Text

The Full Generate Text method is used by the TC to invoke full generation of the entire text of the template, not in response to a user's click, but rather on the system's initiative (e.g. when switching to a different language there is a need to regenerate the entire text in a different language).
Method Steps:
1. Perform the WarmUp method, if it has not be performed before.
2. Activate the Generate-Simple_Sentence method on all of the QCs in the template (their array numbers are 0 to NumQuestions). This causes each QC to generate its own sentence, as well as to activate the Generate_Branch method which generates the text of continuation questions they may have.
3. Loop through the QCs. Find out and mark the QCs which are actively heading sentences, using the following steps (for each QC):
4. If this is a head of a potential Simple sentence (BeforeMe=0 and AfterMe=0), and some answers have been selected (Selected>0), than this is an active head of a simple sentence. Assign its Identity to its Sentence-Leader property.
5. If this is a head of a potential Compound sentence (BeforeMe=0, and AfterMe>0), than go over this QC, and the next <AfterMe> QCs, to find out which of them, if any is the first one in the sentence which is active (his Selected is >0), and therefore is at the head of the sentence. Mark it as sentence leader (set its SentenceLeader=its Identity).
6. Assign the same number to the SentenceLeader property of all the next QCs which belong to this sentence (so that they too 'know' who they 'belong' to).
7. Move to the next QC, and repeat above actions, until the last QC is reached.
8. Calculate and assign the proper values to the ActiveSegments property of the QCs which are actively leading sentences (this is done since the ActiveSegments is needed for the Connect method, which is used in the next step):
9. Loop through the QCs finding the QCs which are leading sentences (SentenceLeader=Identity).
10. For each of them, loop over the next <AfterMe> QCs after them
11. Count the number of QCs in which the Selected property>0. Assign this number to their ActiveSegments. (This is the number of QCs 'belonging' to their sentence, which are currently active).

Activate the Connect method on the QCs which are actively heading sentences (their SentenceLeader property= their Identity property).

Referring back to FIG. 7, voice recognition 725 preferably implements a method of enabling voice recognition selections from questions and templates displayed on the screen.

The following detailed example relating to a preferred embodiment of the present invention is not meant to be limiting, and statements therein are intended to refer to preferred alternatives only:

Voice Recognition Support

The Voice_Feed method and the Voice_Click method are methods which connect the TC and QC to a voice recognition engine, allowing the user to make voice selections from the options available on the screen.

Preferably, this is done with a commercial voice recognition OCX which can be bought without a royalty payment per user, and which preferably also supports standard packages such as IBM, Dragon (which has a module that allows it to work from within MICROSOFT® Word).

Voice_Feed Method

The Voice_Feed method, creates a list of all the options the user may select by voice on the currently viewed screen (i.e. template), and transfers this list to the Voice engine, through the appropriate API. This method is activated whenever a different template is being displayed, i.e. by the Feed_Questions method. Technically, this method performs the following steps:

1. Creates an array which will store all of the recognizable items for this screen. This array contains a list of the meaningful text-items to be recognized, which will be fed to the Voice engine in order to limit its search vocabulary. Identification parameters, such as Identity property of the QC it belongs to, and answer number within this QC are stored next to each item in the array. These parameters are used by the Voice_Click method described below.
2. Loops in memory on the Virtual Template Record array, and enters all questions, and their answers in the template, and writes them into the flat array. This includes first level questions (i.e. not pop-ups).
3. The goal of the next steps is to also include in the search list answers to immediate pop-up questions which are embedded into the branching sentence. For example if the continuation question for an answer 'Hand' is 'Left', then it would make sense to allow a selection of a string 'Left hand'.
4. For each answer, check for pop-up continuations (i.e. for check if its Continuation ID < > null).
5. If so, check its continuation question/s fit into the same sentence (i.e. their Continuation property=ForceJoin, ConnectString or TruncateString). If so:
6. Add their answers to the list.
7. Generate and add to the list the combined string of the continuation with the answer that triggered it (e.g. 'left hand' as a string composed of 'left' and 'hand'), as follows:

If InsertBefore, join continuation answer before triggering answer, and add to flat array.

If InsertAfter, join continuation answer after triggering answer, and add to flat array.

If Replace then simply add the continuation answers to the flat array, as is.
8. Add to the list the constant list of 'navigation commands', for actions which can be performed by the system. This list is mostly a reflection of the actions which can be done through the Navigation Toolbar and the Write Session components.
9. Submit the list of items in the array to the Voice Recognition Engine (in the Options configuration the user may select different Engines to work with), through the API, and instruct it to constrict its vocabulary to these words.

Voice_Click Method

This method communicates back from the output of the voice recognition engine, attempting to identify the recognized text, and to 'click' (i.e. select) the answer which the user said by voice. It is activated by the API of the voice-recognition engine once a string of text is recognized by this engine. The API transfers to it the string of text identified, and the method goes through the steps described below, in evaluating and comparing it to the knowledge-base.

Method Steps:

1. Receive from the voice recognition engine, the string identified.
2. Compare it to the fixed list of 'navigation commands' (see step 8 in Voice_Feed method). If it matches one of the navigation commands, it triggers the appropriate action (same as pressing a 'shortcut key').
3. Else, it loops through the array, comparing the voiced text to the items in the array, and acting according to the following steps:
4. If it matches a navigation command, trigger the appropriate action (e.g. by SendKeys of the associated shortcut key). Else:
5. If it matches a Question, then move the focus to that question.
6. If it matches an answer, select that answer (mark the Response property of the selected answer as 'selected').
7. If it matches an answer (as above) but the item identified immediately before this, was a question, then select this answer from this question (there may be several identical answers in different questions on the screen).
8. If an answer was selected, and several such answers exist in different questions in the template, and no question was selected before, than mark this answer in the first question in the template, in which it appears.

If a compound answer (as per step 7 in the Voice_Feed method) was selected, then mark the answer which triggers it, as well as the selected answer in the pop-up.

Figure 8:
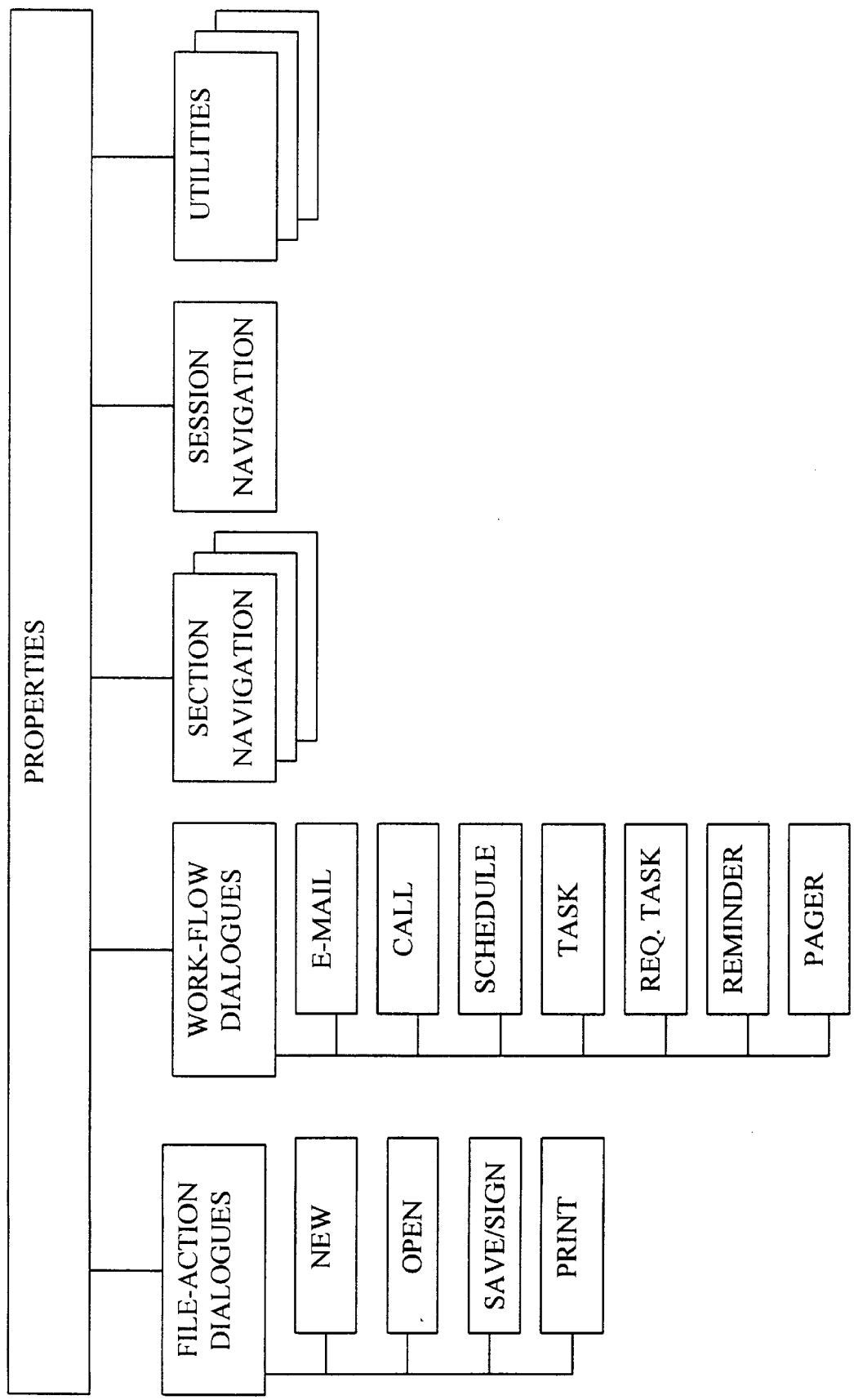
FIG. 8 is a simplified block diagram illustration of the navigation logic component 230 of FIG. 2.

Reference is now made to FIG. 8, which describes the navigation logic component 230 of FIG. 2. The navigation logic component 230 is the business-logic counterpart of the navigation display component 215 of FIG. 2, as further described with reference to FIG. 5. FIG. 8 is self-explanatory.

The following detailed example relating to a preferred embodiment of the present invention is not meant to be limiting, and statements therein are intended to refer to preferred alternatives only:

Navigation Logic Control

I. Introduction

The Navigation Logic Component (NLC), is the business-logic tier counterpart of the Navigation Display Control. Its main purpose, as its name suggests, is to provide an easy method to create-new, open, close the customer record document 115, and to 'jump' to its various parts. In addition, it executes various other actions triggered by the toolbar buttons of the NDC.

Information in the customer record document 115 is stored in three objects:

1) MICROSOFT® Word object: Stores all of the textual information which is written by users into the customer record document 115.
2) MICROSOFT® Excel object: Stores all of the tabular data associated with the customer file. This data is presented (and to some extent duplicated) in tables which appear in the HTML document or MICROSOFT® Word document. It serves primarily as a back-end storage of the tabular data.
3) ADOBE® ACROBAT® PDF file (or object), stores all of the images which are included in the customer record document 115. This includes both scanned documents (letters, ECG, scanned forms, etc.), as well as medical imaging (e.g. X-Ray).

The navigation in the customer record document 115 is therefore an action of 'jumping' to various parts of the HTML document or MICROSOFT® Word document or the ACROBAT® PDF file, using Bookmarks in the ACROBAT® PDF and HTML document or MICROSOFT® Word files, and the 'Headings' hierarchy of the MICROSOFT® Word document. This methodology is described in detail below.

II. Navigation Mechanism

The Navigation Logic Component is responsible for the actual action of navigation within the Record, an action which is triggered by the button and combo-boxes on the NDC toolbar of the Display Tier described above. This navigation action is really three-fold:
(a) Jumping, via hyperlinks, to various parts of the HTML document or MICROSOFT® Word document object, which comprises of most of the customer record document 115, or to bookmarks within the ACROBAT® PDF object, which holds the images associated with the record.
(b) 'Directing' the TDC and TLC to the template associated with this section.
(c) Directing the text-generation output of the TLC to the correct location in the HTML document or MICROSOFT® Word document.

The structure of the record is based on the Heading hierarchy of the MICROSOFT® Word document object. Each fixed section in the record is a Heading-1; in the previous sessions' section, each session is a Heading-2; each problem in the session is a Heading-3, and each sub-template, is a Heading-4. The NLC is responsible, not only for navigating to these Headings, but also for creating them when needed (e.g. when writing a new session). When a new session is being written, it is actually written to a temporary session MICROSOFT® Word document, which the NLC creates, and which NLC joins to the main MICROSOFT® Word document at the end of the session, as another Heading-2.

An exception to this rule are the templates which are associated with 'fixed' sections of the record. As mentioned above, these correlate to Heading-1 sections of the main MICROSOFT® Word document, and need to update the section, rather than add to it. In this case, rather than creating a blank New-Session document, the NLC instructs the TLC to generate the text the and the data here is written in update mode to fields embedded in these sections, rather than to a temporary New-Session document, sections In general, clicking a button jumps to the Heading-1 corresponding to that section in the document. However, when jumping back and forth between sections of the document (i.e. clicking a button which has already been pressed before, in this session, for this customer, after which the user moved to a different part of the record of this customer), causes a slightly different action. Rather than jumping to the beginning of the Heading-1 section in the document, as described above, it causes a jump to the exact place in that section, which the user viewed prior to jumping to a different section.

When scrolling down the document, the button corresponding to the part of the document which is currently visible, is pressed automatically (by the system), so that it indicates visually where in the document you are. (This works similar to the behavior of the Document Map feature of MICROSOFT® Word, which both allows to jump to a part of the document, as well as indicates where you are.)

III. Session Navigation

In addition to the 'constant' sections of the customer record document 115 (sections in which writing to the record updates and overwrites the existing section, e.g. Status Sheet, Demographics, Lab), the record also contains data recorded in multiple sessions. These sessions are written in the MICROSOFT® Word document, in a similar manner to log entries, i.e. each session adds a new entry in the document. Technically, each Session, is recorded as a Heading-2, chronologically sequenced, all under the Heading-1 called 'Previous Sessions'.

In addition, the customer record document 115 also includes multiple images, of both scanned documents (e.g. referral letters), and medical images (e.g. X-Rays). As mentioned before, these images are stored together as a single ACROBAT® PDF file, which is stored as an object embedded in the MICROSOFT® Word document or associated with it.

The components in this group on the toolbar have a dual purpose: to navigate between the multiple sessions (which are stored as Headings in the MICROSOFT® Word document), and to navigate between the images in the record (which are stored as pages in the ACROBAT® PDF file). This navigation is done simply by using hyperlinks to Heading-2 sections in the MICROSOFT® Word document, and to bookmarks in different pages of the ACROBAT® PDF file, respectively.

When a customer record document 115 is loaded, the system loops through the Heading-2 sections in the 'Previous Sessions' Heading-1, and forms a list of hyperlinks to them, in the combo-box.

Generating the list of hyperlinks to the bookmarks of the ACROBAT® PDF file is, optionally, not performed when loading a new record, in order not to slow down that phase. It is preferably performed in the back-around after the record is loaded and presented, and performance data collected as to how long it takes to create this list. Note: individually these actions do not take long, and when added together the overall performance is preferably kept down to short sub-seconds (~250 msec).

The ACROBAT® PDF file is embedded in the MICROSOFT® Word file, occupying the entire document visible area, so that the toolbars etc. are visible, but not the MICROSOFT® Word document, and that the switching between the ACROBAT® PDF and MICROSOFT® Word is seamless.

IV. Write Session

When the new session button is pressed, and if there is no new session open, then the NLC creates a new MICROSOFT® Word document, called "<Customer Name> (New Session)". In it NLC creates a Heading-2. The name of this Heading-2 contains the date and time, followed by the templates used in this session in round brackets.

The system has a default session template (this is stored in the Application record), which is used if no template was specified. NLC inserts the name of the selected (or default if no selection) template into the Heading-2 of the session, as mentioned above, and inserts a Heading-3 with this template name, and underneath is, inserts Headingy-4s for all of the sub-templates (if this template has sub templates). After each heading, there is an empty normal style line, so that the user may write into this freshly created form.

If the user changes the template (in the combo-box), without writing anything, than NLC erases the previous template name from the Heading-2 and Heading-3, and replaces it with the name of the newly selected template.

If the user made any entry to the previous template, the NLC creates a new Heading-3 with the name of the new template, and the Heading-4s underneath it as described before.

If the user selects a template which already exists in this session, then NLC jumps to that heading.

Pressing one of the Sub-Template buttons, merely jumps to the appropriate Heading-4.

In parallel to the above mentioned actions, NLC always turns to the correct template in the Data Access Component (DAC), if it already exists in memory, or instructs DAC to retrieve that template from the database.

Also in parallel, the NLC informs the TLC (and, where appropriate, the QLC) where in the document they should direct their input. The NLC may either communicate directly with the QLC or indirectly with the QLC via the TLC.

At the end of the session, the NLC writes the session to the main document, i.e. adds it as a Heading-2 to the end of the 'Previous Sessions' Heading-1.

There is another configuration that needs to be supported, and which is to be defined in the User Preferences (or Configuration Options). Some applications, and some users, may prefer to have the structure of the session reversed, such that Heading-3 stands for the Sub-Template name, and the Heading-4 stands for the Template name. In such a configuration, if a customer had two problems, first would come Heading-3 (e.g. Subjective), and under it would come Heading-4s (e.g. Chest Pain, Fever). The NLC needs to be able to support both configurations.

V. Workflow Actions

The Workflow Actions are represented by buttons as described above. Clicking each of these buttons activates a dialogue screen, which is technically an Outlook form, similar to the respective standard Outlook forms (i.e. screens), with some modifications. These forms and their functionality are described below.

VI. Utilities

The Utilities group of buttons on the toolbar relates to general actions in the record, i.e. actions which do not relate to the currently open record. These actions include:

1. Reference: Each template in the knowledge-base has an option of including a hyperlink to a Reference document which is relevant to this template. Clicking this button, 'jumps' to this hyperlinked document (the hyperlinks are stored in the ReferenceHyperlink field in the Template DB record).
2. Help: Invokes the help for the system, which is based on MICROSOFT® Office Assistant. Unlike the standard Assistant however, it displays an additional option of 'Help Topics', which displays the full list of help topics available. The small hyperlink (">>") buttons in the help text point to various small Exe (exec) files produced with DemoShield. Each of these include a 'screen-cam' scenario, with an embedded AVI file (showing a video of a narrator describing the actions viewed in the screen-cam).
3. Options: Brings up a tabulated 'Options' dialogue, which resembles the appearance of the standard MICROSOFT® Office Options dialogue, but with options relevant for our components. Basically this is merely a friendly interface for setting some of the properties of the components defined in this documents.

Knowledge-base Editor: This button invokes the KB editor, which is basically only the normal TC and QC components, only functioning in Editor mode, which is described below.

Figure 9:
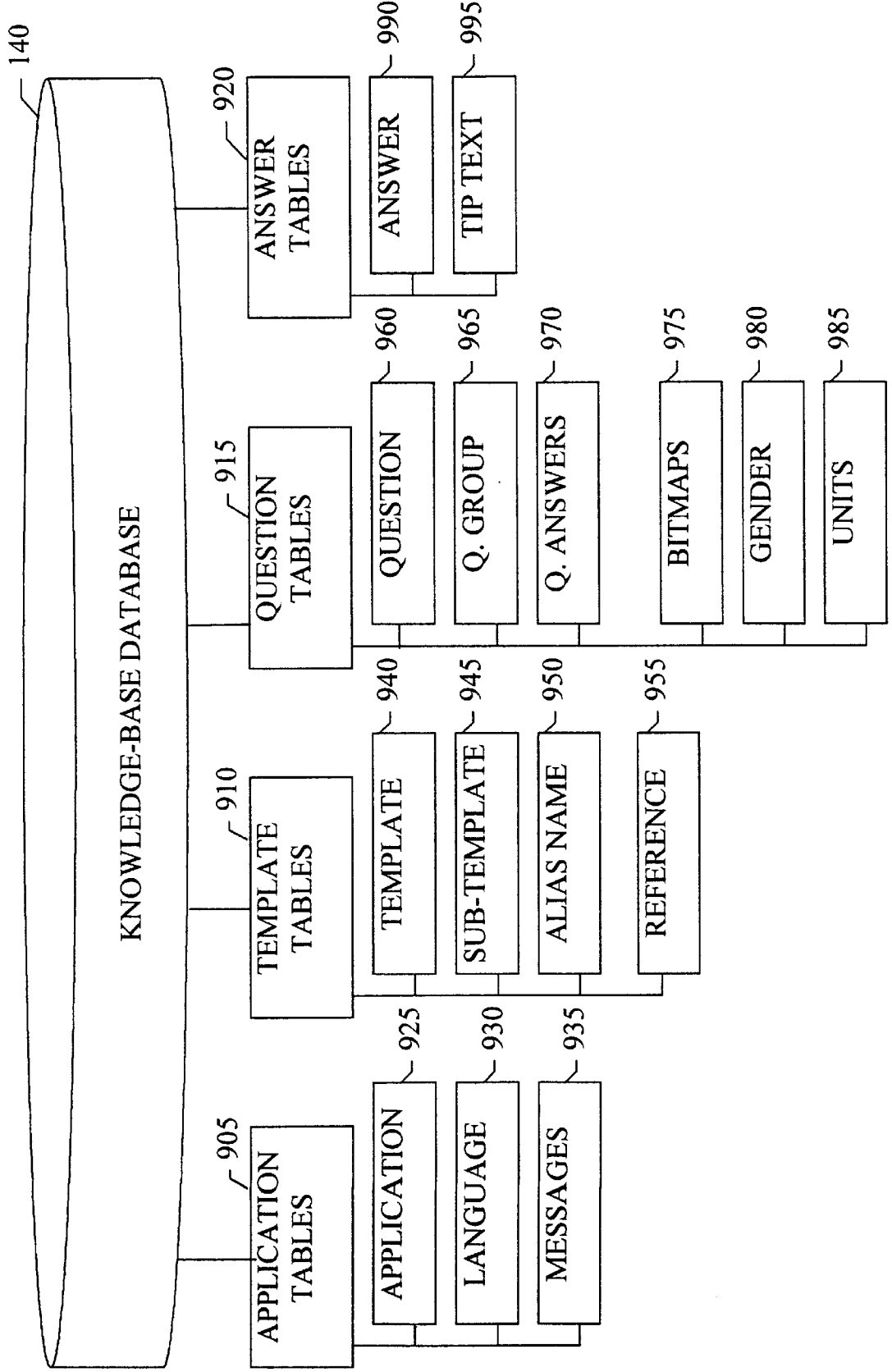
FIG. 9 is a simplified block diagram illustration of a preferred implementation of the knowledge-base database 140 of FIG. 1B.

Reference is now made to FIG. 9, which is a simplified block diagram illustration of a preferred implementation of the knowledge-base database 140 of FIG. 1B. The knowledge-base database 140 of FIG. 9 is preferably built of 4 groups of tables: application table groups 905, template table groups 910, question table groups 915, and answer table groups 920. Application table groups 905 store data relevant to the application. Detailed data structure of all of the tables described above with reference to FIG. 9 are further described below.

The following detailed example relating to a preferred embodiment of the present invention is not meant to be limiting, and statements therein are intended to refer to preferred alternatives only:

Knowledge-base Database Structure

Knowledge-base data drives the TC and QC components, contains the 5 data of the Templates, Questions, and Answers, in three DB tables respectively, and resides locally in an MICROSOFT® Access (or Jet) database, on each Client PC. There are multiple sets of these three tables, one for each Language supported by the system. These sets are synchronized by the system, so that adding or deleting a record from the current language used, adds or deletes records respectively from the other-language tables with the same IDs, and flagging the records that have been changed, and which need to be translated.

| Template Table 940 | | | |
|---|---|---|---|
| Field Name | Type | Length | Comments |
| 1. TemplateID | Numberic | Short | Unique. Estimate 500–1000 records |
| 2. TemplateName | Text | 30 | |
| 3. TemplateType | Numeric | Byte | Less than 10 currently, definitely less than 99 in the future |
| 4. Reference-Hyperlink | Hyper-link | | Hyperlink to a reference document relevant to this template (or location within a large reference document |
| 5. QuestionID (1–12) | Numeric | Short | Estimate 10,000 possibilities |

| Answer Table 990 | | | |
|---|---|---|---|
| Field Name | Type | Length | Comments |
| 1. AnswerID | Numeric | Short | Estimate: 10,000 |
| 2. Answer | Text | 25 | Text of the answer |
| 3. AnswerShort | Text | 12 | An abbreviated version of the answer for display on the Handhelds |

QuestionAnswers Table 970

| Field Name | Type | Size | Comments |
|---|---|---|---|
| 1. QuestionAnswerID | Numeric | Short | ID of this record. Estimate: 5,000 records |
| 2. Question ID | Numeric | Short | Link to the ID of the Question record, which stores the detailed parameters for the question. Estimate: 10,000 records. |
| 3. AnswerID (1–12) | Numeric | Short | 12 fields for the IDs for the 12 answers linked to this question. Estimate: 10,000 records. |
| 4. TipText (1–12) | Numeric | Short | |
| 5. Continuation (1–12) | Boolean | | 12 fields for the Type of continuation: Single, or Multiple |
| 6. ContinuationID (1–12) | Numeric | Short | 12 fields for the IDs of continuations |

Question Table 960

| Field Name | Type | Size | Comments |
|---|---|---|---|
| Basic Properties | | | |
| 1. Question ID | Numeric | Short | Unique |
| 2. QuestionType | Numeric | Byte | Format type. Currently about 10 types, in the future, not more than 99. |
| 3. QuestionGroup | Numeric | Short | Content Group to which the question belongs. Used for the Check_Redundancy method. |
| 4. Question | Text | 20 | |
| 5. QuestionShort | Text | 12 | An abbreviated version of the question for display on the Handhelds |
| 6. Subject | Text | 25 | |
| 7. Prefix | Text | 50 | |
| 8. Suffix | Text | 20 | |
| Continuation & Connection | | | |
| 9. Single-Continuation | Boolean | | Determines if the continuation referes to a QuestionID (when T), or TemplateID (when F) |
| 10. ConnectType | Numberic | Byte | |
| 11. ConnectString | Text | 20 | |
| Output Format | | | |
| 12. GeneralLayout | Boolean | | Options: ParagraphStyle, FormStyle |
| 13. AnswerLayout | Numeric | Byte | Options: NextToQuestion, TabFromQuestion, HangingIndent OnNewLine, Table |
| 14. QuestionsLayout | Boolean | | Options: OnSameLine, OnSeperateLines |
| 15. CommaSeperated | Boolean | | |
| 16. GroupHeaderBold | Boolean | | |
| 17. QuestionBold | Boolean | | |
| 18. AnswersBold | Boolean | | |
| 19. HeaderNewLine | Boolean | | |
| Q-Type Related | | | |
| 20. NumericID | Short | | |
| 21. GraphicID | Short | | |
| 22. GenderID | Short | | |
| 23. NegativePrefix | Text | 50 | |
| 24. NegativeConnector | Text | 20 | |
| 25. NegativeConnectWord | Text | 10 | |

Bitmaps Table 975

A table containing the bitmaps used by the knowledge-base, in Graphic Type QCs.

| Field Name | Type | Size | Comments |
|---|---|---|---|
| BitmapID | Numberic | Short | Unique |
| Bitmap | Binary | | Contains the Bitmap |

TipText Table 995

| Field Name | Type | Size | Comments |
|---|---|---|---|
| TipTextID | Numeric | Short | |
| TipText | Text | Short | |

Reference Table 955

| Field Name | Type | Size | Comments |
|---|---|---|---|
| ReferenceID | Numeric | Short | |
| Reference | RTF Object | | Contains the Reference document for a template (pointed to by the ReferenceHyperlink property of the TC) |

Application Table 925

| Field Name | Type | Size | Comments |
|---|---|---|---|
| ApplicationID | Numeric | Short | |
| ApplicationName | Text | | |
| SectionName (1–10) | | | Name of the fixed section |
| SectionIcon (1–10) | | | Its icon |
| SectionTemplate (1–10) | | | The IDs of the templates associated with each of the sections in the application. In an MICROSOFT ® Excel section, the ID points to the MICROSOFT ® Excel document which serves as a template for this section. |
| SectionType (1–10) | | | Regular template, MICROSOFT ® Excel spreadsheet, etc. |
| WordTMP | Object | | The Word document which serves as a template for creating customer record documents 115 |
| SubTemplates | Bool | | Indicates whether this application supports sub-templates |
| SubTemplateName (1–5) | | | Stores the names of the sub-templates in this application |

-continued

Application Table 925

| Field Name | Type | Size | Comments |
|---|---|---|---|
| SubTemplateIcon (1–5) | | | Stores the icons of the sub-templates in this application |
| Preferences (1–n) | | | Various additional fields need to store all preferences associated with the application |
| MultipleSession | Bool | | Indicates whether the application includes multiple sessions (the application described in this document does, but this is not always the case). |
| LockRecord-AfterSign | Bool | | |
| DefaultSession-Template | | Short | Holds the templateID for the template that will be opened by default when a new session begins, if no other template was selected. |

Referring back to FIG. 9. application table 925 preferably stores the structure of the application, that is, for example, the name, sequence, icons, and template ID of the fixed sections of the application.

A language table 930 preferably stores the profile of different languages that the system supports, and is not directly related to one or another application, storing, for example, location of subject in the sentence, and connecting word, and so forth, for each language.

Messages table 935 preferably implement screen messages, tool-tips etc., in the different languages.

Template table group 910 preferably stores data related to the template. The template table 940 preferably comprises a set of sub-template tables 945, where each sub-template generates the multiple aspects of a problem, represented as 2340, 2345, 2350 in FIG. 23, referred to below, in generating a session in a customer record.

An alias name table 950 preferably holds multiple names which a template may have.

A reference table 955 preferably holds a pointer to reference material which is associated with a specific template.

Question table group 915 preferably stores data related to the questions included in each template, and the combinations of answer that are attached to each question in each template. Bitmaps table 975, gender table 980, and units table 985 preferably hold data specific to specific types of questions.

Question table 960 preferably holds the data of the question.

Question group table 965 preferably stores the group the question belongs to (used to organized the questions for ease-of-use in the knowledge-base editor 145 of FIG. 1B).

Question-answers table 970 preferably holds the combination of answers which appear in this question in a certain instance of this question in a specific template; preferably, the same question may appear in multiple templates with a different set of answers.

Gender table 980 preferably stores gender dependent sentences (for languages where this is applicable).

The bitmaps table 975 is preferably used for graphic type questions, allowing users to make selections by clicking on different regions of a bitmap, rather than clicking answers in a multiple-choice question.

Units table 985 is preferably used for unit questions (singular and plural forms of the unit, and in languages where this is applicable—a special unit-word for the term 2-units e.g. '2 days' in Hebrew is 'Yomayim').

An answer table 990 preferably holds the answers (so that they can be referred in the question by their ID alone).

Tip text table 995 refers to tool-tips, which are well known in the art, and which preferably pop-up when an answer is pointed at without clicking.

Figure 10:
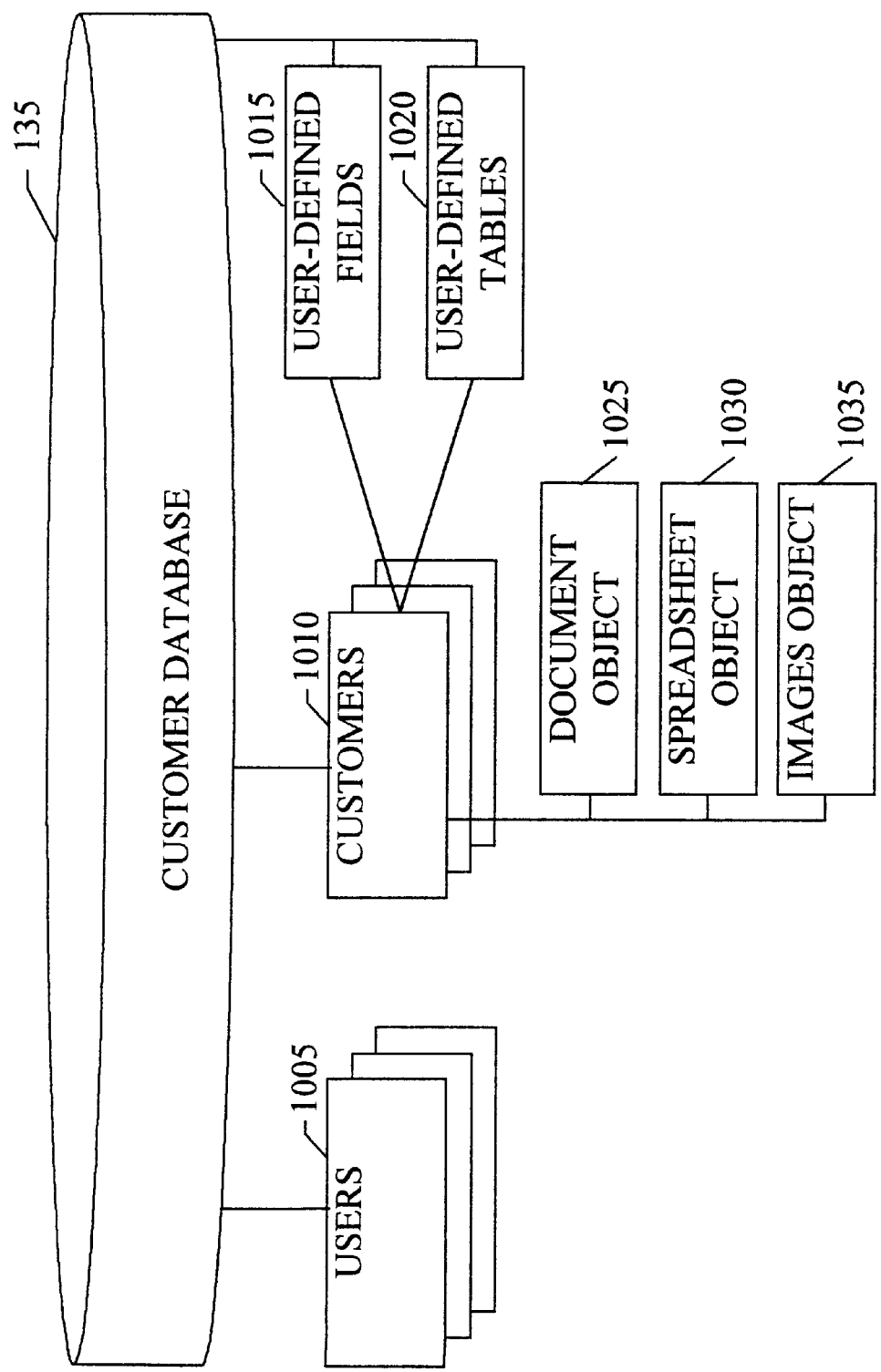
FIG. 10 is a simplified block diagram illustration of a preferred implementation of the customer database 135 of FIG. 1B.

Reference is now made to FIG. 10, which is a simplified block diagram illustration of a preferred implementation of the customer database 135 of FIG. 1B.

Most of the data in the customer database 135 is preferably stored in document file objects, such that for each customer 1010, there is preferably one or more of the following: a hierarchical document object 1025 (e.g. MICROSOFT® Word document, or multiple HTML documents), a spreadsheet object 1030 (e.g. MICROSOFT® Excel document), and an images object 1035 (e.g. ACROBAT®) PDF object). All data about a customer is preferably stored in this document/s object/s, such that no interaction is required during the session between the server and the client, and so that, preferably, no application (e.g. database application) is needed in order to read the customer record.

User-defined fields 1015 and user-defined-tables 1020 duplicate certain data which is stored in the customer record document 115 (i.e. fields and tables embedded into that document, which the user may modify the structure of these fields/tables), so that records may be easily retrieved based on these fields/tables.

Users 1005 preferably comprises a simple record of multiple users which are using the system, and each of which may be associated with multiple customers. It is appreciated that an application may be of a structure where there is only one user (e.g. 'Personal Health Organizer' application—described below with reference to FIG. 25). This user information is also preferably used for the workflow actions of communication and collaborating between users (e.g. e-mail and other contact information of different users); this is described further above with reference to FIGS. 5 and 8, and also described further below.

The following detailed example relating to a preferred embodiment of the present invention is not meant to be limiting, and statements therein are intended to refer to preferred alternatives only:

Customer Data

The customer data is stored in a central database on the server when functioning in client-server mode, or on the local MICROSOFT® Access database when in standalone mode, and is comprised of four types:

All of the data which is entered by the users is written into an HTML document, or an MICROSOFT® Word Document Object (this holds most of the data in the record), or other textual document format All of the scanned documents, and medical images relating to the customer are stored in a ACROBAT® PDF file format.

All fields contained in the HTML or MICROSOFT® Word document, are duplicated and stored as discrete fields in the CustomerData table.

Tables in the MICROSOFT® Word document (e.g. Engine-Parts table, Problem List, Medication List) are stored as linked tables. The number, name and format of such tables is user definable, and is determined by the KB editor.

It is preferable to support the option of working with MICROSOFT® SQL, MICROSOFT® Access, or ORACLE® databases. The data structure is however very simple, since all of the data for viewing purposes of the record in contained primarily in one HTML or MICROSOFT® Word Document object.

Data-structure: one main Customer table in which each record stores most of the information in an HTML or MICROSOFT® Word Object, and all related scanned documents in a ACROBAT® PDF file object, with a few linked tables e.g. Diagnoses, Medications, etc.

During regular operation, clients access the information in Read-Only mode, using the HTML document or MICROSOFT® Word object. Modifying the customer record document 115 is performed locally in the memory of the client machine, while the actual Write to the DB happens at the end of the session, and is handled by the system—the user does not write directly to the DB. Record locking, and Write procedures to the DB are therefore very simple.

The linked tables, and the other discreet fields in the record, are used primarily for research and uncommon search functionality; lengths and other details when shown below and elsewhere in the present specification are by way of example only and not meant to be limiting.

'CustomerData' Table

| Field Name | Comments |
| --- | --- |
| CustomerID | |
| FirstName | |
| LastName | |
| Sex | |
| BirthDate | |
| Age | |
| MICROSOFT ®Word Object | Stores all the textual data in the record. |
| MICROSOFT ®Excel Object | Stores all the tabular data related to the record, in it multiple worksheets (e.g. various type of lab results) |
| ACROBAT ®PDF Object | Stores all the imaging data associated with the record |
| AdditonalField_1 | |
| AdditonalField_2 | |
| AdditonalField_3 | |
| AdditonalField_n | Unlimited ability to add fields |

Figure 11:
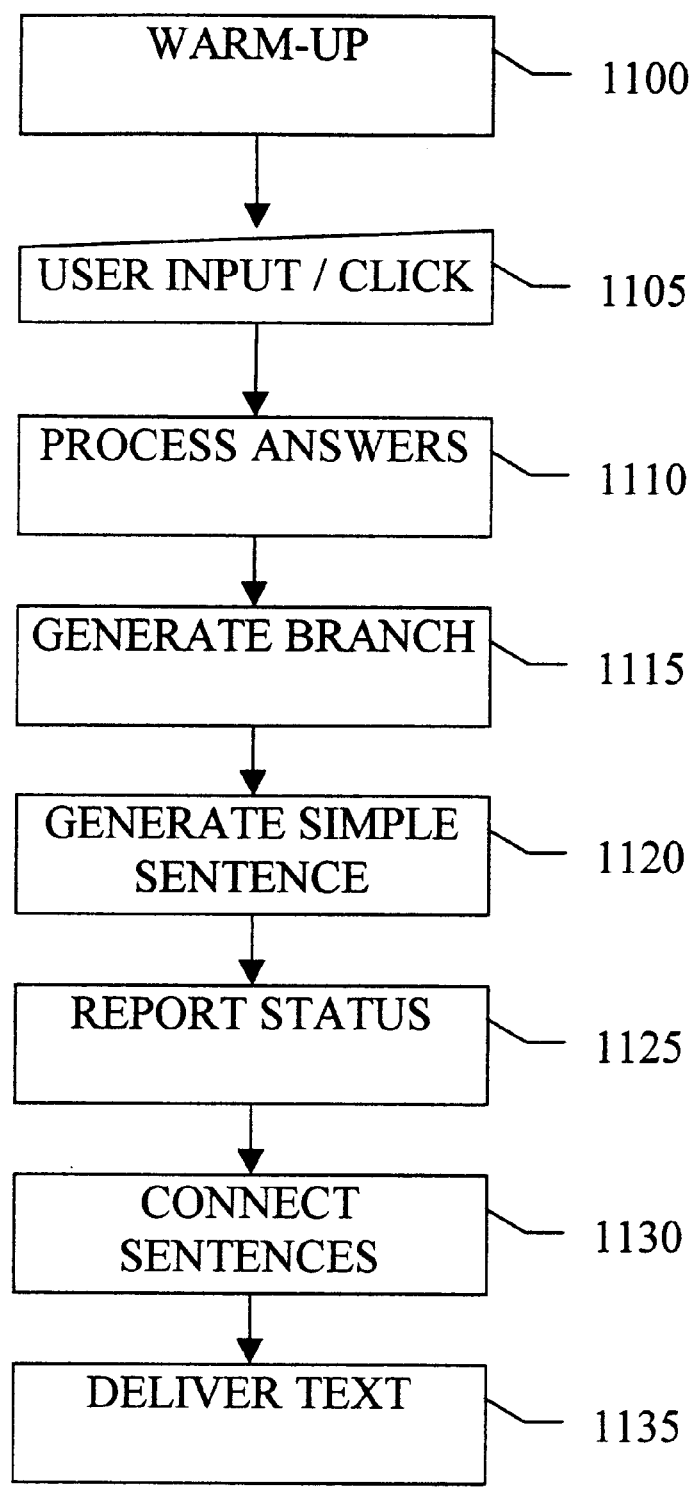
FIG. 11 is a simplified flowchart illustration of a preferred method of operation of the output text-generation mechanism 25 of FIG. 1A.

Reference is now made to FIG. 11, which is a simplified flowchart illustration of a preferred method of operation of the output text-generation mechanism 25 of FIG. 1A. The method of FIG. 11 comprises an overview of the text generation process. Elements of FIG. 11 are further elaborated in a separate flowchart in FIGS. 12–18, and are described in more detail below.

The deliver text step 1135 is the process by which the generated text is delivered. It is possible, as would be obvious to anyone skilled in the art, to deliver the text either as the entire paragraph consisting of multiple sentences, or specifically modifying directly only that sentence which has changed due to the last click. This is made possible, since the text-generation mechanism is aware of the number of the sentence in which change has occurred. For example, when delivering the text into a MICROSOFT® Word document, use can be made of the MICROSOFT® Word object model in order to modify only the sentence which has been modified in the text-generation mechanism, by the last click.

Figure 12:
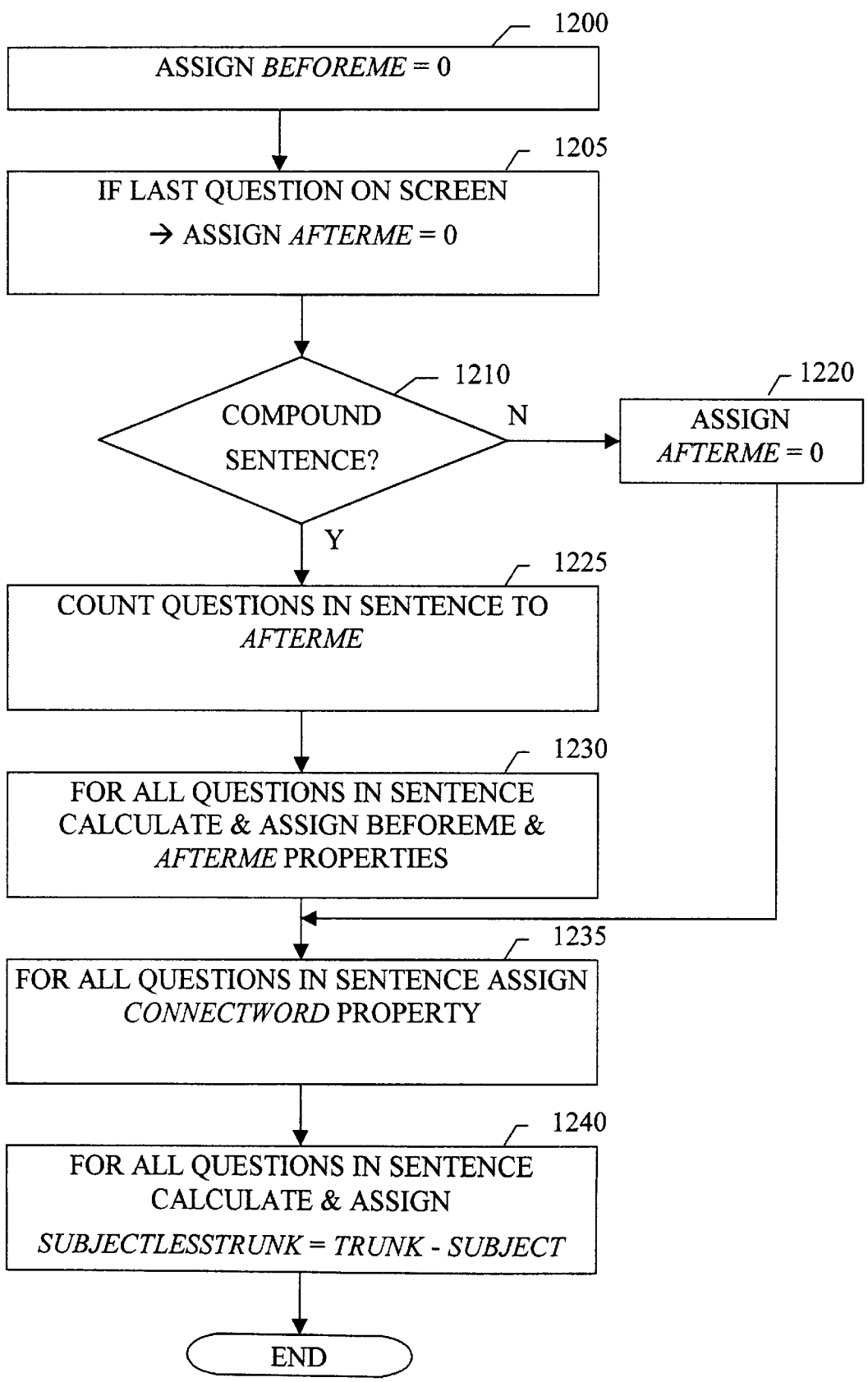
FIG. 12 a simplified flowchart illustration of a preferred implementation of the warm-up procedure 1100 of FIG. 11.

Reference is now made to FIG. 12, which is a simplified flowchart illustration of a preferred implementation of the warm-up procedure 1100 of FIG. 11. The warm-up procedure of FIG. 12 is a procedure which preferably takes place prior to the generation of text in response to a click (step 1105 of FIG. 11), in order to make the text generation process more efficient. In this process, the QLC which is at the head of each sentence preferably computes the possibility to connect to other QLCs which would 'belong' to 'his' sentence, and sets his properties and those of these QLCs so as to reflect their position in the sentence potential sentence, so that these parameters need not to be calculated during the process of text-generation.

The following detailed example relating to a preferred embodiment of the present invention is not meant to be limiting, and statements therein are intended to refer to preferred alternatives only:

Warm Up Method

The goal of this method is to perform all actions related to text generation, and which can be performed prior to the Click event, so as to speed the text generation process. In this pre-text-generation phase, the QLCs cooperate with neighboring QLCs, to check the possibility of connecting to create compound sentences, and calculate and assign (to themselves and to neighboring QLCs) several properties, which will be utilized during text generation.

This method is performed only by QLCs which are at the beginning of a potential sentence (except for connected branched sentences as mentioned above). TLC activates the first QLC, and this QLC, after organizing the QLCs that belong to its sentence, activated the QLC which is at the head of the following sentence, and so forth. This method is operated on Continuation questions only during Show-PopUp method of the TC, since the same QLCs are used to display many different pop-ups, and there would not be where to store the WarmUp data.

Each QLC which is at the beginning of a sentence, checks if the next QLCs have a similar subject (their Subject properties are equal), or Connect string property is not empty—which means that the sentences may be connected. If so, the QLC performs 2 actions on the next QLCs:

1. Prepares for them their Subjectless Trunk—by truncating their Trunk, removing the Subject from it. When the sentences are connected, the subject which appears in the first sub-sentence, should not be repeated in the next sub sentences. This eliminated the need to perform this action during text generation.
2. Assigns appropriate values to the BeforMe and AfterMe properties of itself and the next QLCs. These properties indicate the placement of the QLC in the potential compound sentence, and prevent the need to re-count it repeatedly during the generation and modification of the text. Note: In case of Branching Continuations, if the continuation question/s are connected to the sentence from which they branched, the BeforeMe and AfterMe properties are assigned to them, as if they were part of the Compound sentence from which they branched. Following is a description of the method steps, as they are represented in FIG. 12 (plus some additional minor steps):

1. Step 1200: Assign 0 to your BeforeMe property.
2. Check your CommaConnect property, if it is = True, assign ",_ to your ConnectWord property. If = False, then check your Language property, and assign the connecting word appropriate for this language to your ConnectWord property.
3. Step 1205: Is your NumQuestions property (the question of numbers which appear on the screen in this template, or the number of questions in a pop-up)=your Identity property? (in other words—am I the last question on the screen). If yes, assign 0 to your AfterMe property, and Exit.

4. Step 1210: If no, check if your Subject property, equals the Subject property of the next QLC (i.e. can I potentially connect to it). If no, Step 1220 assign 0 to your AfterMe property, and activate WarmUp method of the next QLC after you.
5. Go over the next QLCs after you, in a loop (number of loop iterations=NumAnswers minus Identity). For each QLC, check if its subject equals yours. In this way, count how many QLCs there are after you, which have a subject which is equal to yours (Step 1230).
6. While going over the QLCs, assign to the BeforeMe quality of the QLC directly after you 1, the next one 2, etc., so that this number reflects for each one of them how many QLCs there are in the sentence before it (Step 1230).
7. In addition, assign to the ConnectingWord property of each one of them, your ConnectingWord property (Step 1235).
8. Assign the number of QLCs after you, and whose subject equals yours to your AfterMe property (Step 1230).
9. Once more, go over the QLCs after you in a loop (AfterMe iterations), and for each one of them assign its AfterMe property. For the QLC directly after you, this number is smaller by one from your AfterMe property, the next QLC is again smaller by one, etc. The last QLC in the potential sentence (whose Subject property equals yours), its AfterMe property is 0 (Step 1230).
10. While going over the QLCs whose subject equals yours, perform the following action: Truncate from the beginning of their prefix (from its left end in all languages, except for Hebrew and Arabic, in which it is from their right end), a string the length of which is the length of their Subject property. Assign the resulting truncated string to their SubjectlessPrefix property (Step 1240).
11. Check if your ConnectString property is not empty. If not (i.e. you are potentially capable of connecting to the QLC before you connected by this string), truncate the Subject from the beginning of your Prefix, Concatenate the ConnectString to its beginning, and assign the resulting string in your SubjectlessPrefix property (Step 1240).
12. End.

Figure 13:
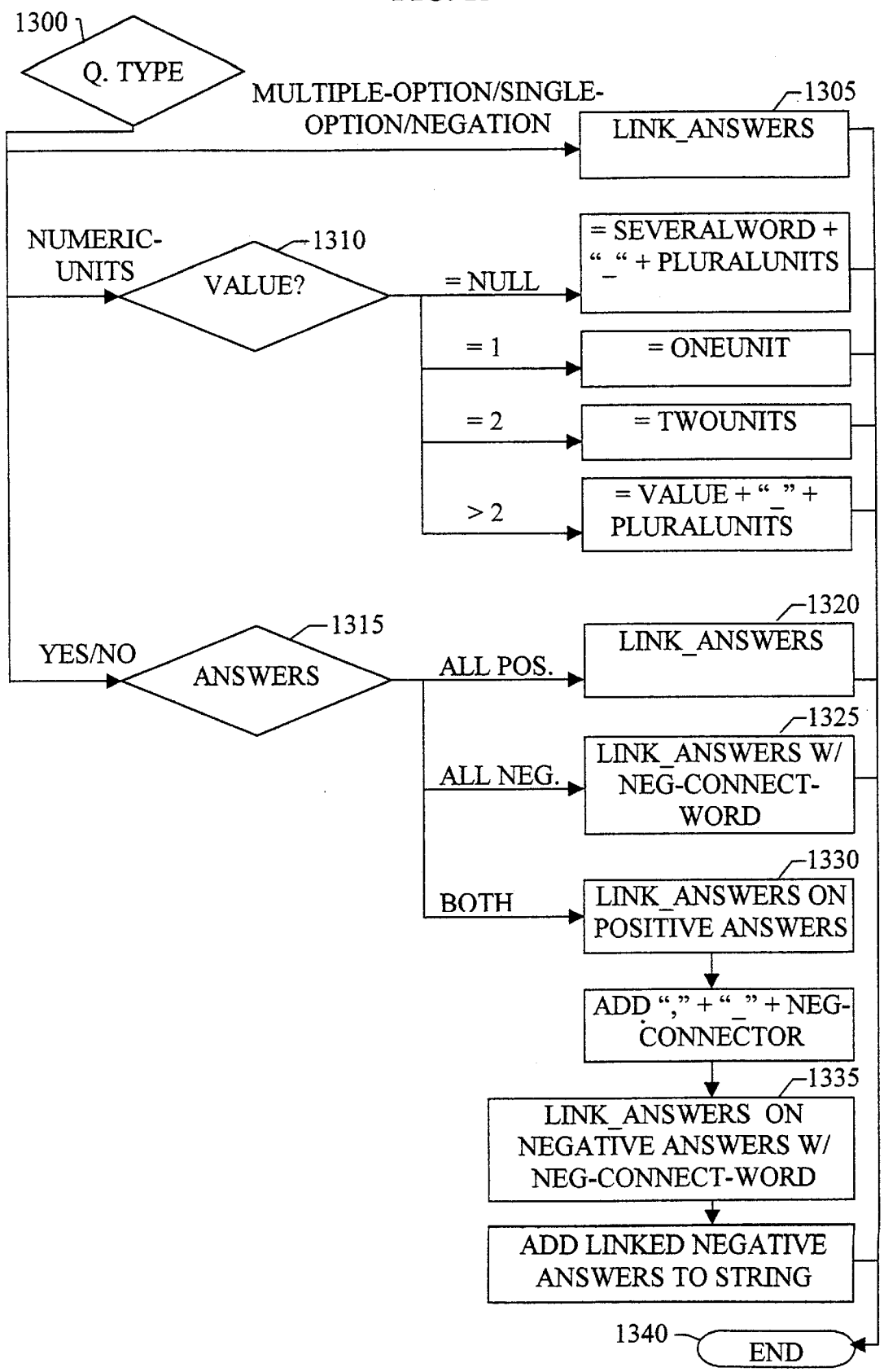
FIG. 13 which is a simplified flowchart illustration of a preferred implementation of the process answers 1110 procedure of FIG. 11.

Reference is now made to FIG. 13, which is a simplified flowchart illustration of a preferred implementation of the process answers procedure 1110 of FIG. 11. The first phase of generating a simple sentence preferably comprises processing the answers selected. This procedure is different in different types of questions, and in most types preferably uses the Link-Answers procedure described below in FIG. 14.

The following detailed example relating to a preferred embodiment of the present invention is not meant to be limiting, and statements therein are intended to refer to preferred alternatives only:

Process Selected Answers Method

1. Check the question type, and perform the following actions according to each of the different question types:
2. If Multiple Option, Single Option, Negation then simply activate the Link_Answers function 1305, as further elaborated in FIG. 14. For Single type, the function preferably returns only the one answer which was selected.
3. If Numeric Units (both a selection of a Single type option, which typically is used for selecting units e.g. days, weeks, months, as well as entry of a number into the text-field of the QLC e.g. 2 days), then the output depends on the VALUE. The generated text handles instances where no number was entered, as well as instances where the number entered is one (singular form of the selected unit is used), vs. plural. If the number entered is 2 this is also handled separately, since in some languages there is a different units form for double. Triple form of units, which also exists in some languages, is not supported (i.e. handled as plural).

In order to deal with these instances the QLC includes the properties: OneUnit, TwoUnits, PluralUnits, SeveralWord. (SeveralWord is the word 'Several' in the current language, e.g. in English it is = "Several", which is used if no number was entered by the user.)

Generated Text:
1. If Text=Null, then generated text is: SeveralWord+"_"+PluralUnits
2. If Text=1, then generated text is: OneUnit
3. If Text=2, then generated text is: TwoUnits
4. If Text>2, then generated text is: Text+"_"+PluralUnits
5. In all the above instances (1–4), if the Suffix property < > Null, then add to the end of the generated text: "_"+Suffix
6. All of the above steps (1–5) are described for Direction L→R. If Direction is R→L then perform these actions adding the strings to the left side of the string, and not as done 'normally' to the right (e.g. step 1: PluralUnits+"_"+SeveralWord).

4. If Yes/No question type, then, the text generated depends on the combination of answers which were selected, as follows:
   1. If only positive answers were selected (SelectedNegative=0), then generate the text as a regular Multiple Option question type (as described above), using the link answers procedure.
   2. If only negative answers were selected (Selected=SelectedNegative), then: activate the Link_Answers function, but assign the QLCs NegativeConnectingWord property to the ConnectingWord variable of the Link_Answers function (instead of the standard connecting word).
   3. If both positive and negative answers were selected (SelectedNegative < >0, AND Selected>SelectedNegative), then:
      Perform a simple Link_Answers with the positive answers
      Add comma+space+NegativeConnector to the end of the resulting string above.
      Perform Link_Answers with the negative answers, using NegativeConnectingWord as a connecting word, and add to the end of the resulting string above.

5. If Multiple Text, or Multiple Numeric question types, then
   1. Insert new line (chr(13))
   2. Insert GroupHeader+NewLine
   3. For each of the answers, insert: Answer+":"+TAB+Text+NewLine Referring back to FIG. 13, the method of FIG. 13 preferably includes the following steps:

Based on the question type (step 1300), three different routines for handling the answers selected are shown. Note that the three shown are an example, the concept not being limited to these three specifically or to only three routines; rather, there are preferably various types of questions, with a pre-defined logic of how the answers of each type will be handled. The value entered in a numeric-units question (null, 1, 2, or greater than 2) determines how the answers will be processed for that question type. Similarly, for a Yes/No question-type, if the questions are all positive, all negative, or mixed, determines the processing of the answers.

Figure 14:
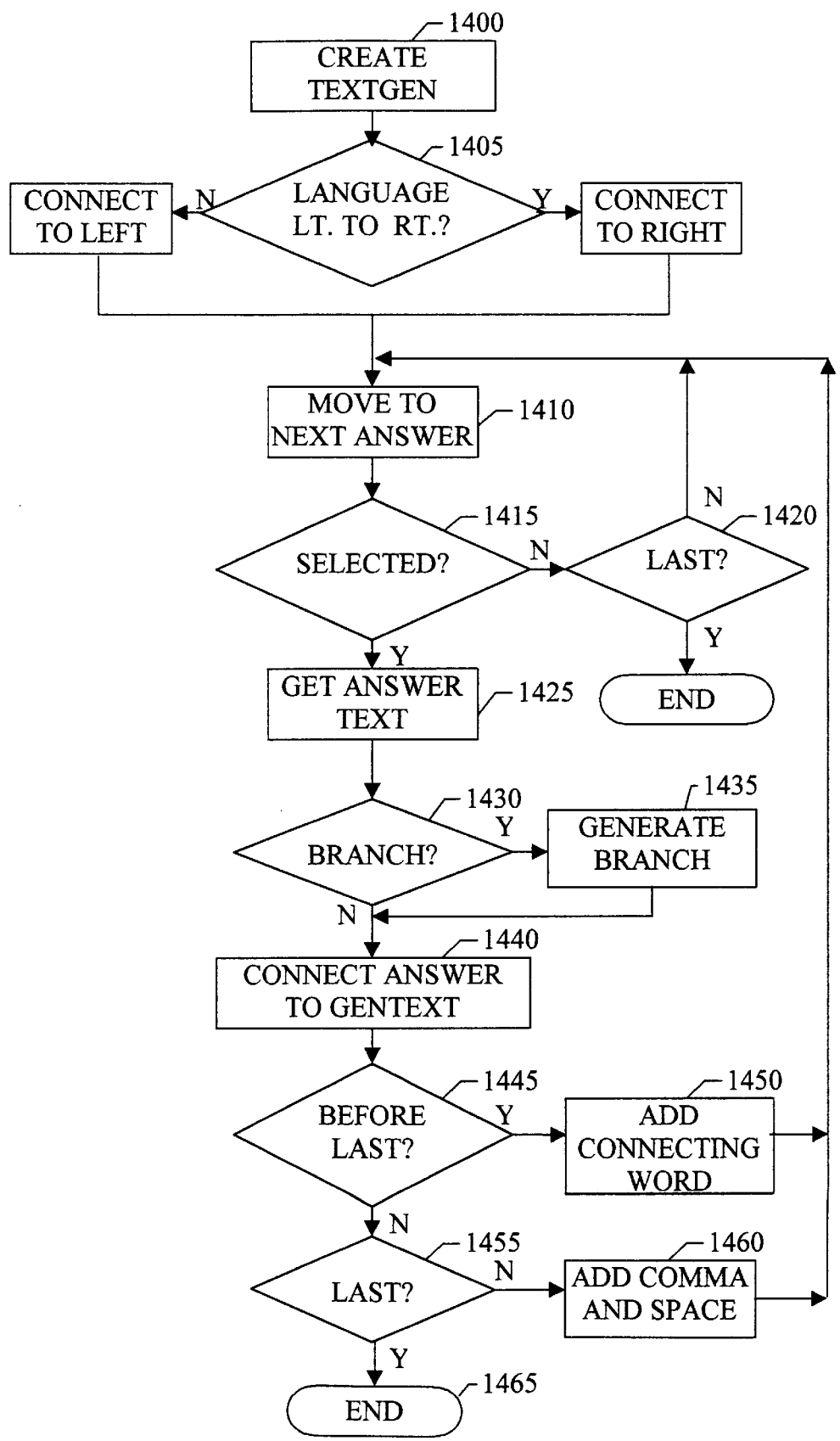
FIG. 14 is a simplified flowchart illustration of a preferred implementation of step 1305 of FIG. 13.
Figure 15:
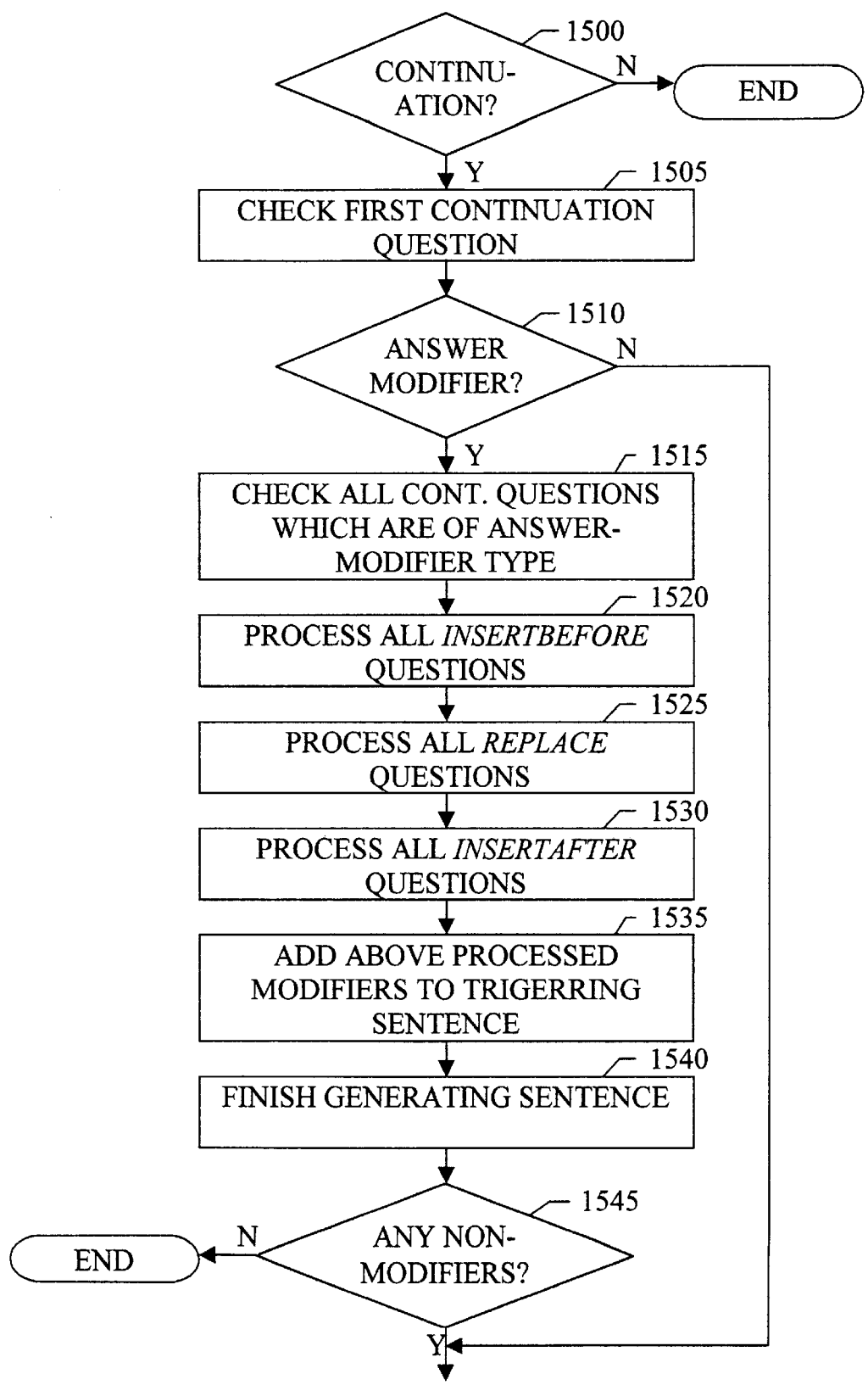
FIGS. 15A and ISB, taken together, comprise a simplified flowchart illustration of a preferred embodiment of step 1115 of FIG. 11.
Figure 15:
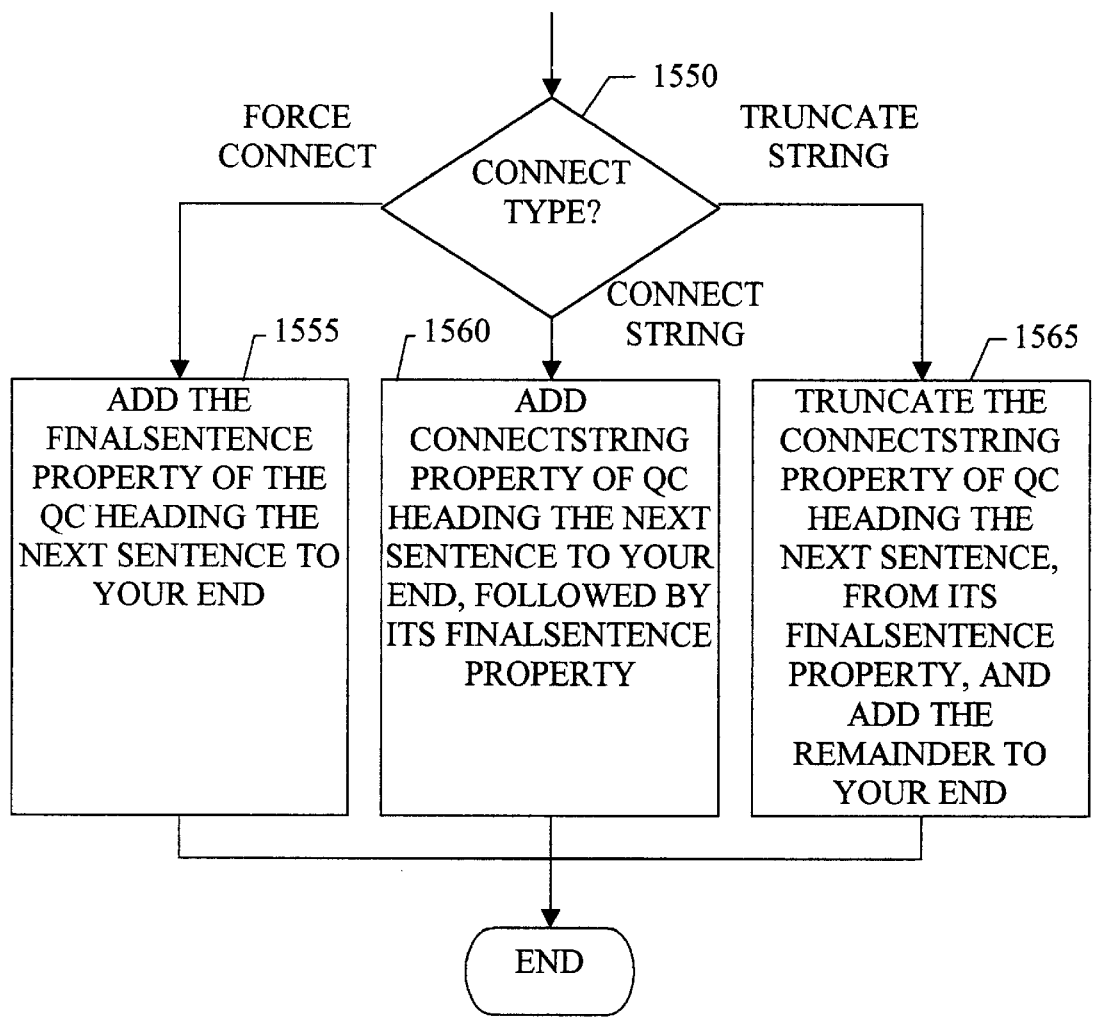

A Link_Answers routine 1305, further described below with reference to FIG. 14, is preferably utilized here in multiple instances, with slight variances, in steps 1305, 1320, 1325, 1330, and 1335.

Reference is now made to FIG. 14, which is a simplified flowchart illustration of a preferred implementation of step 1305 of FIG. 13.

The method of FIG. 14 preferably comprises a simple loop procedure of linking selected answers, such that they are separated by commas and a connecting word. The procedure is preferably utilized by the method of FIG. 13, described above.

The following detailed example relating to a preferred embodiment of the present invention is not meant to be limiting, and statements therein are intended to refer to preferred alternatives only:

Variables:

| | |
|---|---|
| ConnectingWord | The connecting word used in the sentence Language dependent Default = "and_". This variable includes the space after the connecting word, since in some languages the connecting word is just a letter which is joined to the next word. |
| Direction | Left-to-Right (default), or Right-to-Left |
| Answers | Number of answers which exist in this question |
| Selected | Number of answers selected by the user |
| Current | The number of the answer which the loop is currently dealing with |
| GenText | Stores the text-string produced by the Link_Answers function. |

Method Steps:

1. Create Textgen variable 1400, into which the linked answers will be stored.
2. Determine the language direction 1405, of the currently selected language. In a right to left language perform all the following steps, connecting strings from right to left, in left to right languages perform all the following steps connecting strings from left to right.
3. Go over, in a loop, Answers number of iterations, on the Response(1–18) properties of the QLC, in order to check the answers of the question, and check for each answer if it was selected 1415 (i.e. Response(Current) < > null). For each selected answer, perform the following steps (where Current is the number of the selected answer, on which the loop is on right now):
4. Find out the text of the selected answer 1425, which is stored in the Answer(Current) property. (note: unlike standard MS controls, the selection of the user, and the label of the answer are not stored as properties of the Check Box or Radio Button itself, but in separate fields, since only 6 answers are displayed simultaneously, and up to 12 additional answers are stored in memory.)
5. Check if the selected answer has a continuation (i.e. branching) question 1440 (the Continuation(Current) property < > 'none'). If so, perform the Generate_Branch method 1435 on this continuation (further elaborated in FIGS. 15A and 15B). This method checks the question/s in the continuation branch (the pop-up question or questions), and if the continuation is part of the referring sentence, returns a string which includes the referring answer as well as any necessary text of the pop-up questions joined to it, so that it can be included in the sentence.
6. Concatenate the Answer(Current) string to the GenText string 1440 (which will store the joined answers), as follows:
7. If Direction is Left-to-Right, the Answer string is joined to the right side of GenText, i.e. GenText=GenText+Answer(Current).
8. If Direction is Right-to-Left, the Answer string is joined to the left side of GenText, i.e. GenText=Answer(Current)+GenText.
9. If this is the answer before last selected 1445, then add to GenText a space ("_")+ConnectingWord+next answer 1450, again concatenating according to the Direction variable.
10. If last selected answer 1460, then add the last selected answer separated by space+ConnectingWord. Note: there is no space after the connecting word and before the last answer—this space is included in the ConnectingWord itself.

Reference is now made to FIGS. 15A and 15B, which, taken together, comprise a simplified flowchart illustration of a preferred embodiment of step 1115 of FIG. 11. The method of FIGS. 15A and 15B preferably comprises a procedure by which the text of continuation questions (i.e. questions which pop-up in response to an answer selected), is generated. It is preferably activated within the process answers method of FIG. 13.

The following detailed example relating to a preferred embodiment of the present invention is not meant to be limiting, and statements therein are intended to refer to preferred alternatives only:

Generate_Branch

Generate_Branch method is activated during the Generate Simple_Sentence method, for each answer in the QLC which has a continuation, and follows the following steps:

1. For each answer selected by the user, during the Generate loop which goes over all the selected answers, and before entering the answer to the generated text, check if it has a continuation 1500 (its Continuation property < > None)
2. If there is a continuation, check if any answer was selected in it: QLC(NumQuestions+1).Selected < > 0. Note: the QCs and QLCs in the popup have ID numbers which begin from where the QCs and QLCs in the template end.
3. If any answer was selected, check if its continuation type is such that it is to be connected to 'your' sentence (its ContinuationType property=Replace, InsertBefore, or InsertAfter). If not→skip to step 8.
4. Are there any more questions which connect to me, and in which answers were selected (ActiveSegments property of the first QLC in the popup will be>0)? If not 1505→join the SimpleSentence property of the popup question before, after or instead of the answer which triggered it—according to the ContinuationType property, and then add the resulting string to the SentenceBuild. Jump to step 8.
5. If yes (there are additional popup QLCs which need to connect to me), go in a loop over these additional QLCs (number of iterations is AfterMe property of the first popup QLC). Check and remember for each one of them their type: InsertBefore, InsertAfter, or Replace.
6. Go over in the following loops, according to the following conditions and in the following sequence, in order to add the segments of these questions to the main sentence. The goal of this step is to add the text of QLCs which are of a InsertBefore type—before the answer that triggered them, Replace type—replacing the answer that triggered them, and InsertAfter—after the answer which triggered them. The text from the popup questions is added into a temporary variable AnswerBuild.
    1) If there was one or more questions which were of a InsertBefore type 1520, then loop over these QLCs, and add the SimpleSentence property of each of them to the AnswerBuild temporary variable.

2) If there were question/s of a Replace type 1525, loop over them and add them to the end of the AnswerBuild variable. If not→then add the answer which triggered the continuation, to the AnswerBuild.

3) If there was one or more questions which were of a InsertAfter type 1530, then loop over these QLCs, and add the SimpleSentence property of each of them to the end of the AnswerBuild variable.

7. Add the compound answer which was formed into AnswerBuild into your sentence (add it to your SentenceBuild) 1535.

8. If the first popup question is not of a InsertBefore, InsertAfter or Replace type, remember its type (ConnectString, TruncateString, or ForceConnect), for future steps.

9. Are there any additional questions in the continuation questions, which do not connect to your sentence (in the first QLC in the popup, AfterMe property+ 1<NumQuestions)? If so, remember the ID of the first of these questions, and its type (ConnectString, TruncateString, ForceConnect).

10. Go back to generating your sentence as usual.

11. After finishing to generate your sentence, recall: was there a ConnectString, TruncateString, ForceConnect sentence in the continuation questions (step 8)? If so 1550, remove the period and two spaces from the end of your sentence, and add the FinalSentence of this sentence to your sentence, as follows:

1) If ForceConnect, then simply join it to your end 1555.

2) If ConnectString, then add their ConnectString property to your end, followed by their FinalSentence 1560.

3) If TruncateString, then truncate their ConnectString property to their FinalSentence, and join the resulting string to your end 1565.

12. If there were continuation questions which are not connected to you (step 9), then add them (their FinalSentence property) to your FinalSentence property (note: in this case, the FinalSentence property of the triggering sentence, stores actually several sentences—its own sentence, as well as the sentences of the independent continuation sentences).

Figure 16:
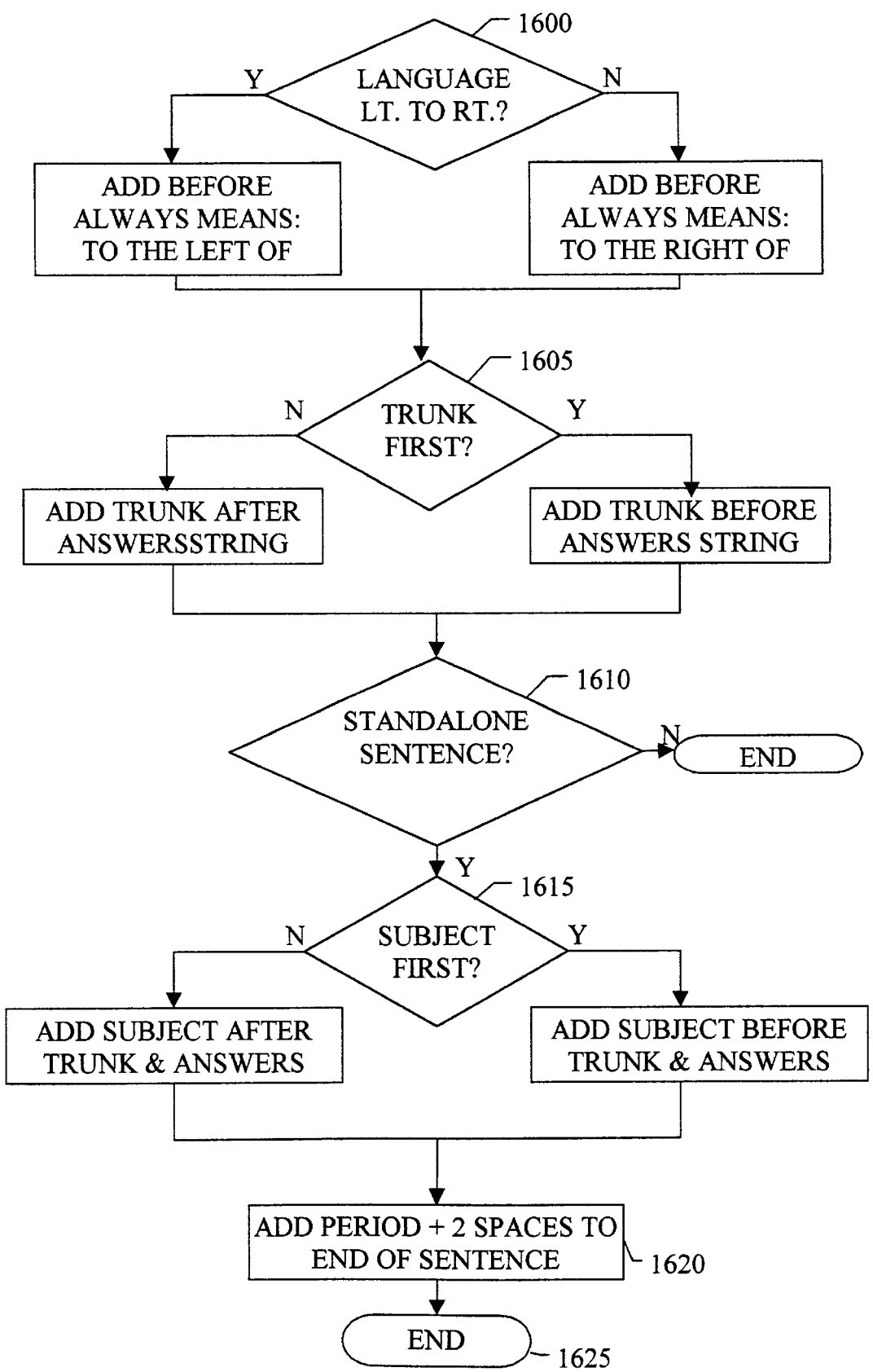
FIG. 16 is a simplified flowchart illustration of a preferred implementation of step 1120 of FIG. 11.
Figure 17:
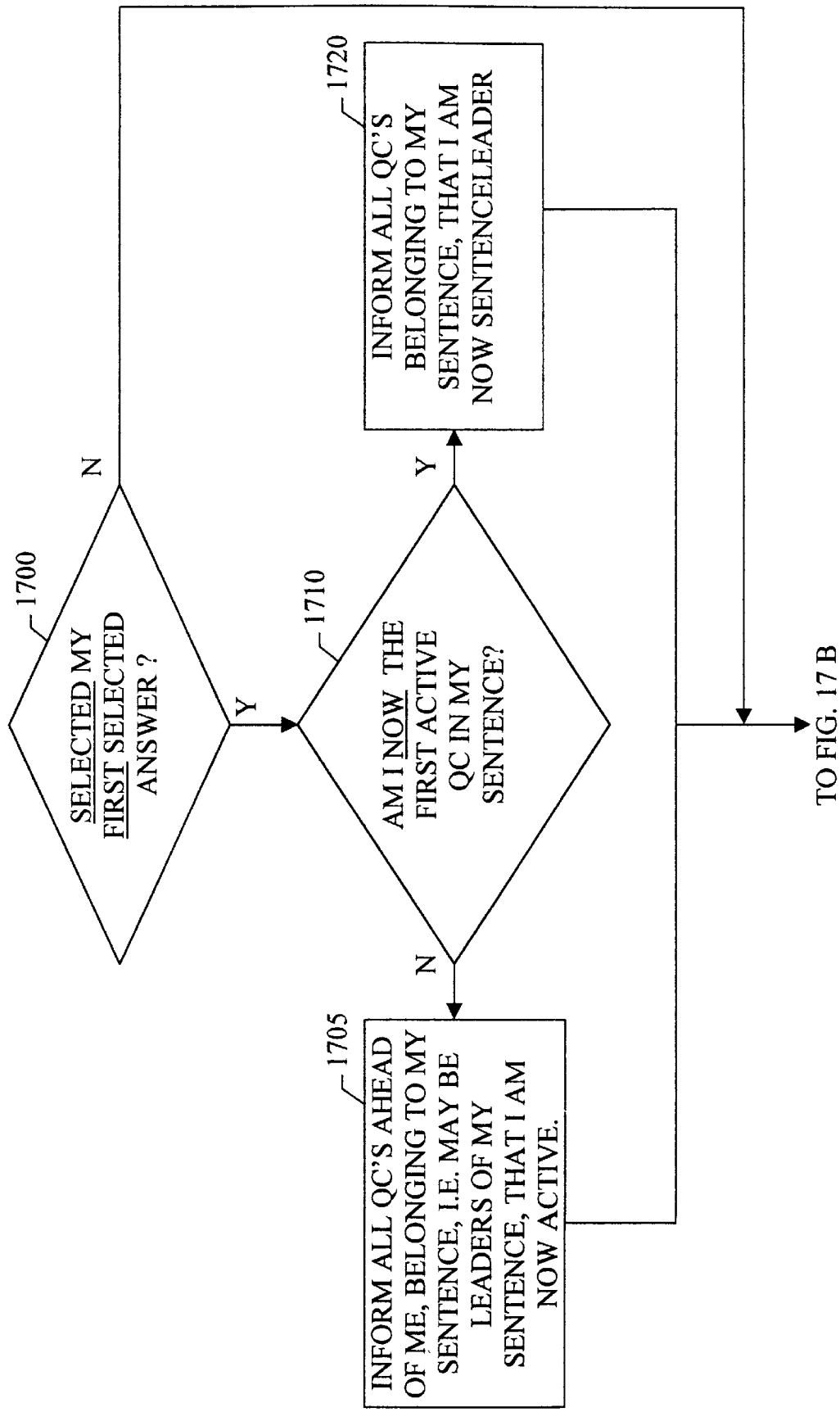
FIGS. 17A and 17B, taken together, comprise a simplified flowchart illustration of a preferred implementation of step 1125 of FIG. 11.
Figure 18:
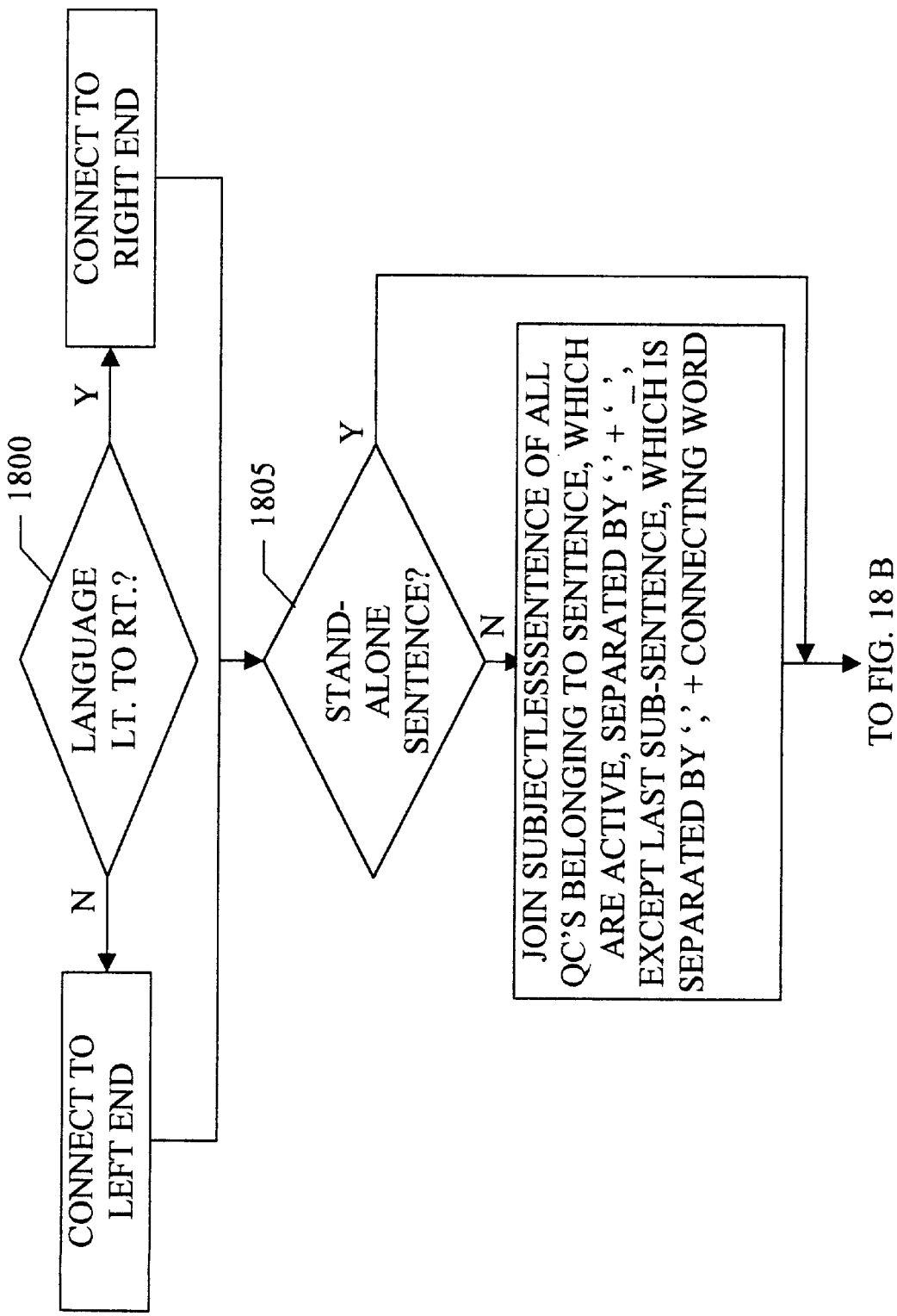
FIGS. 18A and 18B, taken together, comprise a simplified flowchart illustration of a preferred implementation of step 1130 of FIG. 11.

Reference is now made to FIG. 16, which is a simplified flowchart illustration of a preferred implementation of step 1120 of FIG. 11.

The method of FIG. 16, which preferably follows the process answers step (step 1110 of FIG. 11), is a method by which the subject and 'trunk' (frequently refers to verb) of the sentence are joined to the processed answered (see FIGS. 13–15), to form a simple sentence. The operation of the method of FIG. 16 is preferably dependent on the language properties, for example, location of the subject in the sentence in a given language. The drawing gives a simplified version, which demonstrates the basic concept; the drawing does not show the slight differences in the procedure, for different types of questions.

The following detailed example relating to a preferred embodiment of the present invention is not meant to be limiting, and statements therein are intended to refer to preferred alternatives only:

II. Prepare_To_Connect method

1. If the QLC is the first one in its sentence (SentenceLeader property=Identity property), then this stage generates a simple sub-sentence which will be at the beginning of the compound sentence. A period and spaces are added to the end, since it may already be the final sentence, if there are no other sub-sentences to join it. The Connect method described later, may join other sub-sentences to its end, by truncating the period and spaces from its end.

1) In a Multi, Single, and Numeric types: add Prefix to the beginning of the generated text, and a period and 2 spaces to its end.

2) In a Negation type:

3) If the Negation answer was selected (it is always the first answer in the question), then just add a period and 2 spaces (prefix is not added to the beginning).

4) If any other answer was selected, then add Prefix before the beginning of the generated text, and a period and 2 spaces to its end (same as regular Multi type).

5) In a Yes/No type:

6) If not only negative answers were selected (Selected < > SelectedNegative), then add Prefix before the beginning of the generated text, and a period and 2 spaces to its end.

7) If only negative answers were selected (Selected= SelectedNegative), then add NegativePrefix before the beginning of the generated text, and a period and 2 spaces to its end.

2. If the QLC is not the first QLC in its sentence (SentenceLeader property < > Identity property), then this stage generates a sub-sentence, which is ready to be joined to the compound sentence to which it belongs. It uses a SubjectlessPrefix (or SubjectlessNegativePrefix), and has no period and spaces at the end:

1) In a Multi, Single, Numeric types: add SubjectlessPrefix to the beginning of the generated text.

2) In a Negation type:

3) If the Negation answer was selected (it is always the first answer in the question), then truncate the Subject from the beginning of this answer.

4) If any other answer was selected, then add SubjectlessPrefix.

5) In a Yes/No type:

6) If not only negative answers were selected (Selected < > SelectedNegative), then add SubjectiessPrefix before the beginning of the generated text.

7) If only negative answers were selected (Selected= SelectedNegative), then add SubjectlessNegativePrefix before the beginning of the generated text.

3. In any case (sections 1,2 above), store the generated text in the SimpleSentence property.

Referring back to FIG. 16, LanguageDirection? (step 1600), TrunkFirst? (step 1605) and SubjectFirst? (step 1615) correspond respectively to LanguageDirection, TrunkLocation and SubjectLocation properties of the question (QLC), and are preferably language dependent; that is, preferably defined in the language table of the knowledge-base (unit 930 of FIG. 9). StandaloneSentence? (step 1610) is preferably deduced from the properties of the QLC (SentenceLeader Identity, and ActiveSegments<1).

Reference is now made to FIGS. 17A and 17B, which, taken together, comprise a simplified flowchart illustration of a preferred implementation of step 1125 of FIG. 11. Preferably, the method of FIGS. 17A and 17B comprises a process by which, following a click event, a QLC 'reports' to other QLCs its change in status, so as to facilitate an efficient connection of simple sentences to compound sentences. This is technically achieved by the QLC setting its own properties, as well as those of other QLCs.

The following detailed example relating to a preferred embodiment of the present invention and specifically to steps 1700, 1705, 1710, 1720, 1725, 1730, 1735, 1740, 1745, and 1750, is not meant to be limiting, and statements therein are intended to refer to preferred alternatives only:

Report

1. If the click caused my first selected answer (Selected=1), and I am included in a sentence in which I am not the first QLC (BeforeMe < > 0), then loop over the QLCs before you 'BeforeMe' iterations, and add I to their ActiveSegments parameter. This indicates to any one of them which would construct the compound sentence, that there is another sub-sentence (me) which was not active until now, and is active now.
2. If the click caused my last selected answer to be unselected, and therefore caused my sub-sentence to be canceled (Selected=0), and I am included in a sentence in which I am not the first QLC (BeforeMe < > 0), then loop over the QLCs before you 'BeforeMe' iterations, and deduct 1 to their ActiveSegments parameter. This indicates to any one of them which would construct the compound sentence, that there is now one less sub-sentence (me), which was active until now, and is inactive now).
3. If the click caused my first selected answer (Selected=1), and I am now the QLC heading the sentence to which I belong (my SentenceLeader property is Null, which means that no QLC before me in the sentence has indicated that it is in charge), then loop over the QLCs after me, which belong to my sentence (AfterMe iterations), and assign to their SentenceLeader property my Identity property—'informing' them that I am now in charge of the sentence. Also assign my Identity to My Sentence-Leader property.
4. If the click caused my last selected answer to be unselected, and therefore caused my sub-sentence to be canceled (Selected=0), and until now I was the QLC heading the sentence to which I belong (my Sentence-Leader property=my Identity), then loop over the QLCs after me, which belong to my sentence (AfterMe iterations). Check if any of them is active (his Selected property>0). If so, assign his Identity to his Sentence-Leader property, and to the SentenceLeader property of the QLCs after him (indicating to him and the next QLCs that he is now in charge) (and activate Generate method on him). If not, assign Null to their SentenceLeader (indicating to all the QLCs in my sentence, which are not active at the moment, that no one is in charge.)

Reference is now made to FIGS. 18A and 18B, which, taken together, comprise a simplified flowchart illustration of a preferred implementation of step 1130 of FIG. 11. The method of FIGS. 18A and 18B comprises a method of connecting simple sentences formed by individual QLCs (see also FIGS. referred to above 13–16) to form compound sentences, based on the connectability parameters which were set before the beginning of user selections (warm-up phase—see FIG. 12, referred to above), and the change in status during user clicks (report status phase—see FIG. 17, referred to above).

The following detailed example relating to a preferred embodiment of the present invention is not meant to be limiting, and statements therein are intended to refer to preferred alternatives only:

Connect

This method is used to generate a compound sentence from several sub-sentences (formed by several QLCs). It is performed by the QLC which heads the sentence, either by his 'initiative' or by that of one of the QLCs which belong to 'his' sentence and which have changed (had a click event).

The method steps are as follows:

1. Determine the language direction 1800, based on the LanguageDirection property of the QLC. If left to right, connect the strings in the following steps always to the right end of the original string, if not, then connect to the left end.
2. Check if the sentence is a standalone sentence 1805 (ActiveSegments property=0). If not go on to the next step, if yes, skip to the following step.
3. Join SubjectiessSentence of all QLCs belonging to your sentence, and which are active (i.e. 1 or more answers have been selected in them), separated by comma and a space, except the last sub-sentence, which is separated by comma and connecting word.
4. Check the SubjectFirst property of the QC 1810. This property holds the information about the language sentence structure: in the current language, does the subject appear at the beginning or at the end of the sentence. Add the Subject property accordingly, to the beginning or the end of the joined SubjectlessSenteneces.
5. Check if this sentence should be force-connected to the following sentence 1820. This is defined by the Connect Property of the QLC heading the next sentence being not null. If it shouldn't be connected, then end, else move to the next step.
6. Check the connect type 1820, and connect this sentence to the next one, in the following manner:
   i. If 'Force Connect' type, then add the final sentence property of the QLC heading the next sentence to the end of your sentence.
   ii. If 'Connect String' type, then add the ConnectString property of the QLC heading the next sentence, followed by its FinalSentence property, to the end of your sentence.
   iii. If 'Truncate String' type, then truncate the Connect-String property of the of the QLC heading the next sentence, from its FinalSentence property, and add the reminder to the end of your sentence.

It will be appreciated that, although the connecting of sentences is one of the most challenging processes, the method of FIGS. 18A and 18B is relatively simple, because of all of the preparation which was done in previous phases.

Figure 19:
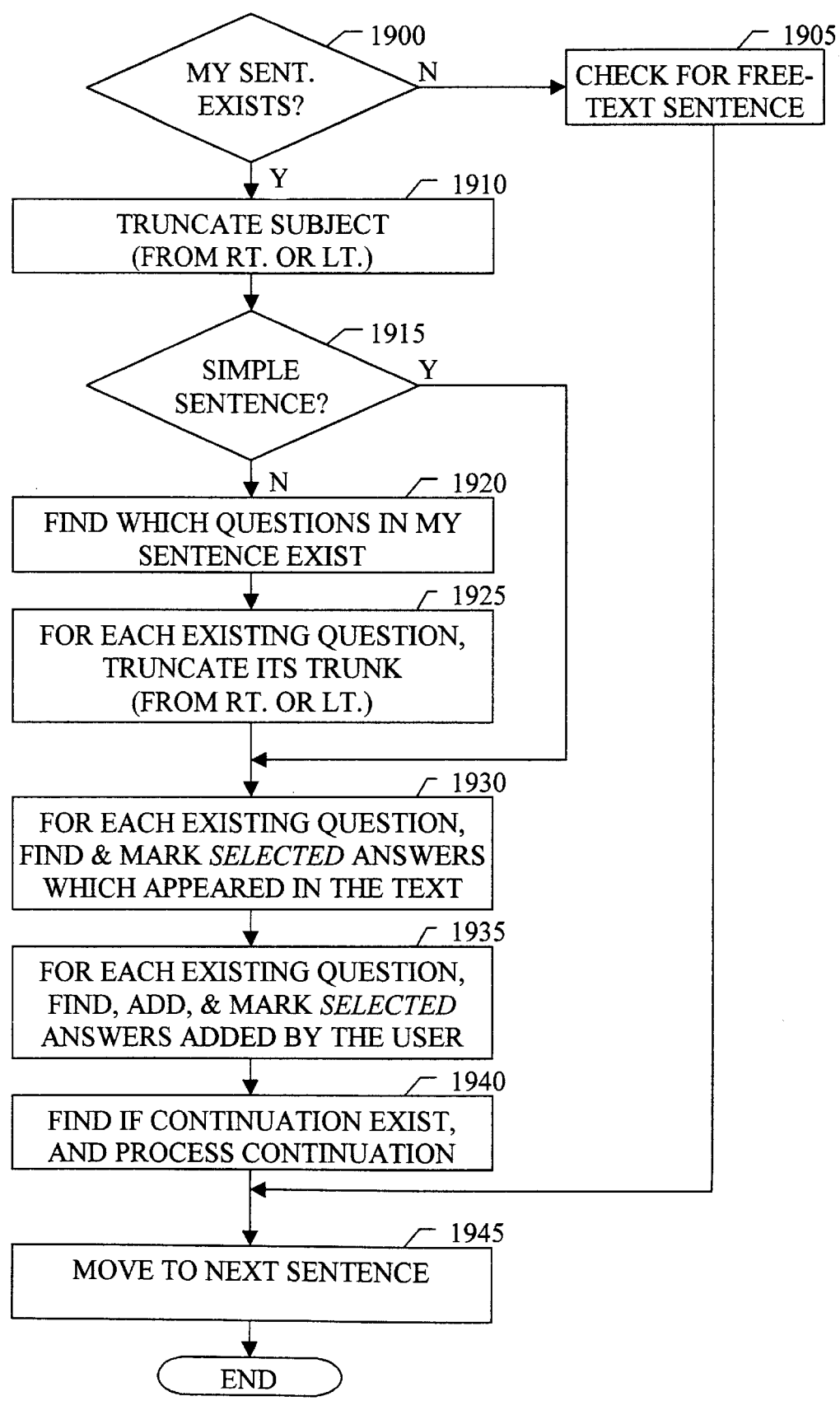
FIG. 19 is a simplified flowchart illustration of a preferred implementation of the text analysis mechanism 35 of FIG. 1A.
Figure 20:
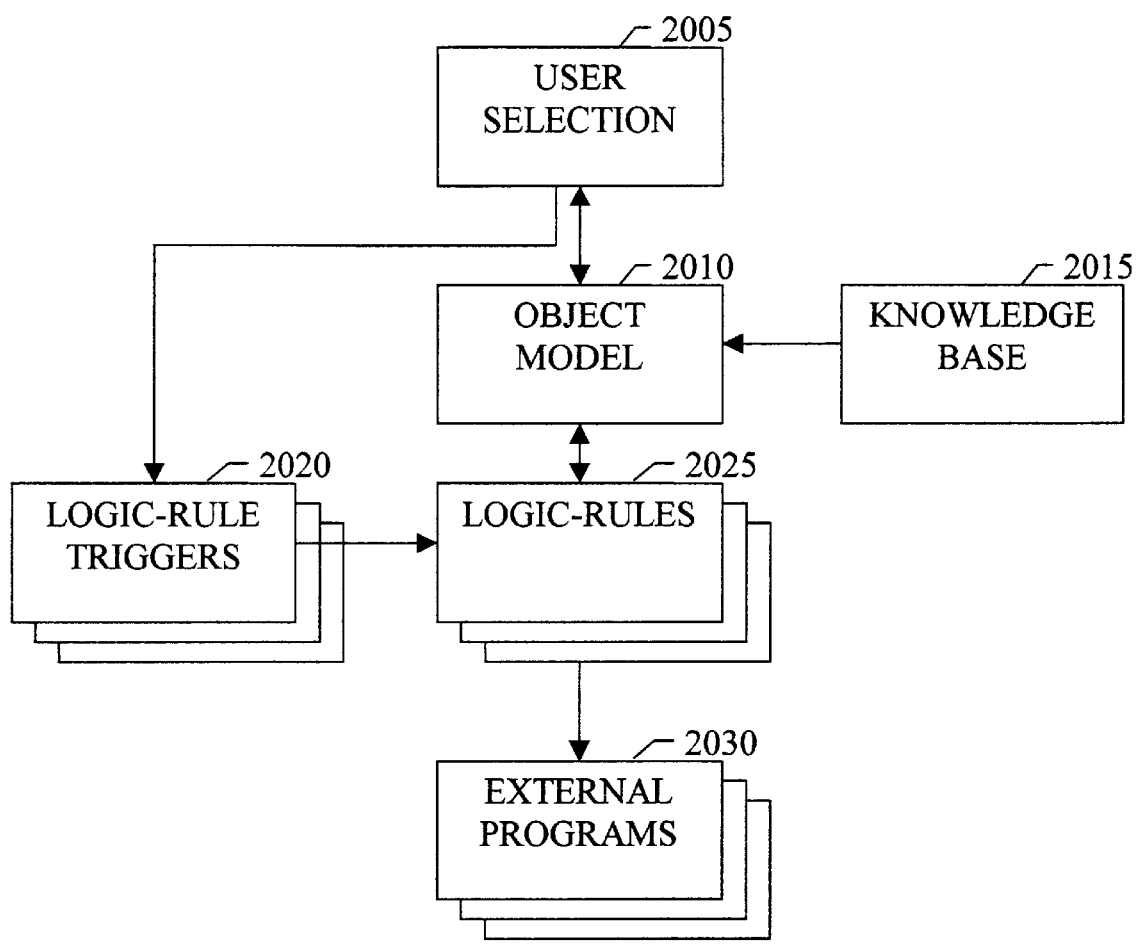
FIG. 20A is a simplified block diagram illustration of a preferred implementation of the decision support mechanism 50 of FIG. 1A.
FIG. 20B is a simplified flowchart illustration of a preferred method of operation of the apparatus of FIG. 20A.
Figure 20:
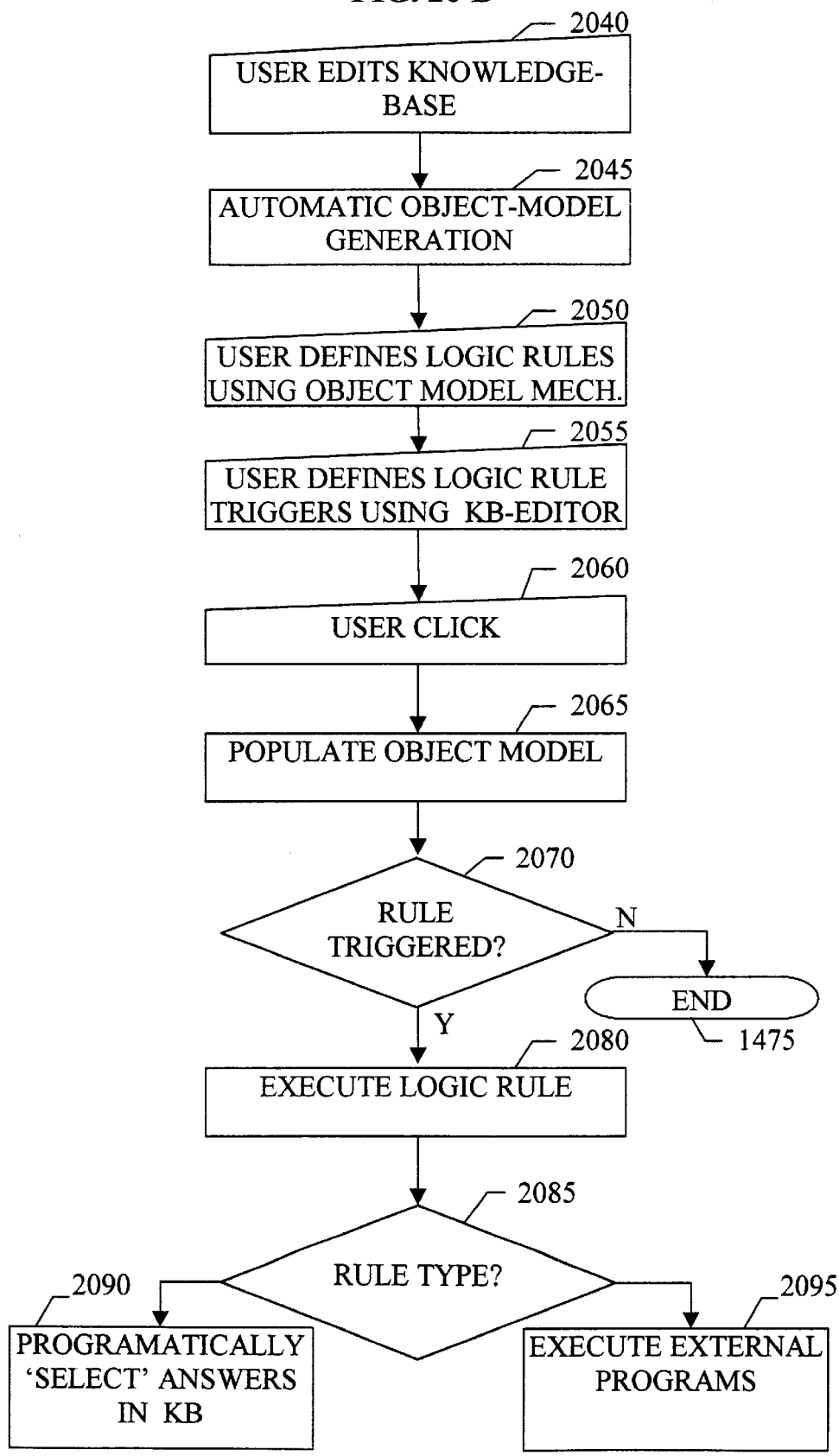

Reference is now made to FIG. 19, which is a simplified flowchart illustration of a preferred method, useful with the present invention, of analyzing structured text which was formed by a text generator. The method of FIG. 19 is preferably operative to determine the questions and answers which caused the creation of the generated text, by a process which, in effect, reverses the text generation process, such as, for example, the process of FIG. 11, described above. In essence, this process is merely a reversal of the text-generation process, which was described in detail in FIGS. 11–18. FIG. 19 gives an illustration, of how this process works. A similar methodology is used in order to analyze text of branching continuation questions (reversal of the Generate Branch mechanism described in FIGS. 15A and 15B), which is not explicitly described in FIG. 19.

Analyze-Text Method

This method is used in order to analyze text which was previously generated by the system (by TC and QLCs), in order to find out which answers to which questions caused the generation of this text. The method is pretty much the reverse process of generating the text. The method is activated by TC. Before activating it, TC assigns 1 to SentenceNumber property of QLC(0) (the first QLC), and then activates this method on it, i.e.: QLC(0).Analyze_Text.

Method Steps (performed by QLCs heading sentences):
1. Check if my sentence appears in the text 1900, by the following method: Using the 'Find' command, Check if your Trunk property exists in the text. If it is found, then check if the Subject property exists in the same sentence. If it does, then my sentence exists in the text. Perform the steps 2–9 to further find out which parts of your sentence appear in the text. If I do not exist in the text, then jump to step 10.

This checking process includes: (a) checking which of your answers should be selected, (b) checking continuation questions if there are any, and (c) if it is a compound sentence, checking the other questions in the sentence.
2. Find out the number of the sentence in the text, in which the Trunk was found. Store it in your SentenceNumber property. Note: All the following steps of checking yourself and any other QLCs which belong to your sentence, is limited to checking this sentence in the text.
3. Truncate the Subject from the head of the sentence or from its tail 1910, depending on the SubjectAtBeginning property, and the period and two spaces from its end. Store the resulting string to your SubjectlessSentence property.
4. Find out, mark, and count, which other QLCs (if any) participated in creating the sentence:
   i. If I am a Simple sentence 1915 (AfterMe=0), then jump to next step (5).
   ii. Else: Loop over the <AfterMe> QLCs after me (i.e. those that belong to my sentence).
5. For each of my QLCs, use the Find command to check if their Trunk exists in the sentence 1920.
6. If it does, assign I to their Selected property, and add I to my ActiveSegments property.
7. Parse the sentence to the AnswersString properties of the QLCs that have formed it (the string composed of selected answers, separated by commas and connecting word); one such string for each QLC sub-sentence of the full sentence. The direction of the parsing in this step is dependant on the grammar logic structure of the sentence (which is language dependant), as it is reflected in the TrunkLocation property. This process is as follows: If the TrunkLocation property=TrunkBeforeAnswers, then parse from right to left 1925:
   i. Find out which is the last QLC in the sentence which is active (Loop through the QLCs in the sentence, starting with me and ending with the QLC which is <AfterMe> after me. Check which is the last one whose Selected property=1). (Note: If I am a Simple sentence, or a head of a compound sentence but only I was active, then I am both head of the sentence, as well as last in it. In this case, the loop described below is obviously performed only once).
   ii. Assign your SubjectlessSentence property to a temporary string variable called MyText, for the text manipulation of the next steps, which will truncate it from right to left, in order to find the AnswersString for each of the active QLCs).
   iii. Find the location of the Trunk string property of this QLC, in MyText, and calculate the location of its right end (e.g. using VB InStr & Len commands).
   iv. Parse MyText from the right end of the Trunk of the last active QLC (calculated above), to the right end of MyText, and store the resulting string to AnswersString property of this QLC.
   v. Remove Trunk from the right side of MyText. e.g. Left(MyText(Len(MyText)-Len(Trunk))).
   vi. Remove the comma & space or the comma & connecting-word which appear before (to the left of) the Trunk (separating the sub-sentences). Since this is a loop from the end of the sentence backwards, after the first Trunk, look for and remove the comma & connecting-word, and then after the next Trunks remove the Comma and space. Obviously, the last iteration in this loop is the first sub-sentence, and therefore there is no comma before it, to be removed.
   vii. Repeat steps iii–vi (ActiveSegments+1) times, in a descending loop, for each of the active QLCs in my sentence, starting with the last one, and ending with me.
8. If the TrunkLocation property=TrunkAfterAnswers, then parse from left to right 1925:
   i. Assign your SubjectlessSentence property to a temporary string variable called MyText, for the text manipulation of the next steps (which will truncate it from left to right, in order to find the AnswersString for each of the active QLCs).
   ii. Find the location of your Trunk string property, in MyText, and calculate the location of its left end.
   iii. Parse MyText from the left end of MyText to the left end of your Trunk (in MyText), and store the resulting string to your AnswersString property.
   iv. Remove Trunk from the right side of MyText.
   v. Remove the comma & space or the comma & connecting-word which appear after (to the right of) the Trunk (separating the sub-sentences). Since this is a loop starts from the beginning of the sentence, remove the Comma and space after each of the Trunks, except for the one before last, which is separated by a comma & connecting-word, which need to be removed. After the last one, there is nothing to remove.
   vi. If there are additional QLCs in my sentence which have contributed to the sentence (ActiveSegments>0), then repeat steps ii–v again for these QLCs, in an ascending loop, for each of the active QLCs in my sentence, starting with the one after me, and ending with the last active QLC in the sentence.
9. Check which of my answers appear in the text, and mark them selected:
   i. Loop over the AnswersString property string, parse it until the next comma or connect-word, and store in temporary variable AnswerSegment.
   ii. Loop over your Answers, comparing them to the AnswerSegment.
   iii. If found match 1930, 'select' this answer (assign 'True' to its 'Selected' property).
   iv. If AnswerSegment doesn't match any answer, then check the List to which your question is linked (and from which the user may select answers to add temporarily or permanently to the knowledge-base question). If it matches, add this answer to your question temporarily and mark it as selected. Technically: it is added to one of the additional Answer fields in the QLC (the knowledge-base stores up to 12 answers per question, but the QLC has additional 6 Answer and Response fields for this purpose), and the corresponding Response fields is marked selected.
   v. If it doesn't exist in the List, then add AnswerSegment as a new temporary answer to your question in the QLC 1935, as described above. Note: in any case, no modification is made to the knowledge-base, the addition is only at the level of the QLC.
10. Have the QLC who is heading the next sentence in the KB check the current text-sentence, to see if he has generated that sentence, repeating if necessary the step 1 above. If he has, let him repeat steps 2–9 above to determine which of his answers appear etc.

11. If he does not appear in the text, repeat this step 1 for all of the QLCs heading all of the sentences in my paragraph. If none of them match the currently checked sentence, then I must conclude that this sentence is a free-text sentence, entered by the user. In this case, add it as free-text to my FinalSentence property.

12. Invoke the QLC heading the next sentence after me, to check the next sentence in the text, repeating steps 1–12, until the QLC heading the last sentence in the template has done so.

Reference is now made to FIG. 20A, which is a simplified block diagram illustration of a preferred implementation of the decision support mechanism 50 of FIG. 1A.

The decision support mechanism of FIG. 20A comprises an object model 2010, a plurality of logic rules 2025, and a plurality of logic rule triggers 2020, which interact which user data-entry selections 2005, a knowledge-base 2015, and external programs 2030.

Based on the structure of the knowledge-base 2015, which generally corresponds to element 140 of FIG. 1B, which the user has created when creating or modifying the application using the no-programming knowledge-base editor (KB) 45 of FIG. 1A, as further described with reference to FIG. 26, the system preferably automatically creates an object model 2010 which reflects the structure of the knowledge-base 2015.

Preferably, each time the user enters data, typically by making a data-entry selection 2005, the system automatically populates the object model 2010, to reflect the selections made by the user. Data-entry selection 2005 is preferably done via the hierarchical questionnaire data input mechanism 15 of FIG. 1A.

Also, each time the user makes a data entry selection 2005, the system preferably checks to see if that data-entry event is associated with one of multiple logic rule triggers 2020, which the user may preferably define without any programming, using the knowledge-base editor 145.

Whenever a logic rule trigger 2020 is triggered by a user selection 2005, then the appropriate logic rule 2025 is preferably activated. There are typically multiple such logic rules 2025, which the user may define. Logic rules 2025 are typically short macros, or segments of simple computer code, such as, for example Visual Basic code, which utilize the object model 2025, to express programmatic conditions or assignments onto the Object Model. For example a condition may be: "IF Color=Red THEN . . . ". An assignment may be: "IF Color=Red THEN Status= NeedsPainting". These logic rules 2025 will be executed whenever the conditions in one of the logic rule triggers 2025 have been met.

Reference is now made to FIG. 20B, which is a simplified flowchart illustration of a preferred method of operation of the apparatus of FIG. 20A.

Preferably, steps 2040, 2045, 2050, and 2055, described below, represent a setup process, which typically takes place whenever the user changes the structure of the knowledge-base.

The method of FIG. 20B preferably includes the following steps:

When the user edits the knowledge-base (step 2040), the system automatically creates an object model (step 2045) which preferably reflects the exact structure of the hierarchical knowledge-base. For each template, question, and answer in the knowledge-base, a corresponding object is created in the object model library, such that the relationships in the knowledge-base between the templates, questions, and answers are reflected in this object model library.

The user defines logic rules (step 2050), which may include utilizing the objects in the object model, as well as other objects; for example, part of the condition may be related to the knowledge base, and some may be not related to the knowledge base. Specifically, for example, today's date may be part of the rule, but not part of the KB object model. Step 2050 may be carried out using any appropriate standard, widely available, user tools, such as MICROSOFT® Word VBA® macro editor.

The user then defines logic rule triggers (step 2055), typically using the no-programming knowledge-base editor (KB) 45 of FIG. 1A, as further described with reference to FIG. 26, typically, no programming by the user is required.

Whenever there is a click event of the user doing a data-entry action (step 2060), such as on the hierarchical questionnaire data input mechanism 15 of FIG. 1A, object model is automatically populated (step 2065) to reflect the data-entry.

The system then checks (step 2070) if this data-entry selection is associated with any logic rule trigger 2020 of FIG. 20A; if so, then the appropriate logic rule 2025 of FIG. 20A is executed (step 2080).

Depending on the type of the rule (step 2085), the system may either programmatically 'select' answers in the knowledge-base (step 2090), or execute external programs, or actions which are outside the scope of the object model (step 2095).

Figure 21:
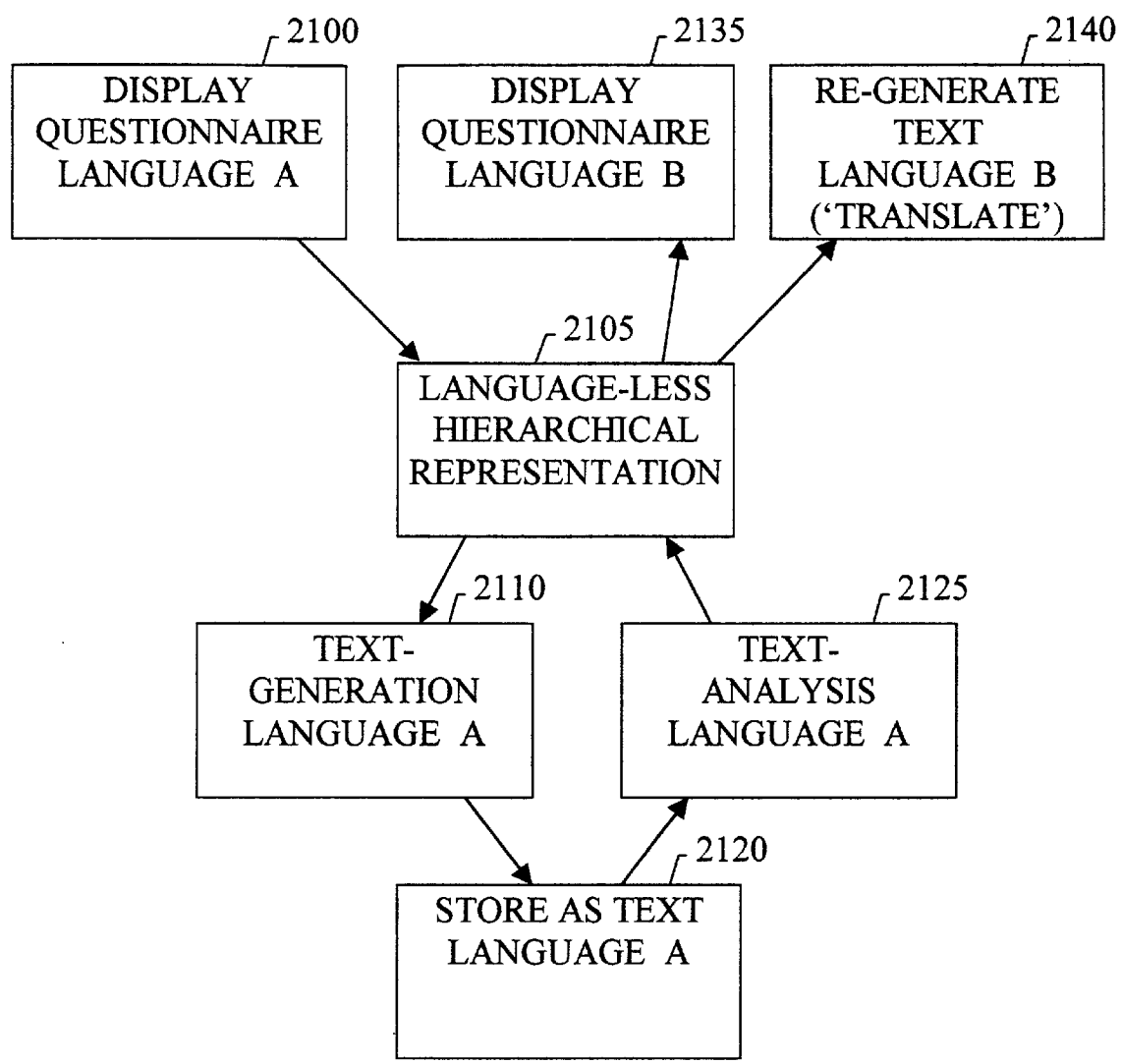
FIG. 21 is a simplified flowchart illustration of a preferred implementation of the multi-lingual mechanism 60 of FIG. 1A.
Figure 22:
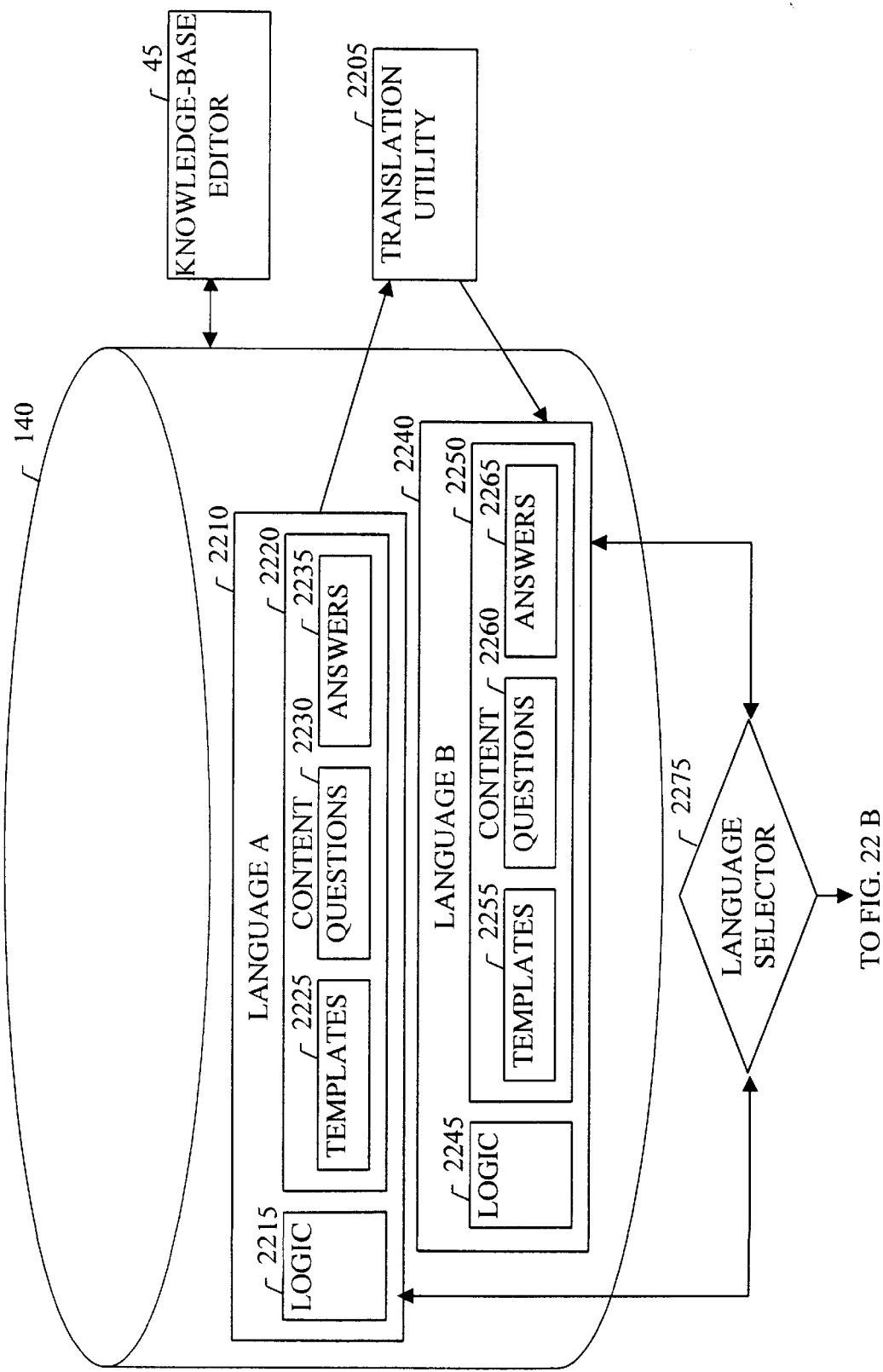
FIGS. 22A and 22B, taken together, comprise a simplified block diagram illustration of a preferred implementation of the knowledge-base database 140 of FIG. 1B, which supports the multi-lingual capability described in FIG. 21.
Figure 22:
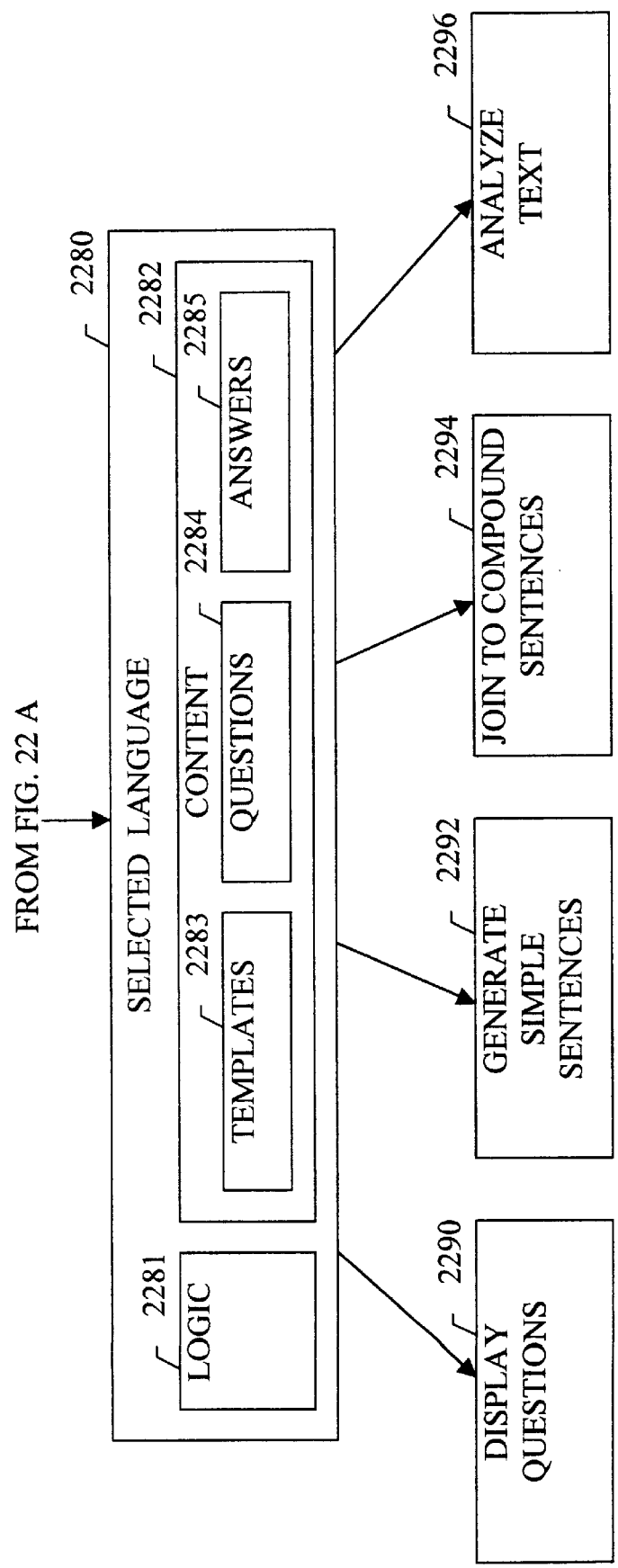

Reference is now made to FIG. 21, which is a simplified flowchart illustration of a preferred implementation of the multi-lingual mechanism 60 of FIG. 1A. The method of FIG. 21, useful in various portions of the apparatus of FIG. 1B, comprises a preferred method for data input via a structured questionnaire in a first language 2100, the data being stored either in a hierarchical language-independent structure 2105 or as generated text in the first language 2120. The data may then be viewed as a questionnaire 2135 or as generated text 2140 in a second language. The method of FIG. 21 is self-explanatory. The multi-lingual capability is derived from the fact that the data is collected via a structured questionnaire, and may be represented in a language-independent structure, and that the eventual output is is generated by a text-generation mechanism based on this language independent structure. FIGS. 22A and 22B further elaborate the multi-lingual knowledge-base structure, and translation utility, which support this multi-lingual mechanism.

Reference is now made to FIGS. 22A and 22B, which, taken together, comprise a simplified block diagram illustration of a preferred implementation of the knowledge-base database 140 of FIG. 1B, particularly suitable for providing multi-language support, which further elaborates the multi-lingual mechanism described in FIG. 21 above. A preferred implementation of the knowledge-base database 140 is also described above with reference to FIG. 9.

The knowledge-base database 140 preferably comprises a plurality of sets of tables, one for each langua, in FIGS. 22A and 22B, for simplicity of description, two such sets are depicted: language A 2210 and language B 2240, it being appreciated that a larger number of sets of tables, to support a larger number of languages, may be used. The user may preferably edit any such set of tables using a knowledge-base editor 145. A translation utility 2205 preferably provides automatic translation of the content of one language set of tables 2210 into a set of tables with an identical structure and record IDs in a second language 2240. The translation is referably carried out in such a way that, for each record in each table in one language-set, there exists a record with an identical ID, in the second language set of tables, which contains a translation of the string stored in the first record.

The user may select the desired language, via a language selector 2275, which in turn communicates with the set of tables appropriate for the selected language (2280, 2281, 2282, 2283, 2284, and 2285).

For each language, the set of tables preferably includes two components: a logic table 2281 stores definitions about the linguistic logic of the language (e.g. does the subject of the sentence appear at the beginning or end of the sentence, what connecting word should be used, etc.).

Content 2282 preferably comprises a set of tables which contain the data for the specific application, and preferably comprises 3 subsets of tables templates 2283, questions 2284, and answers 2285, which preferably correspond respectively to elements 910, 915, and 920 respectively in FIG. 9.

Based on the logic of the selected language 2281, and the content tables 2282 of the selected language, the apparatus of FIGS. 22A and 22B then preferably performs all actions related to the knowledge-base, thus allowing display questions 2290, generate simple sentences 2292, join to compound sentences 2294, and analyze text 2296, in the selected language.

Figure 23:
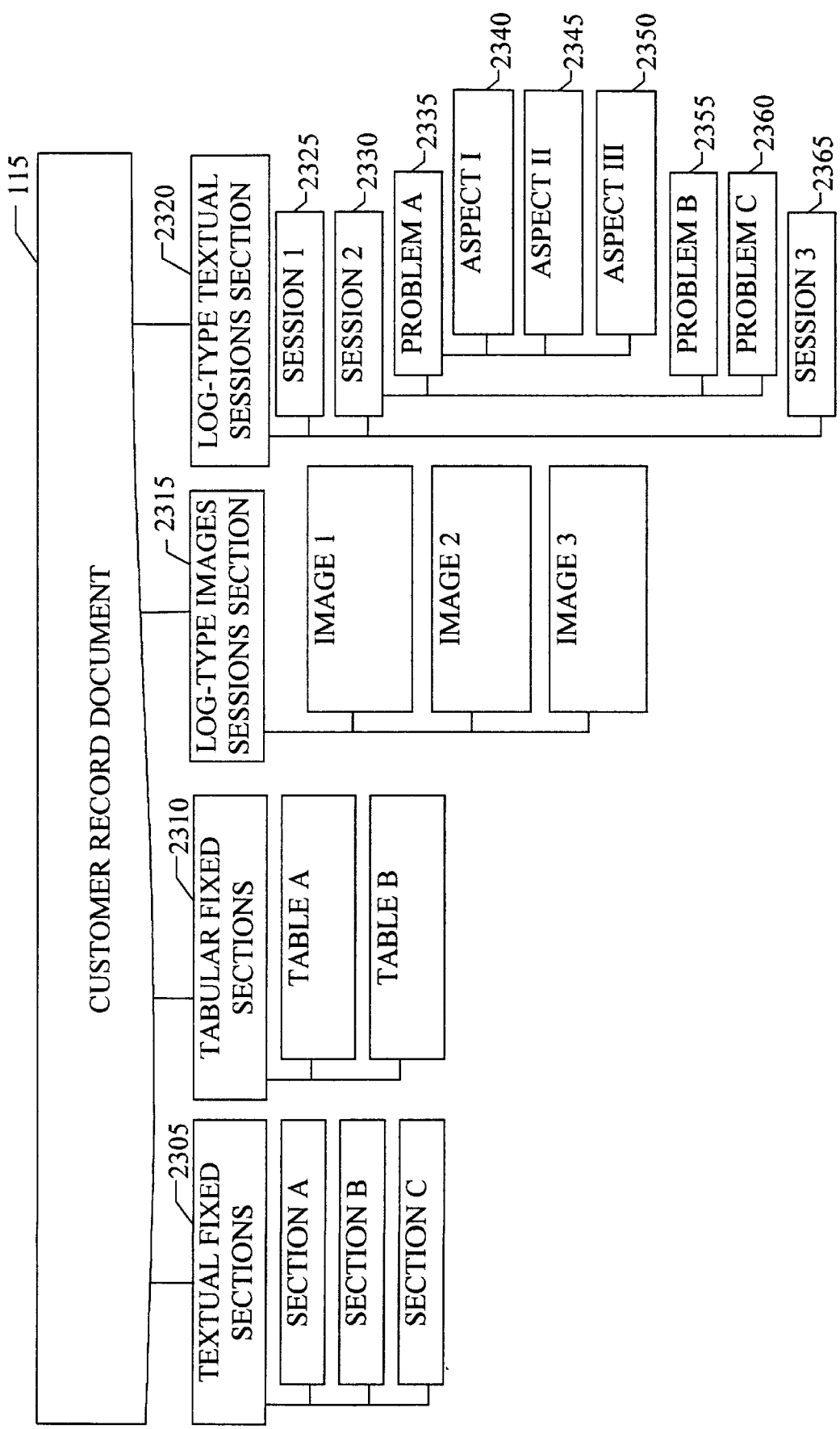
FIGS. 23–25 are simplified illustrations of a typical customer record structure and particular examples of the use thereof, useful in understanding the present invention.
Figure 24:
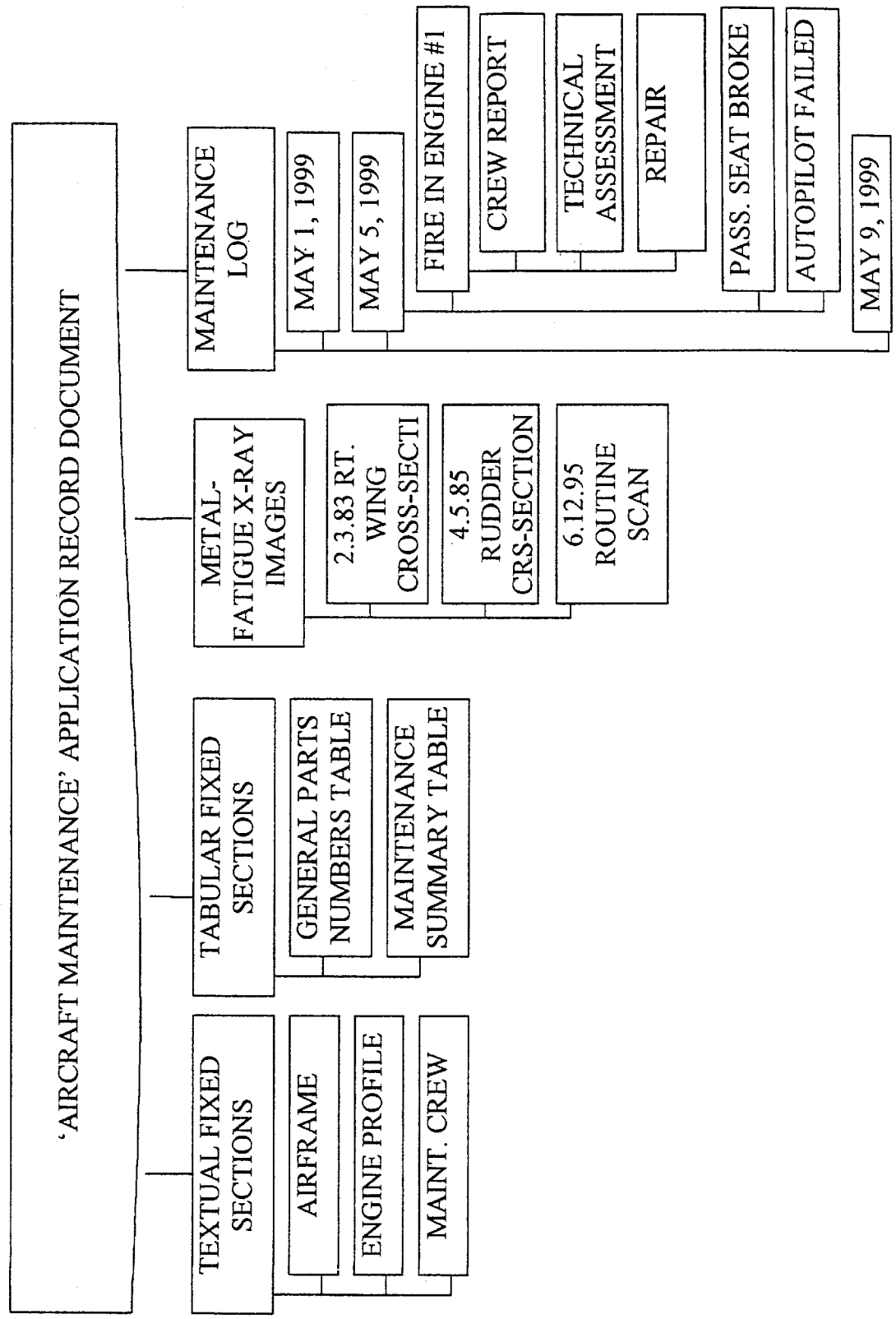
Figure 25:
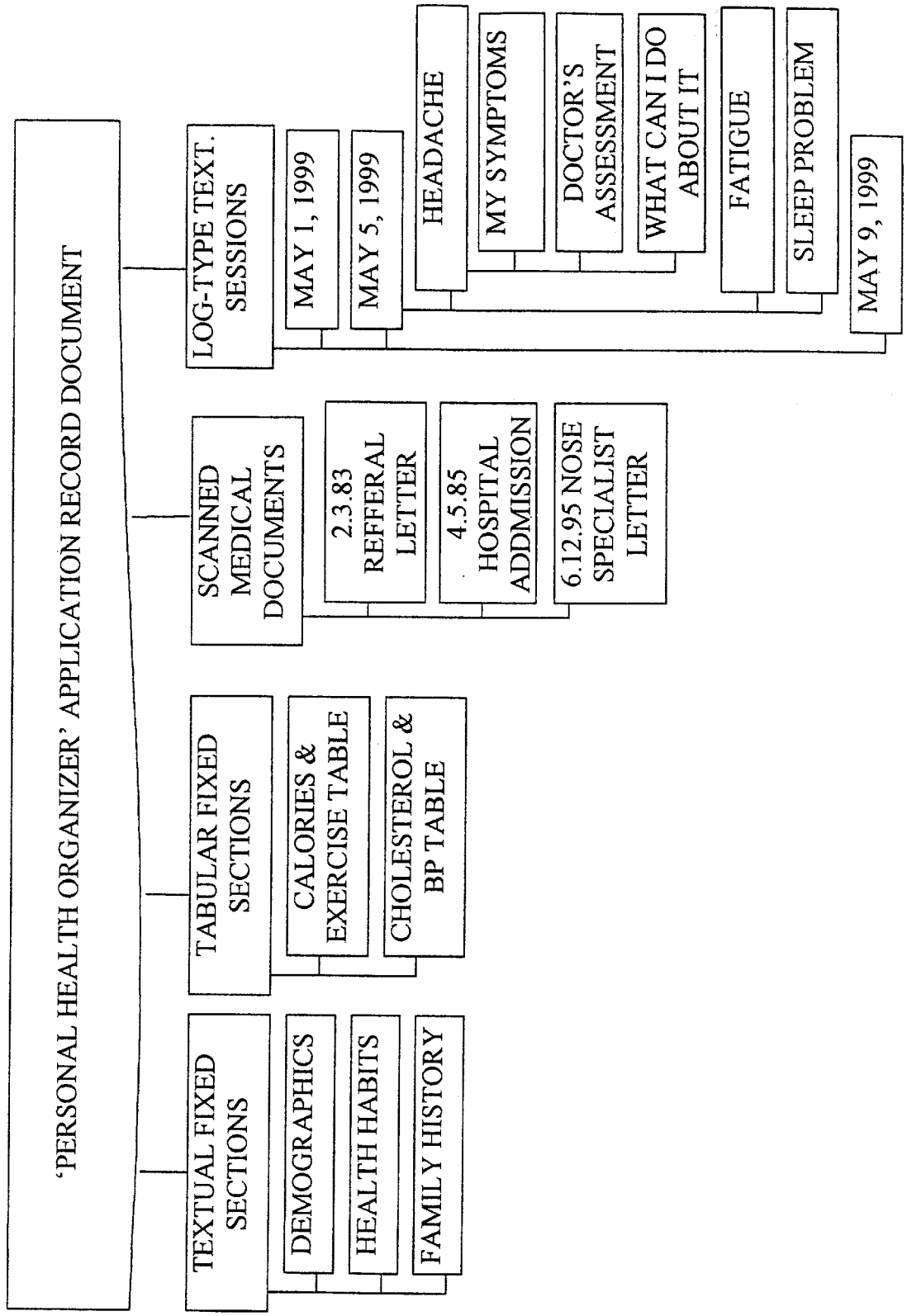

Reference is now made to FIGS. 23–25, which are simplified illustrations of a typical customer record structure and particular examples of the use thereof, useful in understanding the present invention.

Textual fixed sections 2305 preferably comprise multiple form-like sections, which hold textual and numeric data, which can be displayed as fields in a form, and which is used in update mode that is, is overwritten each time it is updated, and represents 'relatively constant' data about the customer, that is, data which does not change frequently. Technically the data is preferably stored as one document file object, for example, one MICROSOFT® Word object.

Tabular fixed sections 2310 preferably comprise multiple spreadsheet-like sections, which hold data which is collected in chronological manner, and is brief enough to be conveniently displayed in table format, or be charted as a graph, where each column represents a chronological set of data entered. This data is frequently, although not always, numeric.

Log-type images sessions 2315 preferably comprise multiple sections which each store multiple images—such as, for example, scanned documents, or other scanned images of various sorts, relating to the 'customer', each of which bears a time-stamp of when it was taken, and a name of what it contains, and which are stored in the customer record document 115. Technically this is preferably stored in one spreadsheet-document file object, for example, MICROSOFT® Excel.

Log-type textual sessions 2320 preferably comprises at least one section which contains textual data which is entered in a chronological manner, where data is stored and displayed as a series of log-type data-entry sessions. Each time the user interacts with the customer, a textual session is preferably created, which documents and describes this interaction. At the end of the session, the text describing it is preferably added as an additional log-entry, to the collection of previous such log-entries.

Each such Session 2325, 2330 and 2365 also preferably has a similar structure, regardless of the application: it deals with one or more problems 2335, 2355 and 2360 which the customer has. The nature of the 'customer' and of the 'problems' would be very different in different application, but structurally, they are preferably the same, regardless of whether these are medical diagnoses that need attention, social or legal issues of the client that are being addressed, or mechanical problems a car has. Each such problem is related to a template 940 of FIG. 9 in the knowledge-base database 140.

Depending on the application, each problem may sometimes be divided into several constant aspects 2340, 2345 and 2350, i.e. aspects which exist in different problems.

Each such problem or aspect of a problem, as well as constant form-style data sections, may be described using a structured hierarchical questionnaire (i.e. a questionnaire with various types of questions, including multiple-choice-questions, where each answer may 'branch' to continuation questions). Provided an efficient text-generation mechanism, the user's selections in this questionnaire would generate text reflecting the user's selections in this questionnaire. Each such aspect is therefore related to a sub-template 945 of FIG. 9 in the knowledge-base FIGS. 24 and 25 depict two particular examples, not intended to be limiting, of data collection applications which are extremely different, and yet are based on the same structure of FIG. 23.

Figure 26:
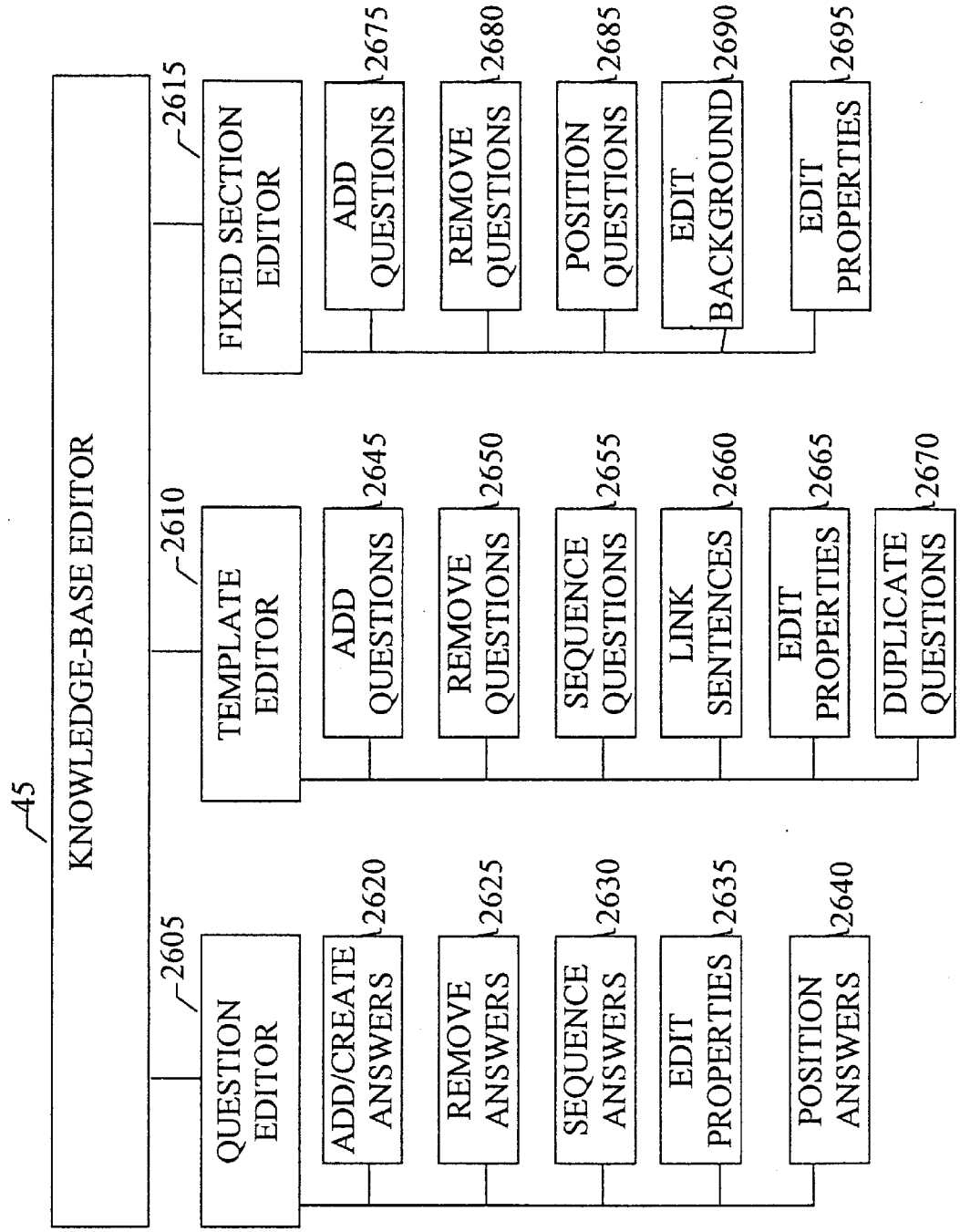
FIG. 26 is a simplified block diagram illustration of a preferred implementation of the knowledge base editor 45 of FIG. 1A.

Reference is now made to FIG. 26, which is a simplified block diagram illustration of a preferred implementation of the knowledge base editor 45 of FIG. 1A.

The knowledge base editor 45 preferably allows the user to create and modify the knowledge base of the application, and thus its questionnaires, templates, and the associated text generation, all preferably without any programming, merely by setting of properties of the application components, most of which is preferably done graphically, by click and drag actions.

The knowledge base editor 45 preferably comprises a question editor 2605, a template editor 2610 and a fixed section editor 2615.

The question editor 2605 preferably comprises a mechanism for creating and editing questions to be used within the application, and the text to be generated from each such question. This mechanism is based on knowledge-base editing capabilities of the question logic component 240 of FIG. 2, which are referred to as KB editor 525 of FIG. 6. The actions supported by the question editor 2605 preferably include: add/create answers 2620, remove answers 2625, sequence answers 2630, edit properties 2635, and position answers 2640.

Preferably, all of the supported actions are achieved by setting of properties of the question logic component 240 (FIG. 2), and thereby of the various records in the knowledge base database 140 (FIG. 2), such as question records, answer records, and other records. Preferably, in all cases except for edit properties 2635, the setting of properties is done graphically, by click-&-drag actions of the user.

Add/create answers 2620 is preferably carried out by selecting answers from the bank of answers in the knowledge base database 140 (FIG. 2), and associating the answers with the question, or by typing in a new answer that does not exist in the knowledge-base in which case the new answer is preferably added to the knowledge-base.

Remove answers 2625 is preferably performed by dragging an answer from the question to the waste-basket icon, thus causing the answer to be removed, that is, dissociated from the question.

Sequence answers 2630 is preferably performed by dragging an answer up or down within a question, this causes the answers in the question to be re-sequenced, preferably via a change in the properties of the QuestionAnswer record in the knowledge base database 140.

Position answers 2640 preferably comprises an action specific to editing of a graphic type question. When editing this type of question, the x-coordinate and y-coordinate of each answer, in relation to the background bitmap, is important. Setting of these properties of the question is also preferably done by a click-&-drag action.

Edit properties 2635 preferably comprises a tabbed property-page mechanism that allows the user to edit the properties of the question. As mentioned above, most of the properties are preferably set by various drag actions, described above and below. The property-page mechanism preferably displays only those properties which can not be set by drag actions. Properties are preferably organized such that for each question only those properties which are relevant to the type of the question are shown.

The template editor 2610 preferably comprises a mechanism for creating and editing templates to be used within the application, by selecting the questions to be included in each template, setting continuation questions, and connecting several questions to form compound sentences. Graphically, the template editor 2610 comprises a question display area, in which the questions included in the template are displayed, in a similar manner to the way they are presented in the actual software; technically, this is based on the template display component 220 (FIG. 2), with only certain drag actions enabled here, which are not available in the regular template.

The following actions are supported by the template editor 2610 and are described below: add questions 2645, remove questions 2650, sequence questions 2655, link sentences 2660, edit properties 2665, and duplicate questions 2670.

Add questions 2645 preferably comprises a mechanism which allows the user to select questions from a list of existing questions, and to drag them onto a template, as a means of adding these question or questions to the template. The list may comprise a hierarchical list, which may preferably be similar, for example, to the 'folder' metaphor of MICROSOFT® Explorer, so as to organize the questions into groups for the purpose of convenience.

Remove questions 2650 is preferably carried out by dragging the question from a template to the waste-basket icon; the question is then preferably dissociated from the template.

Sequence questions 2655 is preferably carried out by dragging questions in the question display area; the dragged question or questions are then inserted in the location where the drag was released, and all of the other questions are preferably re-sequenced accordingly.

Link sentences 2660: preferably, when a link button is pressed, dragging causes the questions covered in the drag area to be linked, such that the sentence of each of these questions will be joined to form a compound sentence. A 'Link' icon is then preferably graphically displayed on the linked questions, indicating that they are now linked. Clicking on any such 'Link' icon preferably brings up the link-property-page, allowing the user to edit the properties of the link. Technically, all these actions merely set properties of the Linked questions. Dragging the Link icon to the waste-basket, preferably removes the link between these questions.

Edit properties 2665: Those properties which can not be set by click-&-drag actions are preferably set via this mechanism, which displays a Property Page mechanism. Properties set using edit properties 2665 preferably include, for example: template name, type, and other appropriate properties.

Duplicate questions 2670 preferably comprises a mechanism which allows the user to duplicate questions, so that slightly different variations of the same question may be created.

The fixed section editor 2615 preferably comprises a mechanism for editing the templates which underlie the textual fixed sections 2305 (FIG. 23) of the application. In this type of template, the template is based on a document, upon which fields are positioned—the fields being associated with various questions. The editing actions are therefore slightly different as follows:

Add questions 2675 is preferably similar to add questions 2645, except that the added question is dragged onto the background document, rather than into the question display area.

Remove questions 2680 is preferably similar to remove questions 2650, except that the removed question is dragged to the waste-basket not from the question display area, but rather from the background document.

Position questions 2685: dragging a question in the background document preferably causes the question to be moved to the exact location of the release of the drag. At the location of the release, a field is preferably inserted into the background document, where the name of this field is preferably the name of the dragged question.

Edit background 2690: the user may edit the background document, adding static text, graphics and other items, modifying fonts, and performing other appropriate actions. Technically, the background document preferably comprises an MICROSOFT® Word document or an HTML document, and so edit background 2690 does not require any special mechanisms, but may utilize standard software such as MICROSOFT® Word or an HTML editor.

Edit properties 2695 is preferably similar to edit properties 2665, except that some properties are preferably specific for fixed section, and are preferably different from regular template.

The following detailed example relating to a preferred embodiment of the present invention is not meant to be limiting, and statements therein are intended to refer to preferred alternatives only:

Knowledge-base Editor

The KB editor is based on the QC and TC, functioning in their 'Edit Mode' (their Mode property set to Edit). In this mode, drag actions are enabled, and the user may perform editing of the knowledge-base as described briefly here.

Question Editor

Selecting a question (clicking on it, not on one of the answers), sets the editing focus on it, and displays a mini-toolbar on top of it, which has the following buttons: check (OK), accept changes, X (cancel), Garbage (del), Properties icon, and Add icon (add a new answer).

1. Dragging an answer to a different sequence re-sequences the answers.
2. Dragging an answer to the Garbage icon, deletes the answer (and re-sequences the other answers accordingly).
3. Clicking the Add button, opens to the right of the QC (or left if not possible) a panel of similar size to the QC, with a list of possible items to add, and a text field above them to enter a search string. The search mechanism works as described for the Navigation Display Component Select-Template combo. Entering text narrows the list as mentioned there. Dragging an answer from this list to the question, inserts it at that point. If answers now exceed 12, a message alerts the user, and the last answer is deleted.

4. An Add button next to the search string field, allows to add a new item that is not even on the master list: the 'search' string that is typed is accepted as a new answer, is added to the master list, and is added as the last answer to the question.
5. Clicking the Properties icon, opens a properties dialogue.

Template Editor

All actions performed by this editor seem sophisticated, but are actually comprise setting various properties of the QCs in the template, and then activating their Display_Question, (and if necessary the Show_PopUp method). For example, dropping a question on an answer, assigns its ID to the ContinuationID(n) of the respective answer, and 'refreshing' by Show_PopUp. The result however is that the question 'magically' appears as the continuation. The QCs are fully functional, and the user may at any point check the text generated, to see if it works properly. Whenever an action is taken, the system also marks an answer/s, so that the text generation can be viewed.

1. All questions are displayed in EditSmall mode: they are in edit mode, but are also displayed at 75% of their original size, and with a smaller font. As a result, there is room on the left for a hierarchical list of templates and questions.
2. Below this list on the left, is a 'Workspace', where the user may drag and drop questions, or groups of questions temporarily.
3. The questions area of the template is marked with squares which indicates the 'slot' for each of the 12 questions. If there is a question there, it is covered by the question.
4. Dragging a question from one slot to another, moves it to that location, and re-sequences the remaining questions accordingly if necessary (e.g. moves questions up if an empty slot remains).
5. Dragging a question from the list to a slot, inserts it at that point.
6. Dragging a question from a slot to the garbage, removes it from the template.
7. Dragging a question from a slot, or from the list to the workspace, moves that question there. However, in the workspace the question doesn't appear graphically, but just by name.
8. Dragging a question and dropping it on an answer (in one of the questions in a slot), attempts connect this question as a continuation to that answer. A link sign appears connecting the answer with its continuation.
9. Double clicking on the continuation link, displays a continuation-link properties box, which displays the current setting, and allows to modify it. The continuation question frequently is set already for the type of continuation it is designed to work under, and so this does not need setting.
10. Dragging the continuation question to the garbage, deletes it and therefore obviously releases the continuation link.
11. Dragging the continuation-link icon itself to the garbage, releases the continuation question, and places it in the workspace.
12. Clicking on the Link-Icon button, turns the cursor to a Link-Icon shape, and leaves the Link-Icon button pressed until the Link-Icon button is clicked again. In this mode, clicking on one question of the questions in slots, and dragging and releasing on a second question next to it, creates a link between the two questions. The link icon appear connecting them, and a message-box appears with several options for the connection, e.g. ForceConnect, ConnectString, etc.
13. The list on the left is hierarchical, using the MICROSOFT® Explorer Folders metaphor. Its four levels of hierarchy are as follows:
    1) First level: Question Groups.
    2) Groups of questions, to help a user find the question he is looking for, e.g. Time related, Symptom Description, PE finding.
    3) Second level: Questions.
    4) A list of questions in that category, regardless of the format of the question. The same question may appear in different output formats, e.g. 'Duration'.
    5) Third Level: Question Variants.
    6) List of the variants of the question (e.g. 'DURATION (table output)').
    7) Fourth level: Question-Answer Combinations.
    8) A list of the Question-Answer combinations of this question, as it appears in different templates.
14. One of the 'Groups' in the list is 'Templates', under which there are groups of templates, under which is a list of templates. Dragging a template, or double clicking it, causes it to open, replacing the currently viewed template. If changes were made to the current template, a message-box asks the user if he wants to save the changes.
15. Most of the templates are selected by using the regular navigation mechanisms on the NDC: the fixed section buttons, the Template Combo box, and the sub-template buttons. The above mentioned mechanism is for accessing templates which are currently not part of the application.
16. When making changes to a template which is part of the basic KB set (i.e. is not user defined), the system maintains a backup copy of the original template. When making changes to a user defined template, the system asks the user if to overwrite this template, or save them to a different name.
17. When clicking on a question in the list, it is displayed to the right of the list (in a fixed spot), so that the user may see it. The Template on the right, is grayed-out, so that the user can focus on the question at hand. Clicking anywhere outside the list returns the focus to the Template, and un-grays it (the list is not grayed out even when it is not in focus).
18. When a question that has a pop-up is selected, it is displayed with the pop-up, as if someone clicked the branching answer, causing the pop-up to show, and text to be generated. Both the triggering answer as well as an answer in the pop-up question are selected. When the pop-up itself has a pop-up, then it too is displayed (up to this level, not needed more if difficult).
19. Copy, Paste, Save, and New buttons allow to perform these actions on the template being edited. Properties button brings up the template's properties.
20. Question or group of questions may be Copied, Cut, and Pasted, both within a template, and between templates.

Import and Export function needs to be defined, that will allow a user to send an e-mail with an attachment of a template/s or question/s, or Application structure to another user. It is basically quite simple: when importing the system checks what elements already exist, and which are new to it. It gives new IDs to the new required elements, and changes their internal reference if needed; for example, if a question in the template I received is new to me, then I give it an appropriate ID for me, the next available ID for example, and modify the template record to call this question by its new ID.

Figure 27:
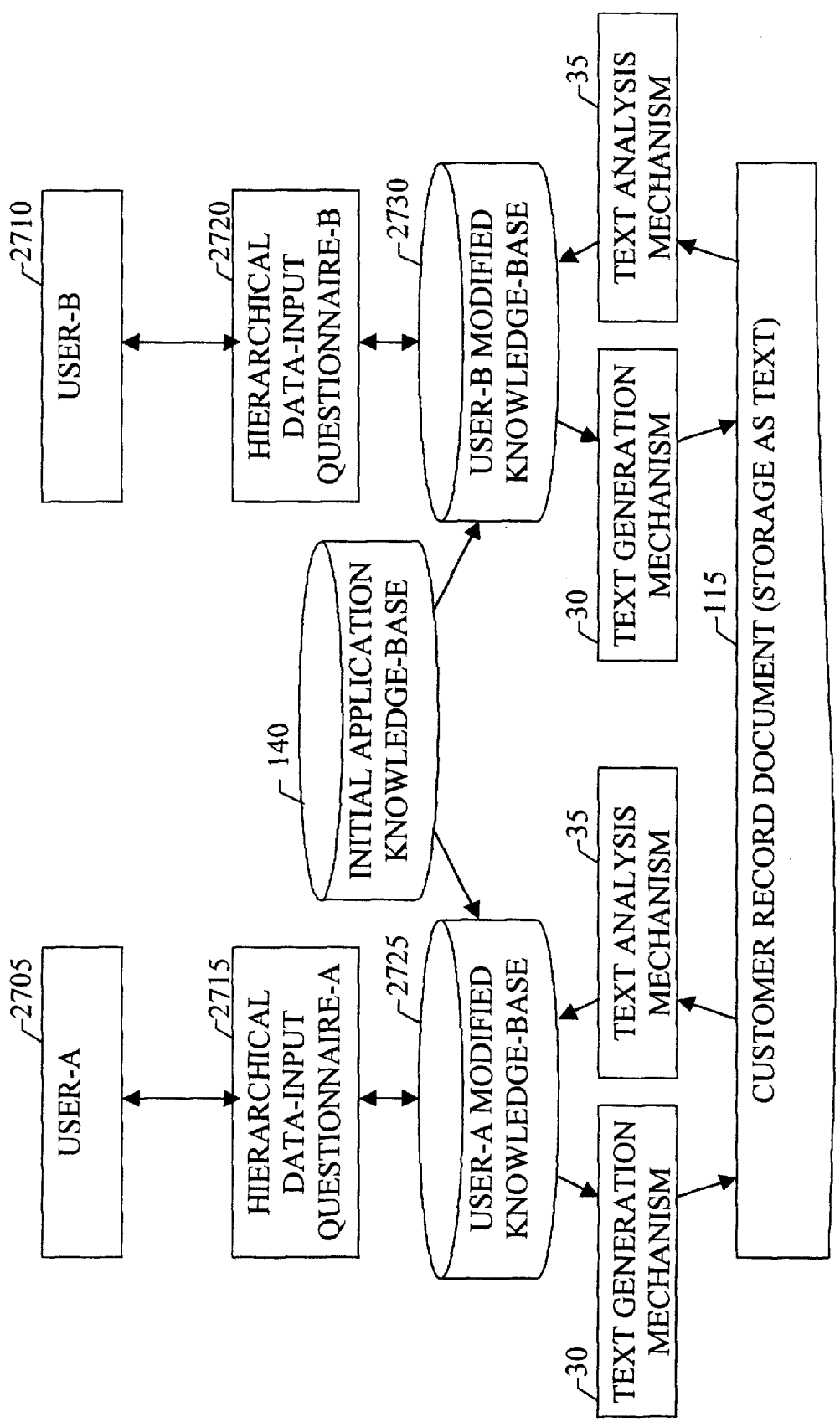
FIG. 27 is a simplified block diagram illustration of a preferred implementation of the multi-user unsynchronized access mechanism 65 of FIG. 1A.

Reference is now made to FIG. 27, which is a simplified block diagram illustration of a preferred implementation of a multi-user unsynchronized access mechanism 65 of FIG. 1A.

In FIG. 27, two users comprising user A 2705 and user B 2710, are shown using the same application, which is based on the same initial application knowledge base data base 140. It is appreciated that the apparatus of FIG. 27 is applicable generally to a plurality of users, with two users being shown in FIG. 27 by way of example only.

Each of the users, user A 2705 and user B 2710, modifies the knowledge base database 140 according to their individual needs and preferences. The modification is preferably accomplished without any programming, using the knowledge base editor 45 (FIG. 1A and FIG. 26). As a result, each of the users 2705 and 2710 is now working with an application which is based on a different knowledge base: user A modified knowledge base 2725 for user A 2705, and user B modified knowledge base 2730 for user B 2710, which are different from, and typically unsynchronized with, each other and the initial application knowledge base database 140.

Based on the differently modified knowledge-bases 2725 and 2730, each of the two users 2705 and 2710 preferably enters data using a different hierarchical data-input questionnaire: hierarchical data input questionnaire A 2715, and hierarchical data-input questionnaire B 2720, respectively.

However, despite the fact that the two users 2705 and 2710 use different, and unsynchronized knowledge-bases, and accordingly different hierarchical data-entry questionnaires, they are preferably able to read and write to a shared customer record document 115; this is preferably achieved by the fact that each of them writes to the customer record document 115 via the text generation mechanism 30, and can read and process the data from the customer record document 115, via the text analysis mechanism 35.

The unsynchronized-access mechanism is preferably based on two elements: (a) the fact that the data is stored in the customer record document 115, non-hierarchically, as simple text, and (b) that the text analysis mechanism 35 is capable of deducing from this simple text the questions and answers which were selected and caused its creation.

The IDs of the selected questions and answers preferably are not stored; if they were to be stored as is typical in prior art systems, then it would necessitate that the knowledge base of different users be synchronized in order to share customer records in this manner.

Figure 28:
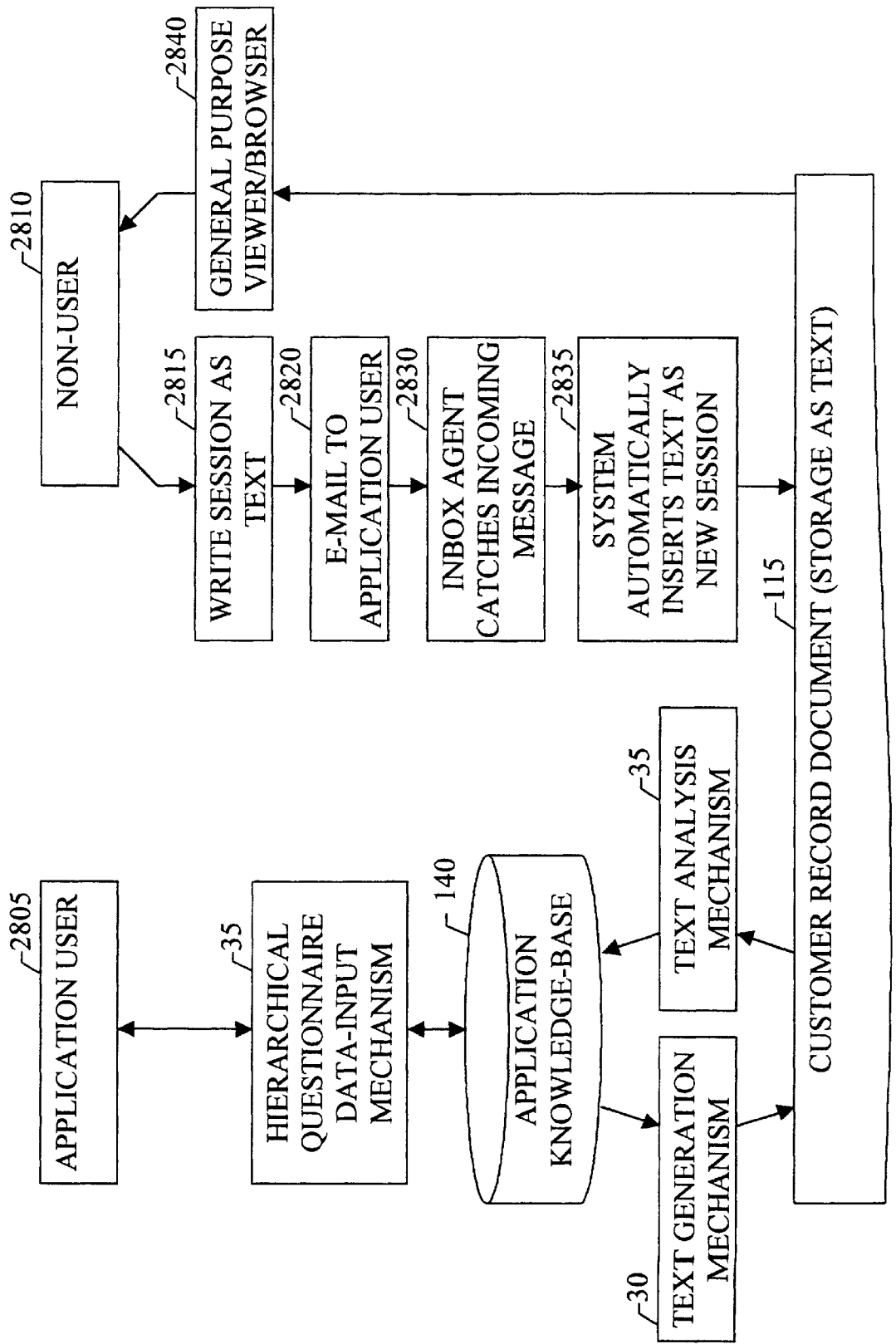
FIG. 28 is a simplified block diagram illustration of a preferred implementation of the decision support mechanism 50 of FIG. 1A.

Reference is now made to FIG. 28, which is a simplified block diagram illustration of a preferred implementation of a non-user access mechanism 70 of FIG. 1A; FIG. 28 also incorporates flowchart-like elements.

In FIG. 28 a non-user 2810 of the system, who typically does not have direct access to the application and its knowledge base, may still have access to the customer record using the mechanism which is described here with reference to FIG. 28. The term "direct access", as used throughout the present specification and claims, includes the ability to read, analyze, modify, and apply decision support to an object such as a record. In general, this capability is a result of the architecture, which uses storage as free-text, despite the fact that the system is hierarchical in nature.

As described above, particularly with reference to FIG. 1A, and referring additionally back to FIGS. 1A and 1B, each application user 2805 preferably enters data using a hierarchical questionnaire data-input mechanism 15 (FIG. 1A), which is based on an application knowledge base 140 (FIG. 1B). The data, which is preferably hierarchical in nature, is preferably stored non-hierarchically as text in the customer record document 15, by means of a text generation mechanism 30 which generates text based on the user input, and a text analysis mechanism 35 (FIG. 1A) which is preferably operative to parse the text, preferably comprising the customer record document 115 back into the hierarchical structure of selected questions and answers which caused the formation of the text as described above.

Referring again to FIG. 28, the non-user 2810 may view the customer record document 115, using any appropriate type of general purpose viewer/browser 2840, since the customer record document 115 is stored as free text, and is therefore not dependant on the structure of the knowledge-base for viewing thereof.

For writing into the customer record document 115, the following steps are preferably carried out:

write session as text 2815—the non-user typically does not have templates and a knowledge base available, and therefore may only enter data as free-text;

e-mail to application user 2820—Typically, the non-user would receive from a user of the system an appropriate invitation, preferably comprising an e-mail invitation or any other appropriate invitation, to contribute to a record of a mutual customer. The invitation typically comprises an attached blank document such as, for example, in MICROSOFT® Word in an appropriate format, into which the non-user can write his/her session. The non-user, then sends his/her input, preferably by simply returning the e-mail and its attached document into which he wrote his input, back to the referring user;

inbox agent catches incoming message 2830—On the user's machine, an inbox agent preferably scans incoming messages having an agreed-upon format, which identifies the incoming message as being an incoming response to request for session by non-user; for example, the agreed-upon format might comprise having an certain form of subject or title such as, for example, a form resembling: "RE: Consultation: John Doe 234-28-2837";

system automatically inserts text as new session 2835—Again, based on an agreed-upon convention, such as mentioned above, the inbox agent can identify the customer to whom the non-user session belongs such as, for example, following the above example, by the customer name and SSN which appear after "RE: Consultation:" in the subject or title of the e-mail. Accordingly, the system preferably creates a new session in the customer record document 115 of the appropriate customer, and preferably copies the text in the document attached to the e-mail to the present session, and signs the present session, using the name of the non-user.

An alternative method for a non-user to deliver a written session into the system via e-mail as described in 2820 and 2830, to do so by directly interacting with the application server, e.g. via an internet site.

It is appreciated that this capability is meaningful, especially in light of the hierarchical nature of the data in the system, which makes it possible for users of the system to receive full decision support and other similar facilities, which are not available in prior art textual systems. In other words, there are systems which can allow non-users to view and perhaps even write to the customer record, because it is stored as text; however, there are no prior art systems which do so in a system which also enjoys the benefits of being structured and hierarchical, such benefits typically including structured data-entry, decision support, research & statistics, and other similar benefits.

Figure 29B:
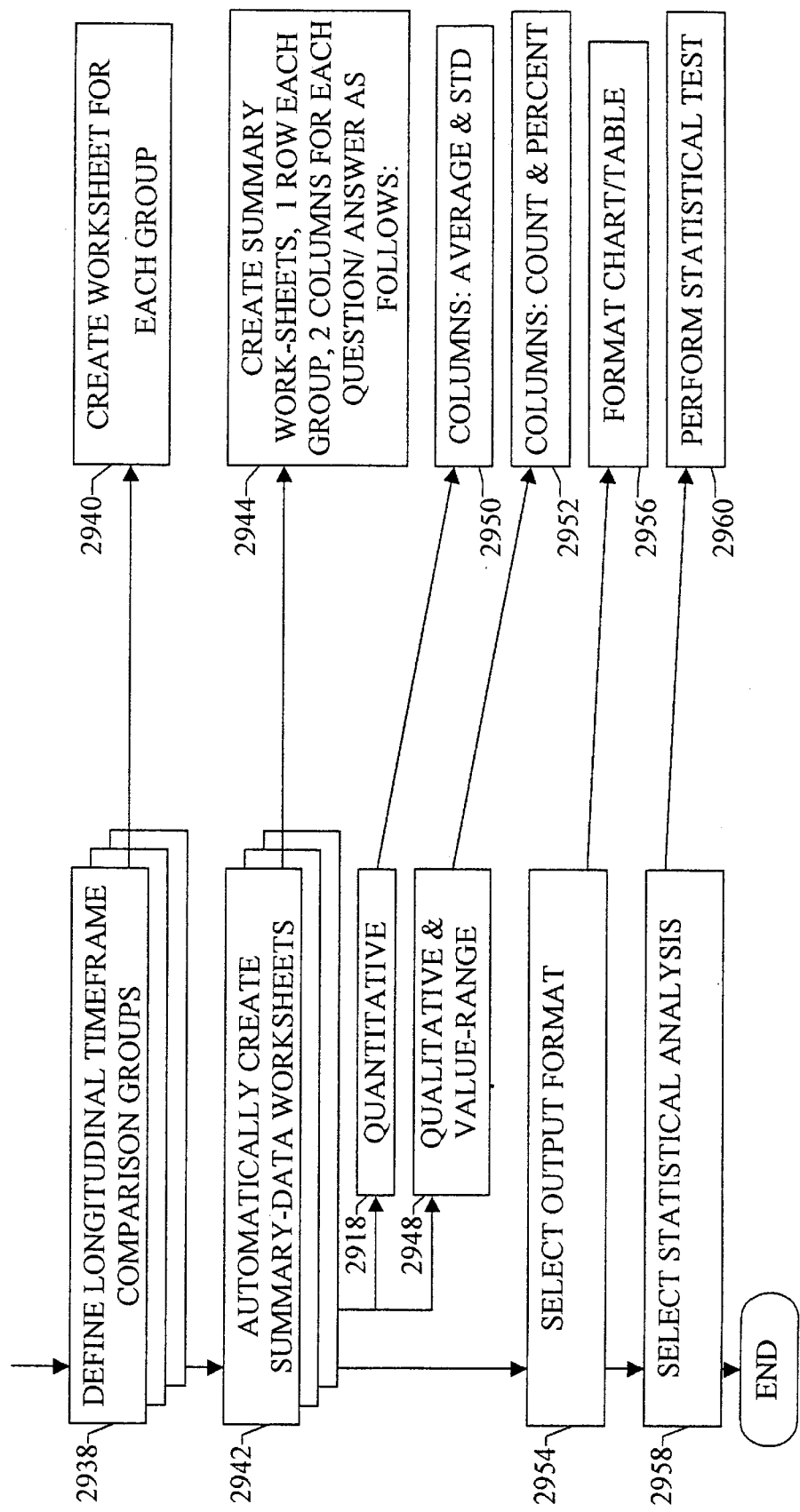

Reference is now made to FIGS. 29A and 29B which, taken together, comprise a simplified flowchart illustration of a preferred method of operation of the research and statistics mechanism 55 of FIG. 1A. The method of FIGS. 29A and 29B preferably comprises the steps described below.

The research & statistics mechanism 55 (FIG. 1A) preferably comprises a 'Wizard-like' mechanism, which guides the user through a sequential series of steps, and performs in the background certain actions accordingly. In FIGS. 29A and 29B the boxes on the left side represent the sequential steps of the Wizard, and the boxes on the right side represent automatic actions preferably taken by the software in response to the user input. As is evident from the figure, steps of the wizard which prompts the user for input preferably lead to an automatic action taken by the system.

The steps of the Wizard and of the automatic steps taken by the system are now broadly described as follows with reference, by way of example only and without intention to be limiting, to a patient based or customer based application. For ease of description, steps which create a particular entity and the entity thereby created may be described together, the relationship between the step and the entity being clear to a reasonably skilled person of the art:

1. Define Study-group Query 2900

Allows the user to define a compound query, which retrieves a subset of the patients, which will be included in the study, and which may be further divided into several comparison groups.

The final query is preferably composed by letting the user define sub-queries 2902, where each study-group query may comprise a plurality of sub-queries. The user defines one sub-query 2902 at a time, and repeats this process multiple times to create a plurality of such sub-queries 2902, which join together to form the query 2900.

Each such sub-query 2902 preferably comprises the following elements:

And/Or 2904, which is preferably set by a combo-box, and defines whether the sub-query is joined to the general query as an 'AND' or as an 'OR' statement.

Field 2906 preferably is implemented as a combo-box which allows the user to select a Field, from a list of all the fields in the application.

Operation 2908 preferably allows the user to select the operation which will be used to compare the values against the field; examples of suitable operations include contains, does not contain, >, <, >=, <=, and other suitable operations.

Question 2910 preferably displays the question which corresponds to the selected field, so that the user may enter or select the value/s for the sub-query; for example, enter text/numbers, or select single or multiple answers, numbers and units. Question 2910 is preferably implemented using the question display component 225 (FIG. 2).

In response to the above-described user actions, the system preferably automatically creates a study-group worksheet 2912. In this worksheet, a separate row is preferably created for each of the qualifying customers or patients, according to the criteria of the study group query 2900; for example, if this study group comprises 51 customers, then a worksheet would be created which has 51 rows, one for each of these customers.

2. Show Fields 2914

Preferably allows the user to select the fields to be included in the report, from a list of fields in the application. For example, and without limiting the generality of the foregoing, the user may be present graphically with a list on the left with available fields, and a list on the right with the selected fields; double clicking, or click and selecting an 'Add' button adds a field; selecting a 'Remove' button removes from the list.

3. Determine Question Logic Type 2916

For each of the selected fields 2914, the system preferably determines whether the question corresponding to that field is quantitative 2918, qualitative 2920, or value-range qualitative 2922. Part of the decision process leading to the determination is preferably automatic, and part of it typically requires user input, as follows:

If the question is of a single-option or multiple-option type, then it is preferably automatically treated a qualitative type question 2920. In this case, in step 2926, in the study group worksheet one column is preferably created for each answer of the question; that is, several columns would preferably be created for each question. Since each row represents data corresponding to one customer in the study group, then in each such row, there are several cells, each corresponding to each of the answers of the questions, and each such cell holds the value true or false—reflecting which answer/s were selected for each customer. For example, in a question 'Hobbies', which is a multiple-option question with four answers—ski, dancing, reading, watching television—four columns are preferably created, one for each of the answers of the question. For each customer, true and false are assigned to the cells of the four columns according to the answers which were selected for the customer.

If the question is not single-option or multiple-option type, that is, if the question receives numeric or textual user input, then the system preferably prompts the user to decide if the question logic type should be quantitative 2918, or value-range qualitative 2922; preferably, quantitative 2918 is the default. If the user opted to handle the question as quantitative 2918, then, in step 2924, one column for each question is created in the study group worksheet, the column preferably holding the value which the user entered for the question. For example, in a question 'Age' the user enters the age of the customer, and the value entered would appear in the worksheet.

However, if the user opts to handle the question as value-range qualitative 2922 then the user is preferably prompted to enter several value-ranges which will be used to group the quantitative, numeric or textual, answers into qualitative groups. For example, the numeric question 'Age', may be handled as value-range qualitative 2922, by defining several age-groups such as, for example: 0–25, 26–50, and 50–100. In the case of a value-range qualitative question 2922, in step 2928 one column is preferably created for each value-range group defined by the user; in the above example, three columns, one for each of the three age groups, would be created. For each customer, each of the cells corresponding to each of the value-range groups preferably holds true or false, reflecting the value-range group in which the value of that customer fell. In the above example, if a customer's age were 24, then the '0–25' cell on this customer's row would be assigned to true, and the other cells ('26–50' and '50–100') would be false.

4. Define Comparison Groups 2930

Optionally, the user may define several comparison groups. Each of the defined comparison groups is preferably defined using a query creation mechanism similar to the one used to define the study-group query 2900, by creating one or more sub-queries 2902.

In step 2932, for each comparison group created, the system preferably automatically creates a separate worksheet, in which each row preferably corresponds to each of the qualifying customers in this group.

5. Define Longitudinal Timeframe Comparison Groups 2938

Optionally, the user may define longitudinal timeframe comparison groups in step 2938: choosing to compare the same group/s of customers to themselves at different points in time. One example of such a longitudinal timeframe comparison would be to check a certain lab result in the same patient, before and after a certain medication was given. The system prompts the user for the number of timeframe groups, and for the timing to be used.

In step 2940 the system preferably automatically creates one worksheet for each group.

6. Automatically Create Summary-data Worksheets 2942

For each selected field/question 2914, a summary sheet is preferably automatically created in step 2942. In the summary sheet the system preferably calculates and summarizes the data from all of the study-group/comparison-groups/longitudinal group worksheets.

The basic structure of the worksheet will be appreciated from step 2944: each row summarizes the data for each comparison group 2930 or longitudinal timeframe comparison group 2938.

In each such row, for each field/question 2914 or its answers or value-range groups, two columns are preferably created as follows:

For a quantitative question 2918—in step 2950 for each question two columns are created holding the average and the standard deviation (STD) respectively of the values all of the customers in this group had.

For a qualitative or value-range question 2948, in step 2952 two columns are created for each answer of the question in the case of a qualitative question, or for each value-range group in a value-range qualitative question. The two columns preferably respectively hold the number, also known as the count, of customers for whom this answer/value-range is true, and the percent of this number out of the total number of customers for which this question was checked. Note that in the case described, for each question there would be several pairs of columns, one pair for each answer/value-range.

7. Select Output Format 2954

Preferably, the user may select the output format in step 2954, including whether the user wants the results to be presented in a table format or in a chart, or both. If the user selects to display the results in a chart, then he is preferably prompted to select the format of the chart to be used.

In step 2956, based at least in part on the input of step 2954, the system preferably automatically creates and formats the chart/table which presents the results.

8. Select Statistical Analysis 2958

The system preferably offers the user several possible statistical tests to be performed on the compared groups, to define the significance of the differences between them. Which tests are offered is preferably dependent on the number of groups and the type of data, for example, there are preferably different tests for qualitative vs. quantitative data.

The system preferably offers the user several possible statistical tests to be performed on the compared groups in step 2958, in order to define the statistical significance of the differences between these groups. Which tests are offered is dependant on the number of groups and the type of data; as stated above, there are, for example, different tests for qualitative vs. quantitative data. The system preferably allows the user to select a preferred statistical test such as, for example, the chi-square test or any other appropriate statistical test.

Preferably, in step 2958 a check box is presented which asks: "Compare sub-groups to entire study group?" This is useful since the entire study group frequently represents a certain norm, to which the different groups are compared. If this option is selected, than the selected statistical test is preferably performed multiple times, comparing each of the groups against the study group.

The selected statistical test is preferably carried out in step 2960.

In one preferred implementation of the present invention, the entire method of FIGS. 29A and 29B may be implemented as an MICROSOFT® Excel macro. For each query defined, an MICROSOFT® Excel workbook is preferably created. In the workbook and using a patient-based example, the patients selected for the study group (step 2900) are preferably stored in one worksheet, in which each row displays the data of one patient. In each row, the first column preferably always displays the patient name, and contains a hyperlink to the record of this patient; that is, technically a hyperlink to the corresponding MICROSOFT® Word document object contained in the record. The additional columns preferably display the additional fields selected to be shown, processed or compared (step 2914).

Similarly, additional worksheets are preferably created, one for each of the comparison groups of patients, defined in step 2930 if the user opted for defining such groups.

A separate worksheet in the workbook preferably stores the compilation of the calculated summary data from the different worksheets. In the separate worksheet, the first column preferably stores the field names of the compared field, that is, fields upon which calculation was performed. The next columns preferably show the calculated summary value for the different groups, that is, the group worksheets. This summary is dependant on the data type, and is in one of the two following formats:

1. If the data is quantitative, that is, has numerical value, then each group preferably has two columns: for average or median and for standard deviation.
2. If the data is qualitative that is, is either yes or no for a certain criterion, than each group preferably has two columns: a first column for number of patients which qualified, that is, were 'yes' for this criterion; and a second column for the percentage which the number in the first column reflects out of the entire group.

Important note: although numerical data is most simply treated as quantitative, numerical data may also be treated as qualitative, if it is divided into range groups. For example, although cholesterol level is numeric data, and may be treated quantitatively, the user may choose to treat the level as qualitative, by dividing the patients as falling into ranges such as 180–200 vs. 200–220. When treated as quantitative, one preferably looks for the average of this value in the patients in the group. When treated as qualitative, one preferably counts the number of patients in each of the range-groups, and its percentage from the total number of patients.

Technically, for each field, if it represents a single/multiple choice question, then the field definitely represents a qualitative parameter. In this case, each answer in the question appears in a separate row, and the calculation comprises counting for each answer how many patients in the group, that is, in the worksheet, selected this option, and their percentage out of the group.

If the field is numerical, then the system preferably prompts the user to determine if the data should be treated as quantitative or as qualitative. If quantitative, than the system preferably prompts the user to decide what should be calculated: average, preferably the default; mean; or median. Each question preferably appears in a separate row. The calculated value, as selected above, is preferably presented in one column in the question's row, and the standard deviation is presented in a second column.

If the user chooses qualitative, then the system preferably prompts for break-up into value-range groups; that is, to define the number of range groups, and for each range-group it minimum and maximum values. Separate rows are then dedicated to each of the value-range groups. The heading, which typically appears in the first cell in the row, displays the question followed by the value-range in brackets; for example, "Cholesterol(180–200)". The number of patients which had values within this range is preferably counted and presented in the first column in this row, and the percentage which the number of patients reflects in another row. Note: generally, a date field is necessarily value-range qualitative.

Finally, the system preferably allows the user to select a suitable statistical comparison between the summarized results of two or more groups, to find if the difference is statistically significant; for example, an appropriate statistical test such as the chi-square test may be performed.

The following detailed example relating to a preferred embodiment of the present invention is not meant to be limiting, and statements therein are intended to refer to preferred alternatives only:

KB ObjectModel Create Method

At the end of editing the knowledge-base structure of a question and/or template, this method creates/modifies objects which reflect this template, its questions and their answers. The result is an Object Model which reflects and is a mirror-image of the structure of the Knowledge-base, and which is programmable in VB. Each Template, Question, and Answer in the KB, is an object, and its properties are properties of this object.

For example: "CurrentSession.Chest_Pain.History.Location=Hand", indicates that in the current session, in the 'Chest Pain' template, in its 'History' sub-template, in the 'Location' question, the answer 'Hand' was selected. This object model forms a library called 'KB' which is programmable in VB or VBA®. Changes in the structure of the KB cause changes in the structure of the Library.

KB ObjectModel Populate Method

With each click event, in addition to marking the finding in the 'Response' field in the QDC and QLC, and storing it to the Virtual Template Record in the TDC, it is also reflected in the KB object model. However, in order to simplify, this is done only for the current encounter, and is only stored in memory, and not in the database. Therefore, no special database structure is required. Findings are kept only until the end of the session.

The following conceptual background and functional overview is intended to further assist in understanding of the present invention.

Conceptual Background

General concepts relating to the present invention and possible uses thereof are now described, it being appreciated that the following is by way of example only and is not meant in any way to limit the generality of the present invention.

One idea behind the present invention is to develop a small number of smart building-blocks, from which a very wide array of data management and decision-support applications can be built, and which would preferably function in multiple languages, on diversified platforms, and would preferably be fully user-customizable. The ability to do so, is based on the cognition that most data collection applications, even ones which appear to be very different, have a similar architecture, and therefore may be constructed using the same, relatively simple, building blocks.

The application preferably has one or more 'providers', which collect data from multiple 'customers'. Examples of a 'provider' may be as diverse as a social worker, healthcare provider, lawyer, mechanic, or insurance agent, and the 'customers' may be clients, patients, cars, airplanes, or production-floor parts, the above comprising examples only and not being intended to limit the generality of the present invention. In some applications the 'customer' and the 'provider' are the same: the 'customer' would use such an application to manage his/her own data, and therefore functions as his own 'provider' (e.g. a health advisor application). The basic functional relationship is preferably still present: The data related to each 'customer' is stored in a 'customer Record', which the application needs to be able to create-new, locate & open, update-&-save, and print from.

Regardless of the application, the data structure of the customer record document 115 preferably is always comprised of one or more sections, which may be of four basic structural data-types:

a) Constant form-style data section: textual and numeric data, which can be displayed as fields in a form, and which is used in update mode (i.e. is overwritten each time it is updated), and represents 'relatively constant' data about the customer (i.e. data which doesn't change frequently). In the health advisor example, status sheet, demographics, past medical history are examples of such sections.

Two) Tabular data section: data which is typically collected in chronological manner, and is brief enough to be conveniently displayed in table format, or be charted as a graph, where each column represents a chronological set of data entered. This data is frequently, although not always, numeric. In the health advisor example, lab results, and vital-signs are examples of such sections.

Three) Chronological log-type textual data entries section: textual data which is entered in a chronological manner, where data is stored and displayed as a series of log-type data-entry sessions. Each time the provider interacts with the customer, a textual session is created, which documents and describes this interaction. At the end of the session, the text describing it is preferably added as an additional log-entry, to the collection of previous such log-entries. In the health advisor example, this correlates to textual descriptions of the sessions, or encounters, the healthcare provider had with the customer.

Four) Scanned images section: scanned documents, or other scanned images of various sorts, relating to the 'customer', each of which bears a time-stamp of when it was taken, and which are stored in the customer record document 115.

Each of the 'chronological textural data entries' also preferably have a surprisingly similar structure, regardless of the application. Each textual data-entry (or session), deals with one or more 'problems' the customer has. The nature of the customer' and of the 'problems' would be very different in different applications, but structurally, they are preferably the same, regardless of whether these are medical diagnoses that need attention, social or legal issues of the client that are being addressed, or mechanical problems a car has.

Depending on the application, each problem may sometimes be divided into several constant aspects (i.e. aspects which exist in different problems). In the health advisor example this correlates to the subjective, objective, assessment, and plan aspects that each diagnosis has.

Each such problem or aspect of a problem, as well as constant form-style data sections, may be described using a structured hierarchical questionnaire (i.e. a questionnaire with various types of questions, including multiple-choice-questions, where each answer may 'branch' to continuation questions). Provided an efficient text-generation mechanism, the user's selections in this questionnaire would generate text reflecting the user's selections in this questionnaire.

Finally, all such applications share in common two basic functions: to document effectively their interactions with multiple customers, and to have effective workflow tools, in order to collaborate and exchange information with other providers.

Based on these assumptions, and with maximal utilization of existing commonly used software packages, it is possible to create a small set of components, which together would allow to create effective, totally flexible data-collection applications.

The entire bulk of textual and numeric customer-data can preferably be stored in one hierarchically structured document (e.g. MICROSOFT® Word document), with an embedded spreadsheet document for tabular data, and a linked ACROBAT® PDF file for customer imaging data. Workflow actions revolving around these documents, can be provided by MICROSOFT® Outlook, which provides easy customization. A small number of custom-components, which would operate from within MICROSOFT® Word would provide the tools for knowledge-base-driven structured-data-entry, and easy access to workflow actions.

Since the application is preferably based on knowledge-base-driven templates, instead of 'hard-coded' screens, the only elements which appear to be needed are a navigation mechanism (opening/closing a record, and navigating to its different sections), template display and text-generation mechanism, and several file-Action and workflow dialogues, and a database access module.

Creating several versions of these components for various platforms (e.g. handheld computers, Java, PC), is relatively easy, since their display tier level is relatively simple, and most of their complexity is at the business-logic tier level, which tends to be less platform dependent. Examples of suitable handheld computers for this purpose include: computers running WINDOWS CE®; computers operating on a WINDOWS CE® platform; PSION® handheld computers; computers operating with an EPOCH® operating system; PALMPILOT® computers; handheld wireless communication computers; and PALM VII® computers.

Functional Overview

One goal of the current invention, in a preferred embodiment thereof, is to develop several custom-components, which would serve as building blocks in creating a health advisor application for the consumer-health market, as well as other applications. The PC version of these components is designed to preferably be tightly integrated with MICROSOFT® Office applications and utilize its object-model functionality. Three additional versions of these components are believed to be required, which would work on handheld platforms, and in Java. This section gives a brief overview of how these elements join to form an application such as a personal health organizer, as described above with reference to FIG. 25. The following sections provide a detailed functional and technical specification of these components.

The required components, are divided into a three-tiered architecture, in order to facilitate multi-platform and multi-database support, and ensure future easy maintenance and development. Display tier components, which may need to be developed separately for different platforms; business-logic tier components, which hopefully need minimal changes across platforms; and database and connectivity tier components, which need to adjusted to different databases.

Display Tier Components

Navigation Display Component (NDC)

Launching the application preferably causes MICROSOFT® Word to be launched, with the navigation display component replacing the standard MICROSOFT® Word toolbar. This component allows the user to open, create-new, and close (save and sign) a customer record document 115, as well as to view, browse and navigate to different parts of the record, and perform various workflow actions related to the record.

Buttons corresponding to the various fixed sections of the record (e.g. demographics) preferably allow navigation to the various fixed sections. A combo-box preferably allows navigation to previous sessions in the record, as well as to Images associated with the record. When writing a new session, another combo-box preferably displays a list of available templates, and together with several adjoining buttons, allows selecting and navigating between different templates and their sub-templates.

Four file-actions and seven workflow actions are preferably triggered by respective buttons on the toolbar, and trigger 11 non-standard dialogues described below. Finally, the last group of button on the toolbar typically offers general utilities: reference (provided by hyperlinks in the KB to reference documents); help (DemoShield based); options configuration (tab component for setting options in the system, similar to MICROSOFT® Office format), reports & statistics module (described below); and the knowledge-base editor (basically just the standard question component and template component described below, functioning in their 'edit' mode).

File Action and Workflow Dialogues

The custom dialogues in the system preferably include four file action dialogues (create new, open file, sign & save, and print), and seven workflow dialogues (call, send E-mail, schedule appointment, add task, request task set reminder, and send pager). The file action dialogues are typically similar to but not identical to the standard MICROSOFT® Word ones, and the workflow dialogues are (in the PC version) technically merely simple Outlook forms, and therefore are very easy to create, and are modifiable by the users.

Template Display Component (TDC)

The template display control, is preferably responsible for displaying data-driven templates, composed of multiple-choice and other types of questions, as a means of structured textual data entry. Technically, the TDC is a 'form' activated by the navigation display control, which creates and positions an appropriate number of question display components (QDC) units upon itself, and displays at its bottom the MICROSOFT® Word document into which the text generated by the QLCs is displayed. The navigation display component preferably 'tells' the TDC which template to display, and the data access component holds (or gets) the knowledge-base data required to display this template.

Based on the template data, the selected language, and other system parameters, the TDC preferably computes the number, dimensions, and location, and sequence of question display components (QDCs) required to display the template, and creates sufficient number of QDC units, setting their properties so as to position and size them appropriately on the screen. Finally, the template component feeds the data to the different QDCs, and prompts them to display their questions properly.

Continuation questions (i.e. questions which pop-up in response to answers selected by the user), are also preferably stored 'templates' in the KB, and are similarly handled by the TDC: the TDC creates and positions the necessary additional QDCs and feeds them with the data of the pop-up questions. When in edit mode, the TDC appears and behaves slightly different, supporting click-&-drag operations to edit the template, adding, removing, sequencing questions in the template, linking them to each other, and creating continuation questions.

Since the user may preferably switch back and forth between several templates in one session, the TDC also preferably stores (temporarily, in memory) the user's responses to the questions in the different templates, feeding them back to the QDC when returning to a template previously visited.

Question Display Component (QDC)

Each of the question display components, having preferably received its knowledge-base data and being prompted by the template display control, displays its question on the screen. The question's screen appearance and behavior are preferably dependent on the question type (e.g. multiple-option, single option, numeric units, textual, etc.), and are defined in the knowledge-base.

Business-Logic Tier Components

Data Access Component (DAC)

The data access component preferably serves as the single connection between the application and its knowledge-base and customer databases. On the knowledge-base side, the DAC preferably retrieves all of the template-related data (which is stored in several different tables) from the database, and creates a 'virtual' template record in memory. It preferably does so both for a template the user selected using the NDC, as well as all possibly related templates, in anticipation of the user's next move. Since the database preferably includes several sets of theses tables, one for each language supported, the DAC is also in charge of loading the data in the language selected by the user.

Navigation Logic Component (NLC)

The navigation logic component is preferably responsible for the actual action of navigation within the record, an action which is triggered by the button and combo-boxes on the NDC toolbar of the display tier described above. This navigation action preferably is really three-fold: (a) jumping, via hyperlinks, to various parts of the MICROSOFT® Word document object, which comprises of most of the customer record document 115, or to bookmarks within the ACROBAT® PDF object, which holds the images associated with the record. (b) 'directing' the TDC and TLC to the template associated with this section. (c) directing the text-generation output of the TLC to the correct location in the MICROSOFT® Word document.

The structure of the record is preferably based on the heading hierarchy of the MICROSOFT® Word document object. Each fixed section in the record is a Heading-1; in the previous sessions section, each session is a Heading-2; each problem in the session is a Heading-3; and each sub-template, is a Heading-4. The NLC is typically responsible, not only for navigating to these headings, but also for creating them when needed (e.g. when writing a new session). When a new session is being written, it is actually preferably written to a temporary session MICROSOFT® Word document, which the NLC creates, and which NLC joins to the main MICROSOFT® Word document at the end of the session, as another Heading-2.

Preferably, an exception to the above rule relates to templates, which are associated with 'fixed' sections of the record. As mentioned before, templates preferably correlate to Heading-1 sections of the main MICROSOFT® Word document, and need to update the section, rather than add to it. In this case, rather than creating a blank New-Session document, the NLC preferably instructs the TLC to generate the text the and the data here is written in update mode to fields embedded in these sections, rather than to a temporary New-Session document.

Template Logic Component (TLC)

The TLC typically retries data from the knowledge-base database, constructs a virtual template record which holds preferably all data relevant to the template, the data typically originating from multiple database tables, and feeds the date to multiple QLC and QDC units.

Question Logic Component (QLC)

In response to user's selections and input, the QC preferably generates text which reflects these selections, writing it into the temporary MICROSOFT® Word 'session' document. The output format is configurable through output format parameters in the question record in the knowledge-base. After each QC generated its own text, the QCs preferably collaborate between them to connect their sentences into compound sentences. In a similar manner, the QCs are also preferably capable of analyzing text previously generated (e.g. of a previous encounter), collaborating between them to find out which questions and answers caused the generation of this text.

When the QCs type is graphic it allows the user to make selections from by checking the coordinates of the click on a background bitmap (as opposed to simply clicking a check-box), or to mark finding on the bitmap. As mentioned above, form type of QCs preferably generate form style output, and create and embed MICROSOFT® Word fields into the document, rather than generating sentence. Finally, in edit mode, the QC preferably allows the user to drag answers in order to modify their sequence, and to add or remove answers.

Tabular Data Component (TC)

The tabular data component preferably comprises an MICROSOFT® Excel spreadsheet embedded into the main MICROSOFT® Word document, which is formatted, and includes several macros, such that it is suitable for storing and manipulating tabular, chronological, numerical data such as lab results in a personal health organizer application, or any tabular log function. One of the buttons on the navigation toolbar component allows the user to easily jump to this section. The connectivity component and the Text-Bridge components (described below) allow for numerical data to be fed in directly into this control.

Reports & Statistics Component (RSC)

The reports & statistics component preferably comprises a complex MICROSOFT® Excel macro which retrieves data from multiple customer record documents 115 (i.e. MICROSOFT® Word documents), into one MICROSOFT® Excel spreadsheet, presents them as MICROSOFT® Excel graphs, and performs various MICROSOFT® Excel statistics functions on them.

Database & Connectivity Tier Components

Database Structure & Internet Capability

The application is preferably based on two major datasets: customer data, and knowledge-base data. A third set—transactional data—comprises of 2 temporary tables for inbound and outbound data connectivity.

The knowledge-base data is preferably stored in 6 tables (Application, Template, Question, QuestionAnswers, and Answer), and is used to present templates which contain various types of questions (e.g. multiple-choice), which are used for data entry. The knowledge-base database preferably resides locally on an MICROSOFT® Access database (may use a faster internal flat-table engine during text generation).

The customer data is preferably stored primarily in one simple table ('CustomerData'). In the one simple table, all of the data needed for routine actions is preferably stored in three objects: MICROSOFT® Word Document object, MICROSOFT® Excel workbook object, and ACROBAT® PDF file object (for scanned data). Additional fields in this table, and several linked tables, duplicate important data items for rapid record retrieval. Databases supported: MICROSOFT® SQL and ORACLE®. Client's interaction with the server is preferably minimal: only at beginning and end of a session.

Clients may work standalone, or with a local server, or a remote server over secure Internet connection. Secure E-mail sending and receiving should preferably also be enabled.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for generating an application, the method comprising:

providing a plurality of components, each component defining an application building block;

storing, based on non-programmatic user input, a plurality of user-defined application-specific properties, each said property being associated with one of said plurality of components;

receiving structured data input via a questionnaire, based at least in part on said plurality of components;

generating text based, at least in part, on the structured data, said generating text comprising dynamic runtime generation of a plurality of simple sentences from a plurality of sub-sentence segments based, at least in part, on user input, based at least in part of said components; and providing an application based on at least some of said plurality of user-defined application-specific properties and on said components associated therewith.

2. A method according to claim 1 and wherein said generating text also comprises automatically joining at least two of said plurality of simple sentences to form a compound sentence.

3. A method according to claim 1 and wherein each said simple sentence is based on a user-supplied response to a question, said response being provided in said receiving step.

4. A method according to claim 1 and wherein said storing comprises:

receiving user input, wherein said user input is substantially non-textual.

5. A method according to claim 1 and wherein said generating text also comprises:

automatically generating text in more than one language.

6. A method according to claim 5 and wherein said more than one language comprises at least one left-to-right language and at least one right-to-left language.

7. A method according to claim 5 and wherein said more than one language comprises a first language having a first syntactical structure and a second language having a second syntactical structure, and said first syntactical structure and said second syntactical structure are distinct.

8. A method according to claim 7 and wherein said first syntactical structure has a first sentence structural order and said second syntactical structure has a second sentence structural order, and said first sentence structural order and said second sentence structural order are different.

9. A method according to claim 1 and wherein at least a portion of said method is implemented in software adapted for execution on a computer.

10. A method according to claim 9 and wherein the computer comprises one of the following: a handheld computer; and a palmtop computer.

11. A method according to claim 10 and wherein the computer comprises a keyboard-less pen-based handheld computer.

12. A method according to claim 10 and wherein the computer comprises a handheld wireless-communication device.

13. A method according to claim 9 and wherein said execution includes execution on a computer over the Internet.

14. A method according to claim 1 and wherein said generating text include automatic generation of compound sentences based on user input to questions and their continuation questions in said data-input questionnaires, and unlimited levels of hierarchy of said questions.

15. A method according to claim 1 and wherein modifying the structure of said application is achieved by setting of said properties;

said setting requiring no programming and no compilation; and said modifying including all of the following: application questions; continuation questions; answers; question and answer sequence; and resulting text-generation of sentences from sub-sentence segments.

16. A method according to claim 1 and wherein said receiving includes selecting answers to questions in said questionnaire, based on voice-recognition processing of user voice-input.

17. A text generation method for generating text based, at least in part, on structured data, said method comprising:

generating a plurality of simple sentences from a plurality of sub-sentence segments based, at least in part, on user input, dynamically at runtime, said generating comprising automatically generating said plurality of simple sentences in more than one language.

18. A method according to claim 17 and wherein said more than one language comprises at least one left-to-right language and at least one right-to-left language.

19. A method according to claim 17 and wherein said more than one language comprises a first language having a first syntactical structure and a second language having a second syntactical structure, and said first syntactical structure and said second syntactical structure are distinct.

20. A method according to claim 19 and wherein said first syntactical structure has a first sentence structural order and said second syntactical structure has a second sentence structural order, and said first sentence structural order and said second sentence structural order are different.

21. A method according to claim 17 and wherein at least a portion of said method is implemented in software adapted for execution on a computer.

22. A method according to claim 21 and wherein the computer comprises at least one of the following: a handheld computer; and a palmtop computer.

23. A method according to claim 22 and wherein the handheld computer comprises a handheld wireless-communication device.

24. A method according to claim 21 and wherein said execution includes execution on a computer over the Internet.

25. A method according to claim 17 and wherein said user input includes selecting answers to questions in a structured data-entry questionnaire, based on voice-recognition processing of user voice-input.

26. A method according to claim 17 and wherein said text generation method also comprises a method for generating a compound sentence from a plurality of simple sentences, the method comprising:

providing general logic defining compound sentence structure based on structure of simple sentences from which a compound sentence is to be generated;

providing a plurality of simple sentences; and generating a compound sentence based on said general logic and said plurality of simple sentences.

27. A method according to claim 26 and wherein each of said plurality of simple sentences reflects a continuation questions in a data-input questionnaire, and the generating step comprises:

generating a compound sentence from at least two sentences comprising a first sentence and a second sentence, wherein the first sentence reflects data entered via one question in the data-input questionnaire, and the second sentence reflects data entered via a second question in the questionnaire, and wherein said second question is a continuation to one of a plurality of answers of said first question.

28. A method according to claim 27 and wherein at least one of the following is not limited:

a number of simple sentences related to continuation questions in the data-input questionnaire; and the levels of hierarchy of said continuation questions, said continuation questions being joinable to generate a compound sentence.

29. A method according to claim 26 and wherein said generating a compound sentence comprises:

automatically generating the compound sentence in more than one language.

30. A method according to claim 29 and wherein said more than one language comprises at least one left-to-right language and at least one right-to-left language.

31. A method according to claim 29 and wherein said more than one language comprises a first language having a first syntactical structure and a second language having a second syntactical structure, and said first syntactical structure and said second syntactical structure are distinct.

32. A method according to claim 31 and wherein said first syntactical structure has a first sentence structural order and said second syntactical structure has a second sentence structural order, and said first sentence structural order and said second sentence structural order are distinct.

33. A method according to claim 26 and wherein said generating is based only on said general logic and said simple plurality of sentences.

34. A data collection and access method for allowing data collection from multiple users, the method comprising:

providing a knowledge base defining at least one data-structured input questionnaire to at least two users, comprising a first user and a second user;

allowing said first user to modify the knowledge base associated with said first user, without synchronizing said modification with said second user;

receiving structured-data input from said first user, said input being based on said modified, unsynchronized input questionnaire;

storing said input from said first user and providing access to said stored input to said second user; and allowing said second user to determine the identity of questions and answers that were selected by said first user, despite said unsynchronized modification of said knowledge-base and input questionnaire.

35. A method for analyzing a text, said text comprising plain text generated by a text generator using a text generating method, said method for analyzing comprising:

reversing said text generating method, thereby determining a plurality of inputs which were provided to said text generating method in order to generate said text;

wherein said text does not include any of the following indicators: an embedded ID, and a hidden character;

said indicators indicating the questions and answers which caused generation of said text.

36. A method according to claim 35 and wherein said analyzing a text is utilized as part of a data access method comprising:

receiving data from user input to a questionnaire comprising multiple-choice questions and continuation questions;

generating natural language sentences from sub-sentence elements based, at least in part, on said user input;

storing said natural language sentences in textual form;

accessing said stored natural language sentences in textual form; and analyzing said stored text thereby determining said user input which caused generation of said stored text.

37. A method according to claim 1 and wherein said storing comprises storing using a record data structure comprising:

a database comprising a plurality of documents, each document comprising a plurality of sections stored in at least one of the following:
at least one word processing file;
at least one word processing file object;
at least one HTML file;
at least one XML file; and
at least one text file,
said plurality of sections being arranged in a hierarchy.

38. An application generating system comprising:

a plurality of components, each component defining an application building block;

storage apparatus operative to store, based on non-programmatic user input, a plurality of user-defined application-specific properties, each said property being associated with one of said plurality of components;

input apparatus operative to receive structured data input via a questionnaire, based at least in part on said plurality of components;

a text generator operative to generate text based, at least in part, on the structured data, comprising dynamic runtime generation of a plurality of simple sentences from a plurality of sub-sentence segments based, at least in part, on user input; and an application provider for providing an application based on at least some of said plurality of user-defined application-specific properties and on said components associated therewith.

39. A computer-readable medium comprising a computer program, the computer program being operative, when in operative association with a computer, to perform the following steps:

providing a plurality of components, each component defining an application building block;

storing, based on non-programmatic user input, a plurality of user-defined application-specific properties, each said property being associated with one of said plurality of components;

receiving structured data input via a questionnaire, based at least in part on said plurality of components;

generating text based, at least in part, on the structured data, said generating text comprising dynamic runtime generation of a plurality of simple sentences from a plurality of sub-sentence segments based, at least in part on user input; and providing an application based on at least some of said plurality of user-defined application-specific properties and on said components associated therewith.

* * * * *